US010033301B2

(12) United States Patent
Zhang et al.

(10) Patent No.: US 10,033,301 B2
(45) Date of Patent: Jul. 24, 2018

(54) FAST TRANSIENT SUPPLY WITH A SEPARATED HIGH FREQUENCY AND LOW FREQUENCY PATH SIGNALS

(71) Applicant: LINEAR TECHNOLOGY CORPORATION, Milpitas, CA (US)

(72) Inventors: Jindong (Henry) Zhang, Milpitas, CA (US); Jian Li, Milpitas, CA (US)

(73) Assignee: Linear Technology LLC, Milpitas, CA (US)

( * ) Notice: Subject to any disclaimer, the term of this patent is extended or adjusted under 35 U.S.C. 154(b) by 0 days.

(21) Appl. No.: 15/407,749

(22) Filed: Jan. 17, 2017

(65) Prior Publication Data

US 2017/0207723 A1    Jul. 20, 2017

Related U.S. Application Data

(60) Provisional application No. 62/280,897, filed on Jan. 20, 2016, provisional application No. 62/280,878, filed on Jan. 20, 2016.

(51) Int. Cl.

| | | |
|---|---|---|
| *H02M 7/537* | (2006.01) | |
| *H03M 1/12* | (2006.01) | |
| *H02M 3/158* | (2006.01) | |
| *H02M 1/12* | (2006.01) | |
| *H02M 1/00* | (2006.01) | |
| *H02M 3/156* | (2006.01) | |

(52) U.S. Cl.
CPC ............. *H02M 7/537* (2013.01); *H02M 1/12* (2013.01); *H02M 3/1584* (2013.01); *H02M 2001/0009* (2013.01); *H02M 2001/0025* (2013.01); *H02M 2003/1566* (2013.01)

(58) Field of Classification Search
CPC ...... H02M 7/537; H02M 1/12; H02M 3/1584; H02M 2001/0009; H02M 2001/0025
See application file for complete search history.

(56) References Cited

U.S. PATENT DOCUMENTS

| | | |
|---|---|---|
| 5,929,692 A | 7/1999 | Carsten |
| 6,683,441 B2 | 1/2004 | Schiff et al. |

(Continued)

OTHER PUBLICATIONS

Andres Barrado et al., "The Fast Response Double Buck DC-DC Converter (FRDB): Operation and Output Filter Influence", IEEE Transactions on Power Electronics, vol. 20, No. 6, Nov. 2005, pp. 1261-1270.

(Continued)

*Primary Examiner* — Emily P Pham
(74) *Attorney, Agent, or Firm* — McDermott Will & Emery LLP

(57) ABSTRACT

A power interface device includes a main switching converter and an auxiliary switching converter. The main switching converter is coupled to an input terminal and an output terminal and configured to operate at a first switching frequency to source a low frequency current from the input terminal to the output terminal. The auxiliary switching converter is coupled to the input terminal and the output terminal in parallel with the main switching converter and configured to operate at a second and higher switching frequency than the first switching frequency to source a fast transient high frequency current from the input terminal to the output terminal.

41 Claims, 48 Drawing Sheets

(56) References Cited

U.S. PATENT DOCUMENTS

| | | |
|---|---|---|
| 6,984,969 B1 * | 1/2006 | Liu ...................... H02M 3/158 |
| | | 323/280 |
| 7,233,130 B1 | 6/2007 | Kay |
| 7,609,040 B1 | 10/2009 | Jain |
| 8,441,242 B2 | 5/2013 | Ng et al. |
| 8,917,077 B2 | 12/2014 | Lin et al. |
| 8,957,514 B1 | 2/2015 | Barnette |
| 9,256,238 B1 | 2/2016 | Kotikalapoodi |
| 9,520,788 B2 | 12/2016 | Kobayashi |
| 9,627,976 B2 | 4/2017 | Li |
| 2002/0036486 A1 | 3/2002 | Zhou et al. |
| 2009/0044031 A1 * | 2/2009 | Vinayak ................... G06F 1/26 |
| | | 713/300 |
| 2009/0201000 A1 | 8/2009 | Kojima et al. |
| 2010/0033153 A1 | 2/2010 | Xing et al. |
| 2011/0241636 A1 | 10/2011 | Wu et al. |
| 2014/0184177 A1 | 7/2014 | Tournatory et al. |
| 2014/0218109 A1 * | 8/2014 | Wimpenny ............. H03F 3/217 |
| | | 330/251 |
| 2016/0211750 A1 | 7/2016 | Coleman et al. |
| 2016/0248327 A1 | 8/2016 | Li |
| 2016/0248328 A1 | 8/2016 | Zhang et al. |

OTHER PUBLICATIONS

Notice of Allowance dated Jun. 28, 2017, issued in U.S. Appl. No. 15/199,693.

* cited by examiner

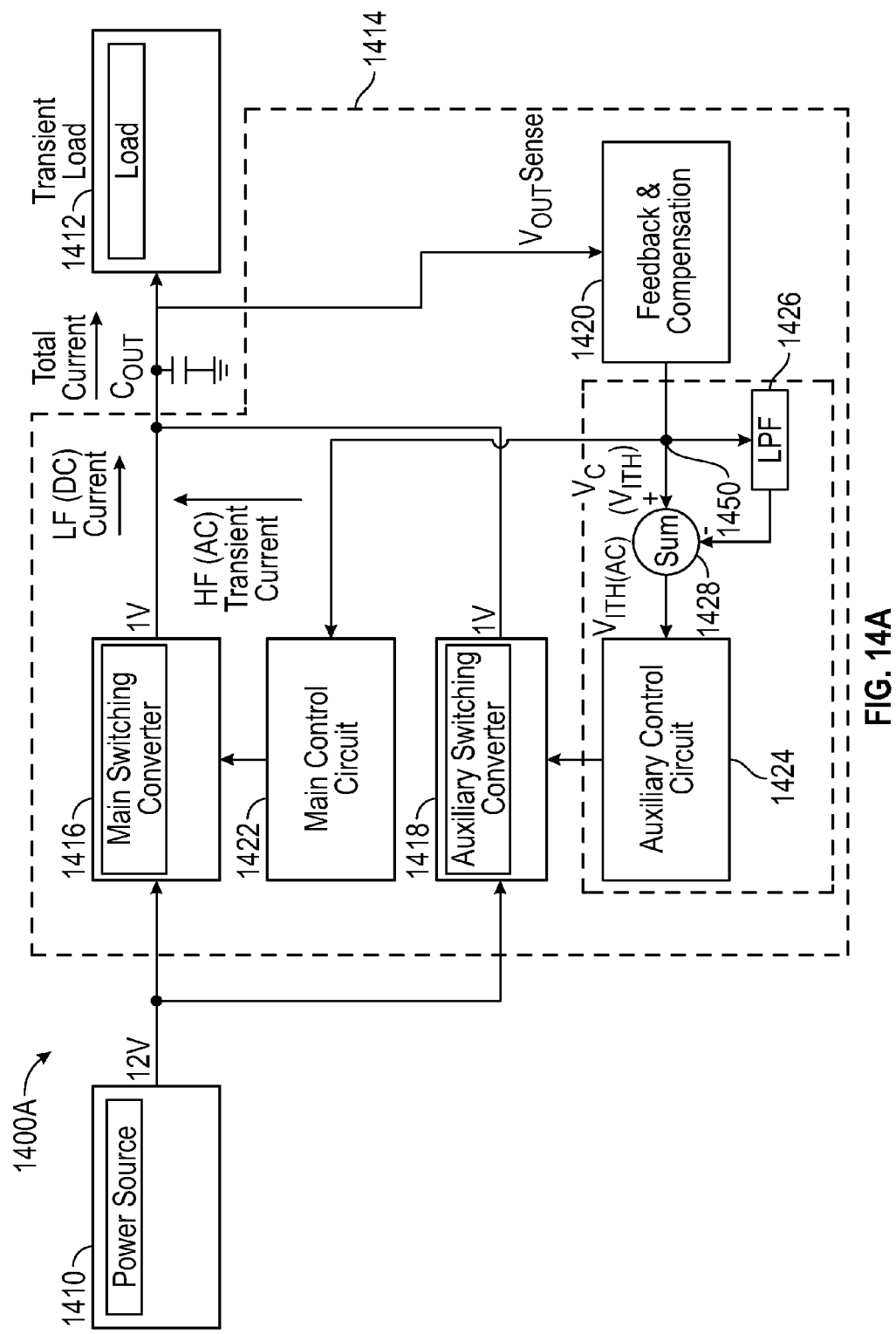

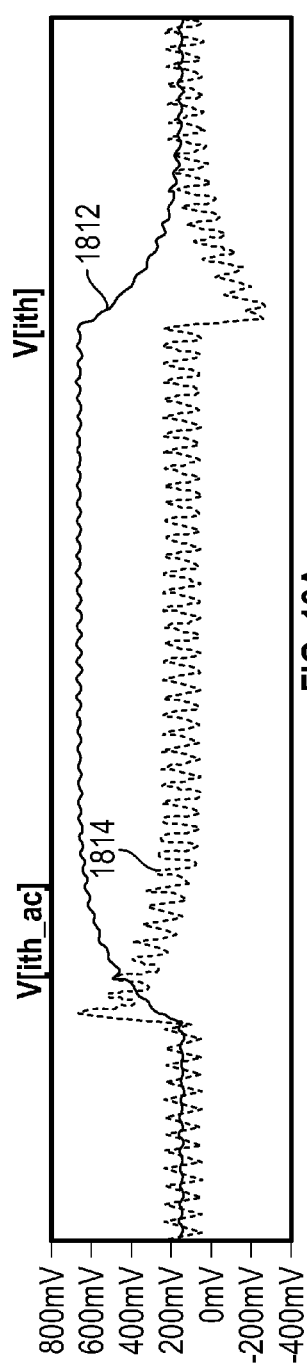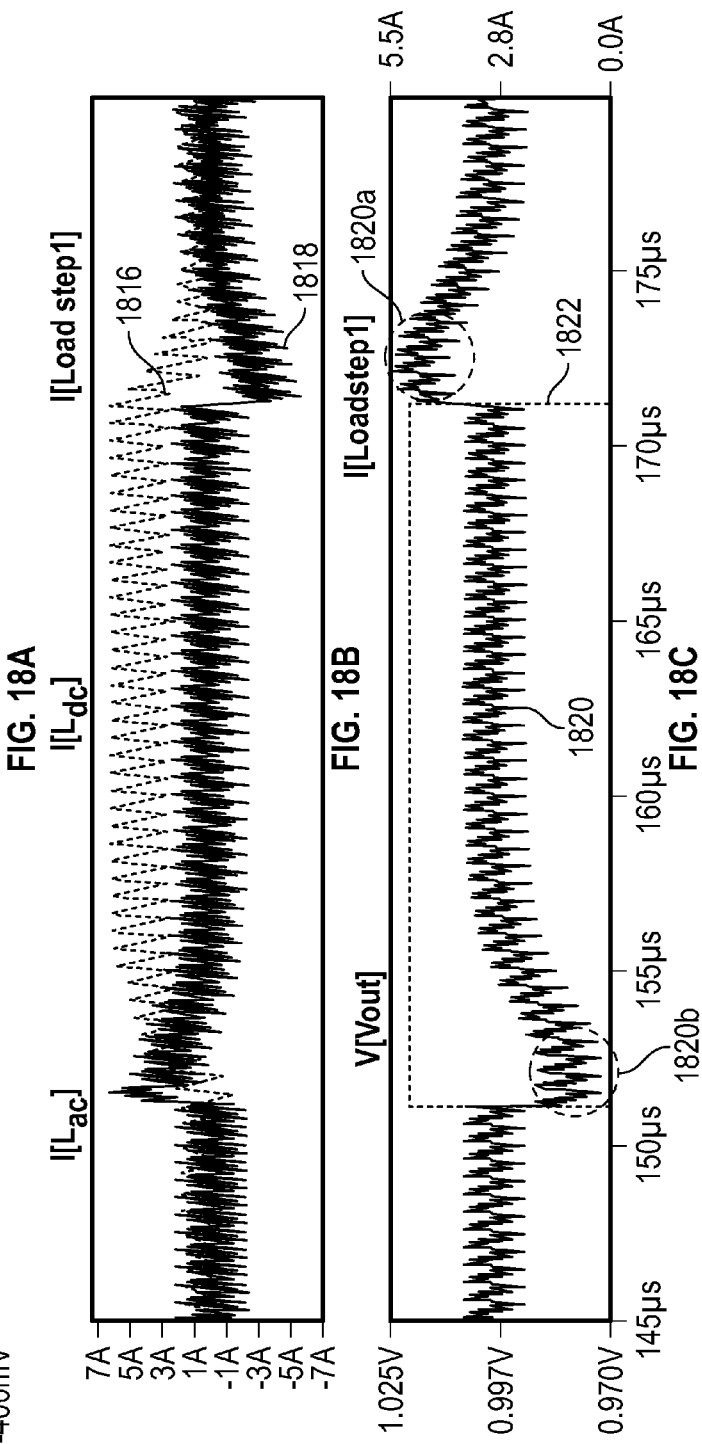
FIG. 18A  FIG. 18B  FIG. 18C

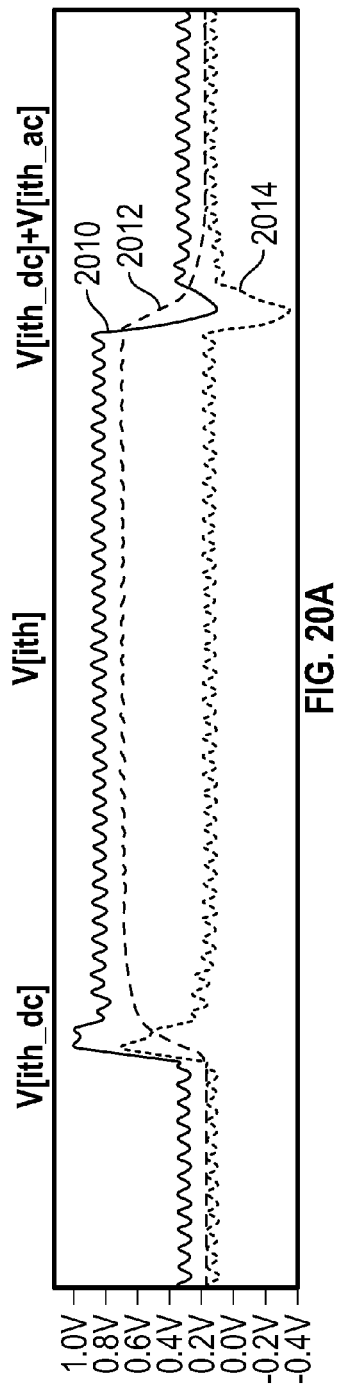
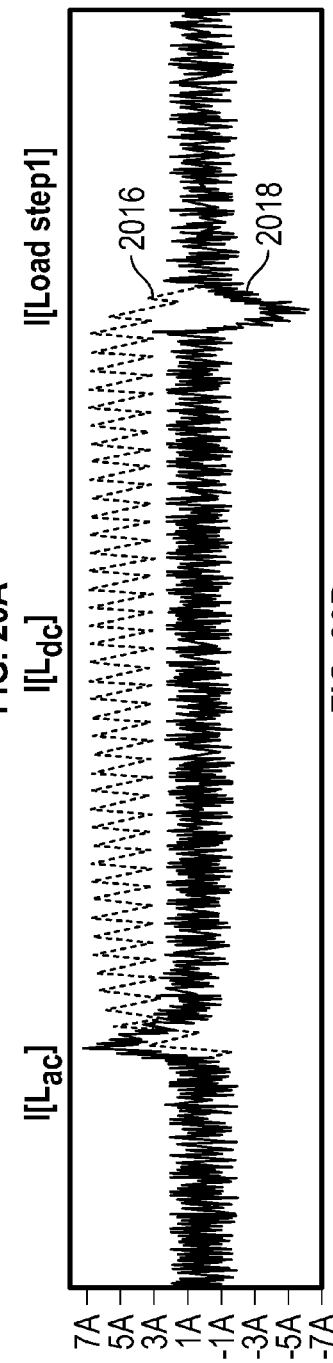
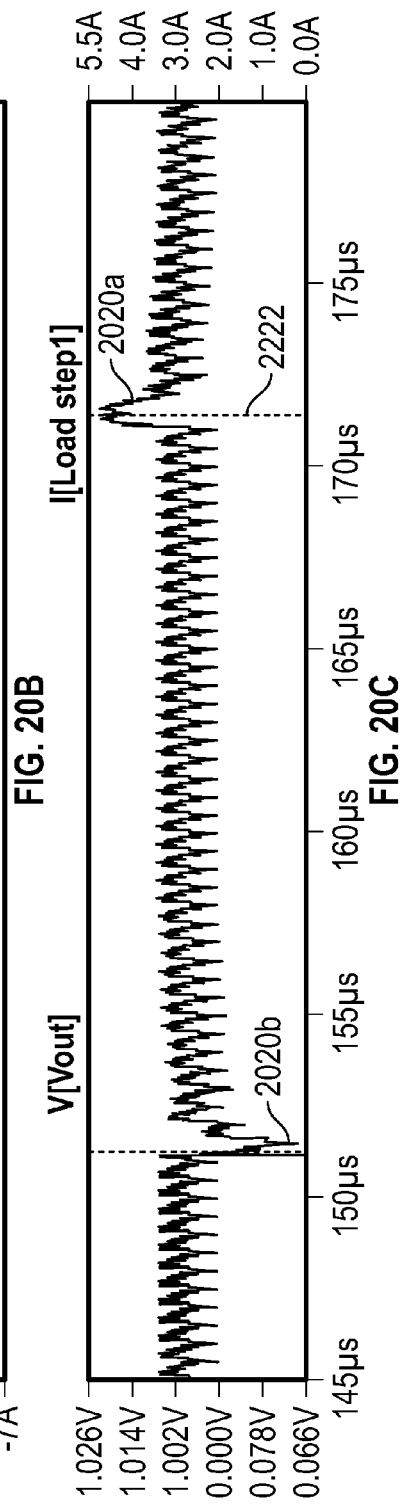
FIG. 20A
FIG. 20B
FIG. 20C

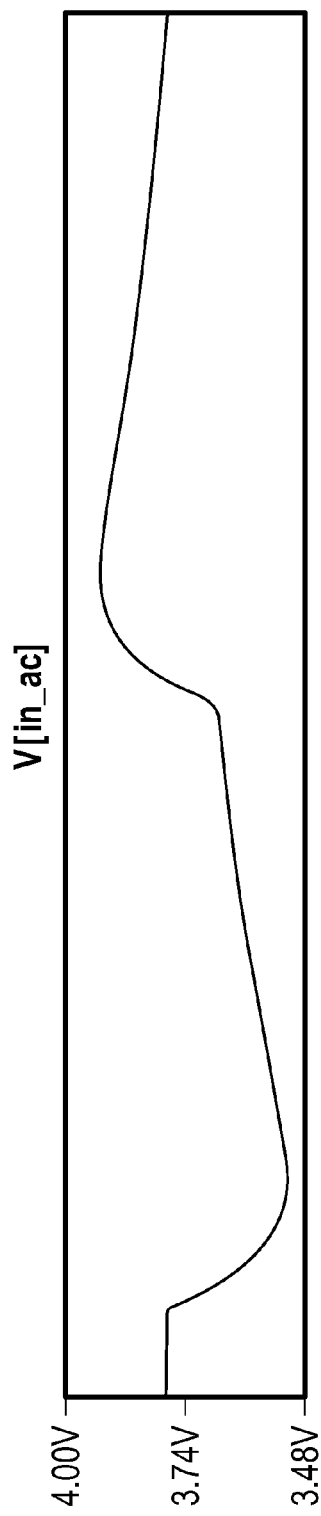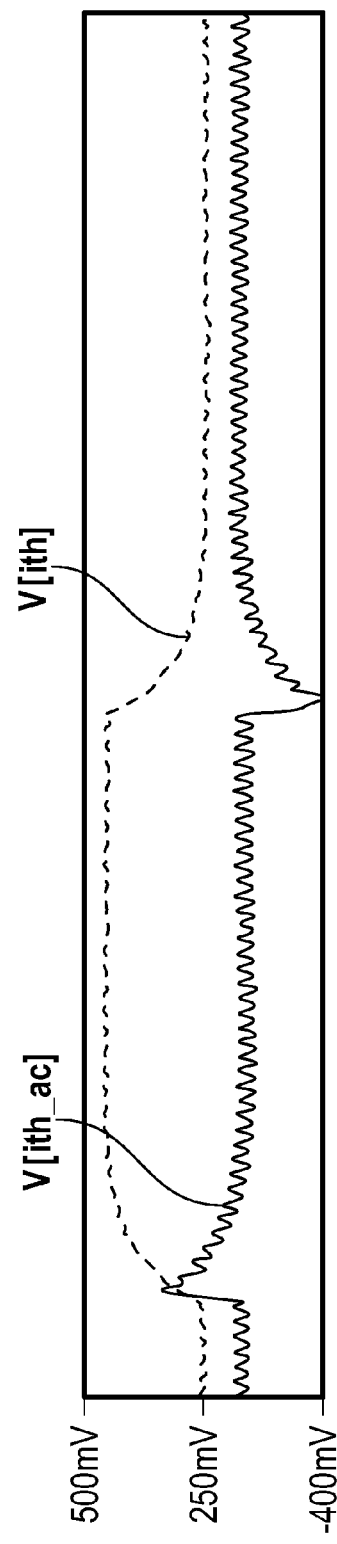

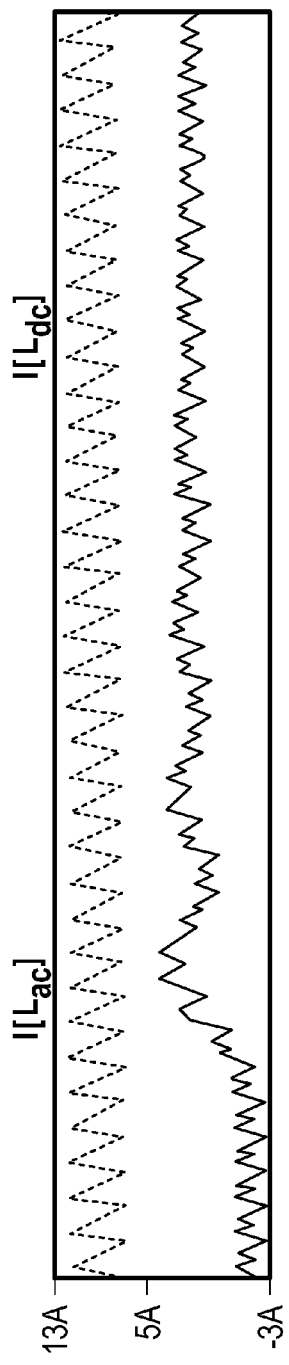
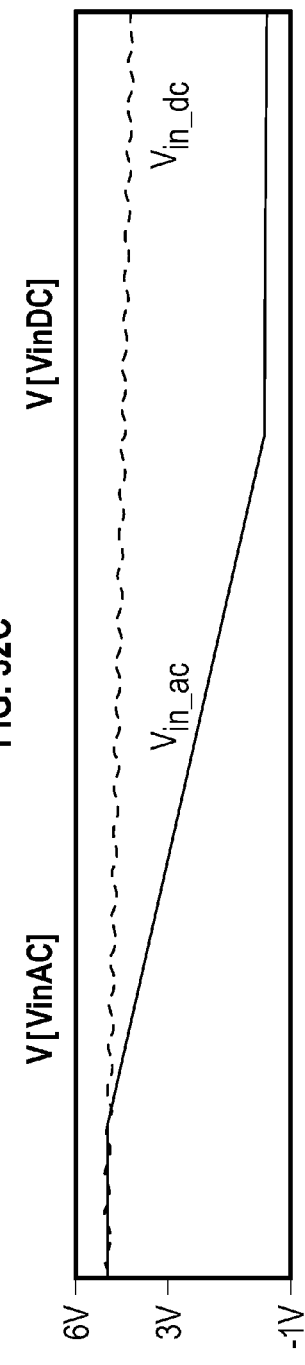
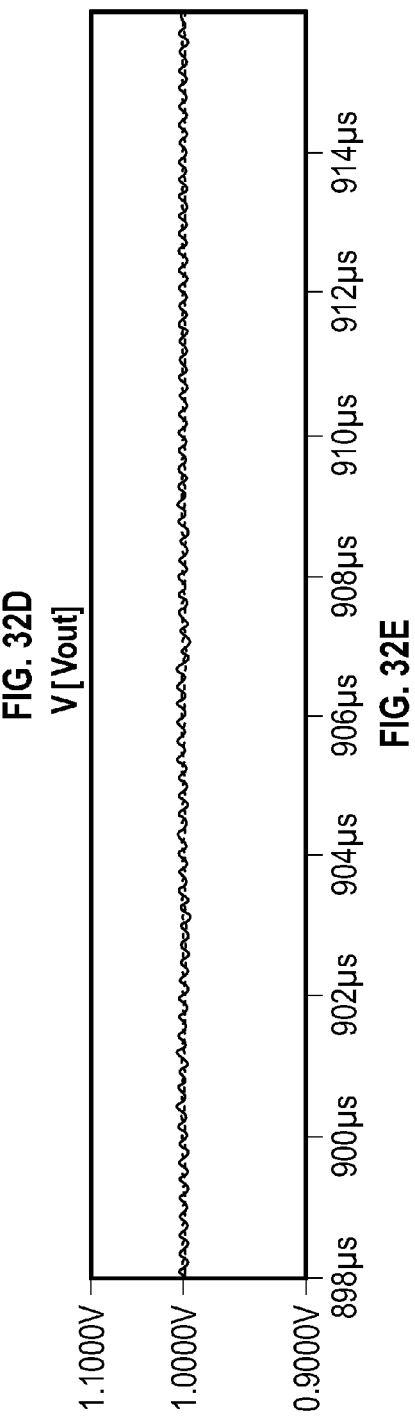
FIG. 32C
FIG. 32D
FIG. 32E

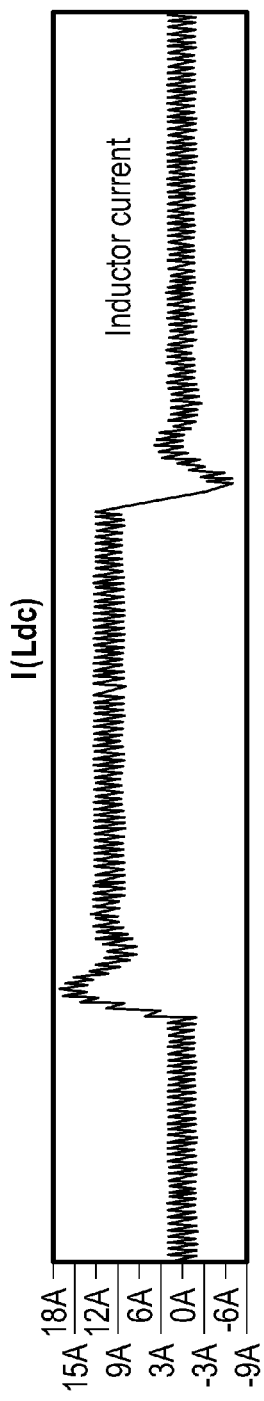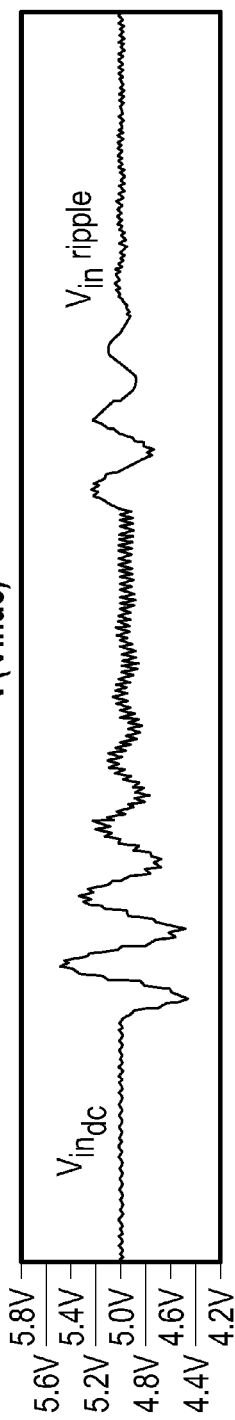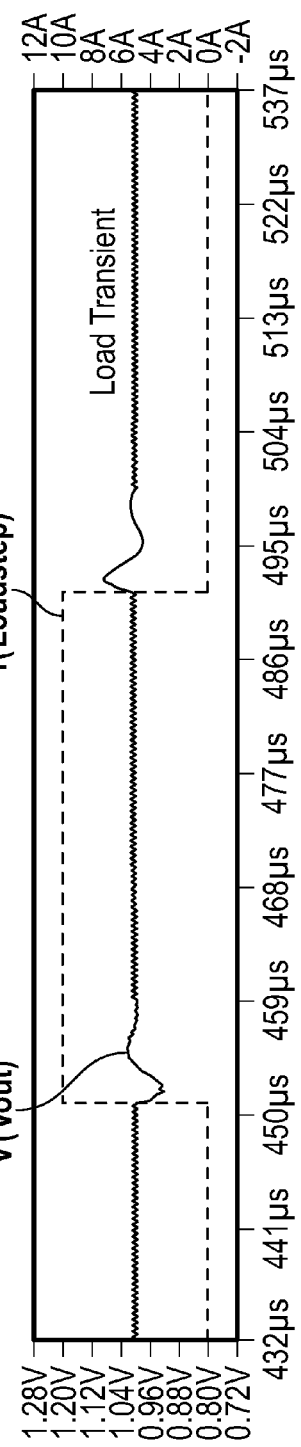
FIG. 34A-1
FIG. 34A-2
FIG. 34A-3

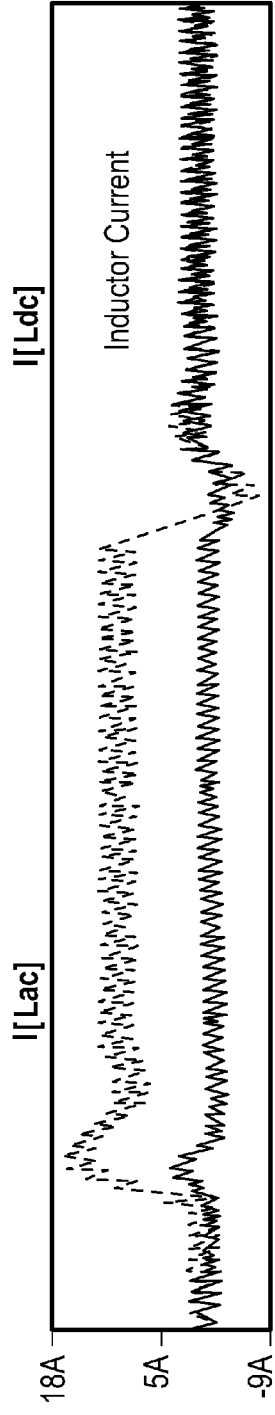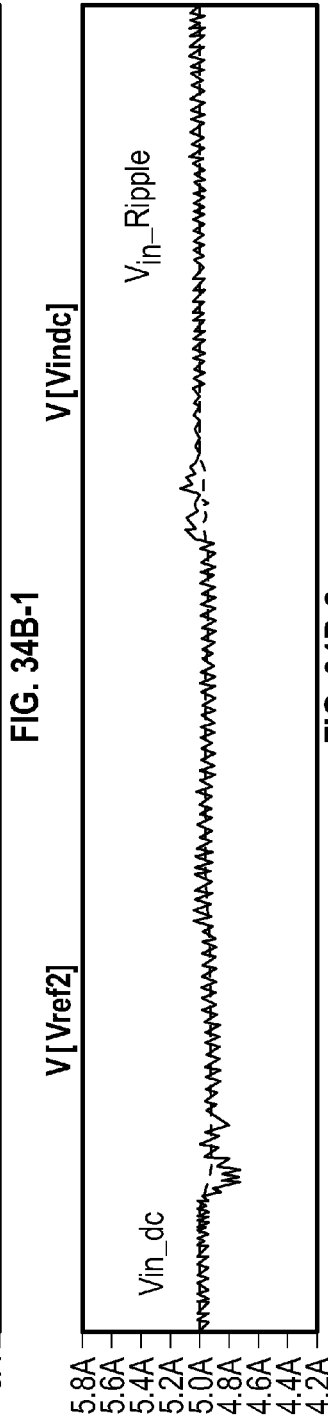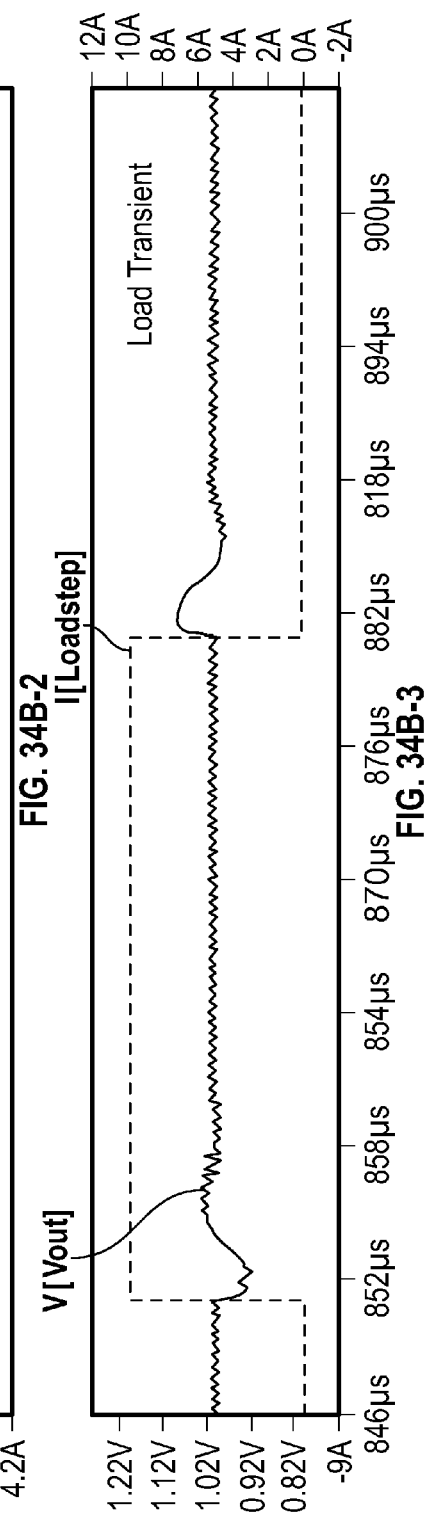
FIG. 34B-1
FIG. 34B-2
FIG. 34B-3

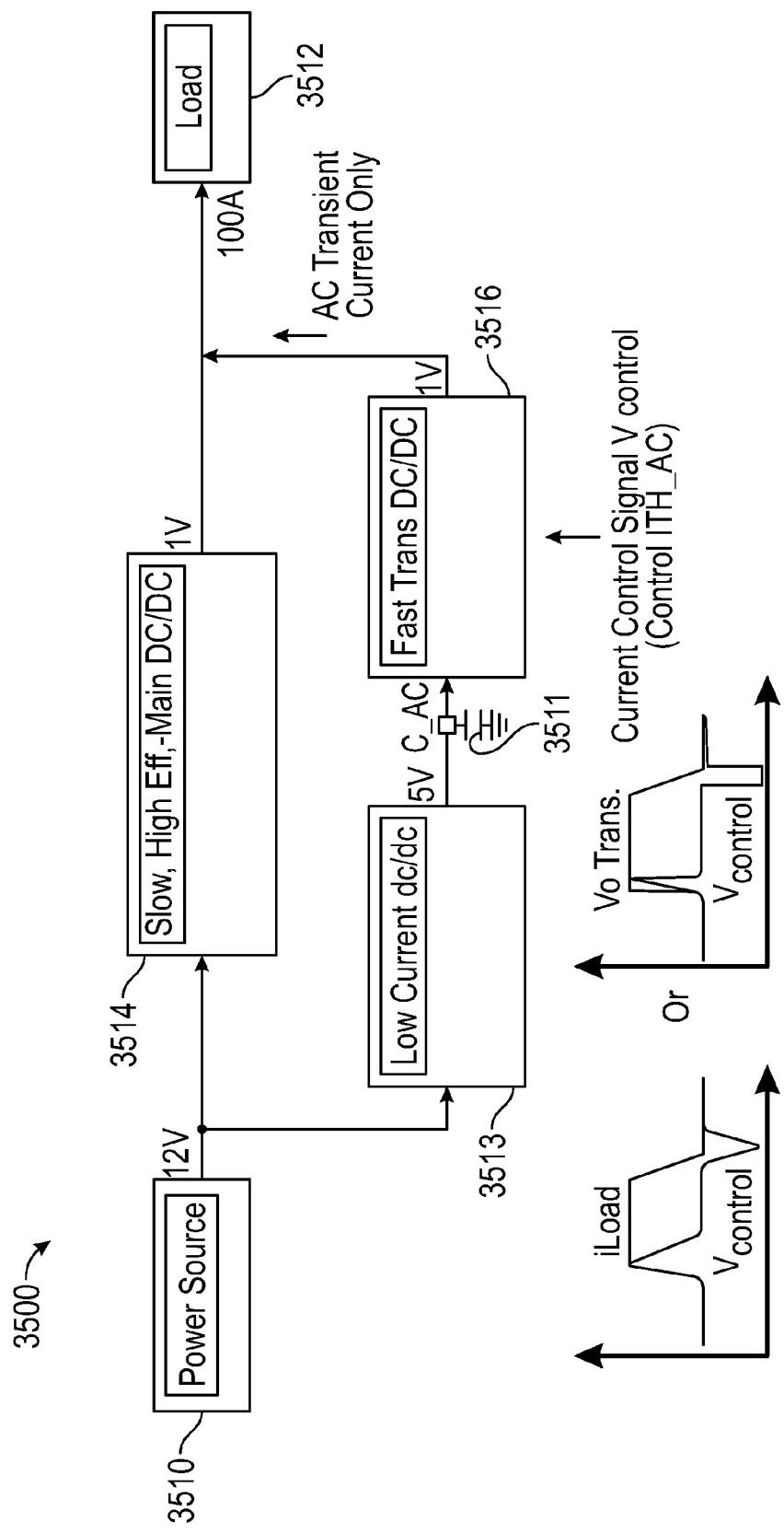

FAST TRANSIENT SUPPLY WITH A SEPARATED HIGH FREQUENCY AND LOW FREQUENCY PATH SIGNALS

CROSS REFERENCE TO RELATED APPLICATIONS

This application claims the benefit of priority from U.S. Provisional Application Ser. No. 62/280,897, filed Jan. 20, 2016, and entitled "Control Architecture With Improved Transient Response" and U.S. Provisional Application Ser. No. 62/280,878, filed Jan. 20, 2016, and entitled "Fast Transient Power Supply With a Separated High Frequency and Low Frequency Path Signals," which are incorporated by reference herein in their entirety.

BACKGROUND

A power supply system includes a power source, a load device, and a power interface device connecting the electrical power source to the load device. The power source may include a battery, a power grid, a solar photovoltaic cell, an AC generator, and/or an output of front-end power converter. The power interface device may be configured to increase or decrease the voltage of the power source to provide a suitable voltage for the load device. The power interface device may be a boost converter or a buck converter or any other converter. The load device may include a resistive load, a magnetic load, a capacitive load, a heater. In one implementation, the load device may be a low voltage but a high current load device such as, for example, computer central processing unit (CPU). This type of load device may have many load transient conditions.

During a load transient condition, the current of the load device may substantially change within a very short time period. For example, during the transient condition, the current of the load device may increase from 0 A to 100 A, or decrease from 100 A to 0 A, in less than one microsecond. These sudden changes in current can create large voltage variation at the load device and can cause the output voltage to swing outside of the regulated operating window of the load device.

To minimize transient variations, in one implementation, a large power capacitor may be added to the output of the power supply system. The capacitor may source or sink the necessary current during the transient condition and therefore reduce voltage variation caused by the load transient. To this end, the output capacitor is useful in supplementing the converter's slowly rising current to meet the increase in current demand from the load device. Similarly, the output capacitor is useful in sinking the current to meet the sudden decrease in current from the load device. Capacitors, however, are expensive and as such may increase cost or size of the system.

In another implementation, the converter may be pushed to run at a higher bandwidth to respond to a load transient quickly. However, a switching mode converter bandwidth is limited by its switching frequency. Therefore, to push the converter to run at the higher bandwidth, the converter has to operate at a higher switching frequency. This means more power loss because each time there is a turn on/off of the switch, there is a power loss. As such, the power supply system is also limited by the power loss of the power converter placed between the power source and the load device.

Hence, a need exists for a power supply system capable of providing a fast response to the transient condition of the load device while increasing the efficiency and reducing costs and size.

SUMMARY

In one general aspect, the instant application describes a power interface device coupled to a power source at an input terminal and a load device at an output terminal and configured to change a voltage of the power source to correspond a voltage associated with the load device. The power interface device includes a main switching converter coupled to an input terminal and an output terminal and configured to operate at a first switching frequency to source current from the input terminal to the output terminal; an auxiliary switching converter coupled to the input terminal and the output terminal in parallel with the main switching converter and configured to operate at a second and higher switching frequency than the first switching frequency to source current from the input terminal to the output terminal; a feedback and compensation circuit configured to detect a transient condition at the output terminal and output a transient signal based on the detected transient condition; a main control circuit including a low pass filter configured to receive the transient signal and output a lower frequency component of the transient signal, the main control circuit configured to generate a main control signal based on the lower frequency component of the transient signal for controlling the main switching converter; an auxiliary control circuit including a high pass filter configured to receive the transient signal and output a higher frequency component of the transient signal, the auxiliary control circuit configured to generate an auxiliary control signal based on the higher frequency component of the transient signal for controlling the auxiliary switching converter; and a common buffer commonly shared by the main control circuit and the auxiliary control circuit. The common buffer includes an input terminal and an output terminal. The input terminal of the common buffer is connected to the feedback and compensation circuit. The output terminal of the common buffer is connected to the high pass filter and the low pass filter.

The above general aspect may include one or more of the following features. For example, the feedback and compensation circuit may include: a feedback sense circuit configured to sense an output voltage at the output terminal; an error amplifier configured to receive the sensed output voltage and a reference voltage and output the transient signal based on the sensed output voltage and the reference voltage; and a compensation circuit configured to receive the transient signal and output a frequency compensated transient signal to the common buffer. The feedback sense circuit may include a plurality of resistors and capacitors configured to sense the output voltage and generate a feedback voltage. The error amplifier may be configured to receive the feedback voltage and the reference voltage, and generate the transient signal when the feedback voltage and the reference voltage are not substantially equal to each other.

The compensation circuit may include a first capacitor, a second capacitor, and a resistor. The first capacitor may be connected at one end to an output terminal of the error amplifier and at another end being connected to a ground terminal. The second capacitor may be connected in series with the resistor forming a series capacitor-resistor network. The series capacitor-resistor network may be connected at one end to the ground terminal and at another end to the output terminal of the error amplifier.

The common buffer may be configured to isolate the main control circuit and the auxiliary control circuit from an impedance of the feedback and compensation circuit. The main control circuit may further include a main comparator configured to compare the lower frequency component of the transient signal with a sensed low frequency inductor signal sourced by the main switching converter and generate the main control signal for controlling the main switching converter. The main control signal may enable the main switching converter to source to the output terminal a low frequency current tracking the lower frequency component of the transient signal.

The low pass filter may include a resistor and a capacitor. The resistor of the low pass filter may be connected at one end to the common buffer and at another end to the capacitor of the low pass filter and a non-inverting terminal of the main comparator. The capacitor of the low pass filter may be connected at one end to the resistor of the low pass filter and the non-inverting terminal of the main comparator and at another end is connected to the ground terminal.

The auxiliary control circuit may further include an auxiliary comparator configured to compare the higher frequency component of the transient signal with a sensed high frequency inductor signal sourced by the auxiliary switching converter and generate the auxiliary control signal for controlling the auxiliary switching converter. The auxiliary control signal may enable the auxiliary switching converter to source to the output terminal a high frequency current tracking the higher frequency component of the transient signal.

The high pass filter may include a resistor and a capacitor. The capacitor of the high pass filter may be connected at one end to the common buffer and at another end to the resistor of the high pass filter and a non-inverting terminal of the auxiliary comparator. The resistor of the high pass filter may be connected at one end to the capacitor of the high pass filter and the non-inverting terminal of the auxiliary comparator and at another end is connected to the ground terminal.

The main switching converter and the auxiliary switching converter may include step-down, current mode, switching regulators configured to convert a higher input voltage of the input terminal to a lower output voltage of the output terminal. The main switching converter may include a first main switch, a second main switch, a main inverter, and a main inductor. A drain of the first main switch may be connected to the input terminal; a source of the first main switch may be connected to a main node; and a gate of the first main switch may be connected to the main control circuit and configured to receive the main control signal. A drain of the second main switch may be connected to the main node; a source of the second main switch may be connected to the ground terminal; and a gate of the second main switch may be connected to the main inverter and configured to receive an inverse of the main control signal.

The auxiliary switching converter may include a first auxiliary switch, a second auxiliary switch, an auxiliary inverter, and an auxiliary inductor. A drain of the first auxiliary switch may be connected to the input terminal; a source of the first auxiliary switch may be connected to an auxiliary node; and a gate of the first auxiliary switch may be connected to the auxiliary control circuit and configured to receive the auxiliary control signal. A drain of the second auxiliary switch may be connected to the auxiliary node; a source of the second auxiliary switch may be connected to the ground terminal; and a gate of the second auxiliary switch may be connected to the auxiliary inverter and configured to receive an inverse of the auxiliary control signal.

The main switching converter may be configured to source to the output terminal low frequency current during the transient condition and outside the transient condition. The auxiliary switching converter may be configured to source to the output terminal high frequency current during the transient condition and substantially zero average current outside the transient condition. The transient condition may include a sudden increase or decrease in load current, or a sudden increase or decrease of an output voltage. The first and second main switches and the first and second auxiliary switches may include FET switches.

In another general aspect, the instant application describes another power interface device comprising a main switching converter coupled to an input terminal and an output terminal and configured to operate at a first switching frequency to source current from the input terminal to the output terminal; an auxiliary switching converter coupled to the input terminal and the output terminal in parallel with the main switching converter and configured to operate at a second and higher switching frequency than the first switching frequency to source current from the input terminal to the output terminal; a feedback and compensation circuit coupled to the output terminal and configured to detect a transient condition at the output terminal and output a transient signal based on the detected transient condition; a main control circuit coupled to the feedback and compensation circuit and the main switching converter and configured to receive the transient signal from the feedback and compensation circuit and to generate a main control signal based on the transient signal for controlling the main switching converter; a low pass filter coupled to the feedback and compensation circuit and configured to receive the transient signal from the feedback and compensation circuit and output a lower frequency component of the transient signal; an adder circuit coupled to the low pass filter and the feedback and compensation circuit and configured to receive the lower frequency component of the transient signal from the low pass filter and the transient signal from the feedback and compensation circuit and output a higher frequency component of the transient signal; and an auxiliary control circuit coupled to the adder circuit and the auxiliary switching converter and configured to receive the higher frequency component of the transient signal and generate an auxiliary control signal based on the higher frequency component of the transient signal for controlling the auxiliary switching converter.

The above general aspect may include one or more of the following features. The adder circuit may be configured to receive the lower frequency component of the transient signal from the low pass filter at its inverting terminal and the transient signal from the feedback and compensation circuit at its non-inverting terminal, subtract the lower frequency component of the transient signal from the transient signal, and output the higher frequency component of the transient signal to the auxiliary control circuit.

The power interface device may further include a common buffer commonly shared by the main control circuit and the auxiliary control circuit and configured to isolate the main control circuit and the auxiliary control circuit from an impedance of the feedback and compensation circuit. The low pass filter may include a resistor and a capacitor. The resistor may be coupled to an output terminal of the feedback and compensation circuit at one end and to a first node at a second end. The capacitor may be connected to the first node at one end and to a ground terminal at another end. The adder circuit may be coupled to the first node at its inverting terminal and to the output terminal of the feedback and compensation circuit at its non-inverting terminal and configured to receive the lower frequency component of the transient signal from the low pass filter at the inverting terminal and the transient signal at the non-inverting terminal and output the higher frequency component of the transient signal to the auxiliary control circuit.

The power interface device may further include a plurality of resistors configured to provide a gain factor for the higher frequency component of the transient signal; and an offset voltage source configured to offset high frequency current sourced by the auxiliary switching converter outside the transient condition during a steady state to enable sourcing substantially zero average current from the auxiliary switching converter. The plurality of resistors may include a first resistor connected to the non-inverting terminal of the adder circuit and a second resistor connected to the inverting terminal of the adder circuit. The offset voltage source may be coupled to the non-inverting terminal of the adder circuit through the first resistor.

In another general aspect, the instant application describes a power interface device comprising: a main switching converter coupled to an input terminal and an output terminal and configured to operate at a first switching frequency to source current from the input terminal to the output terminal; an auxiliary switching converter coupled to the input terminal and the output terminal in parallel with the main switching converter and configured to operate at a second and higher switching frequency than the first switching frequency to source current from the input terminal to the output terminal; a feedback and compensation circuit coupled to the output terminal and configured to detect a transient condition at the output terminal and output a transient signal based on the detected transient condition; a high pass filter coupled to the feedback and compensation circuit and configured to receive the transient signal from the feedback and compensation circuit and output a higher frequency component of the transient signal; an adder circuit coupled to the high pass filter and the feedback and compensation circuit and configured to receive the higher frequency component of the transient signal from the high pass filter and the transient signal from the feedback and compensation circuit and output a lower frequency component of the transient signal; a main control circuit coupled to the adder circuit and to the main switching converter and configured to generate a main control signal based on the lower frequency component of the transient signal for controlling the main switching converter; and an auxiliary control circuit coupled to the high pass filter and the auxiliary switching converter and configured to generate an auxiliary control signal based on the higher frequency component of the transient signal for controlling the auxiliary switching converter.

In another general aspect, the instant application describes a power interface device comprising: a main switching converter coupled to a first input terminal and an output terminal and configured to operate at a first switching frequency to source current from the first input terminal to the output terminal; an auxiliary switching converter coupled to a second input terminal and the output terminal and configured to operate at a second and higher switching frequency than the first switching frequency to source current from the second input terminal to the output terminal; a feedback and compensation circuit coupled to the output terminal and configured to detect a transient condition at the output terminal and output a transient signal based on the detected transient condition; a main control circuit coupled to the feedback and compensation circuit and the main switching converter and configured to receive the transient signal from the feedback and compensation circuit and to generate a main control signal based on the transient signal for controlling the main switching converter; and an auxiliary control circuit including a first gain buffer coupled to the feedback and compensation circuit and configured to amplify the transient signal received from the feedback and compensation circuit, a high pass filter coupled to the first gain buffer and configured to receive the amplified transient signal from the first gain buffer and output a higher frequency component of the amplified transient signal, and an auxiliary comparator coupled to the high pass filter and configured to receive the higher frequency component of the transient signal at a first terminal and a sensed high frequency inductor signal sourced by the auxiliary switching converter at a second terminal and generate an auxiliary control signal based on comparison result of the higher frequency component and the sensed high frequency inductor signal for controlling the auxiliary switching converter.

The above general aspect may include one or more of the following features. The power interface device further may include an offset voltage source coupled to the high pass filter and configured to offset high frequency current sourced by the auxiliary switching converter to enable sourcing substantially zero average current from the auxiliary switching converter outside of the transient condition.

A power supply system may include a first power source coupled to the first input terminal; a second power source coupled to the second input terminal; a load device coupled to the output terminal. The power interface device described above may be coupled to the first and second power sources and the load device and configured to adjust a voltage of the first power source to correspond to a voltage of the load device. The first power source is coupled to the main switching converter. The second power source may be coupled to the auxiliary switching converter and may be independent from the first power source. The second power source may include a capacitor.

The power supply system may further include an input source feedback and regulation circuit connected at one end to the second power source and at another end to the auxiliary control circuit for controlling the auxiliary switching converter. The input source feedback and regulation circuit may include a feedback voltage sense circuit, an error amplifier, and a compensation circuit. The feedback voltage sense circuit may be configured to sense the voltage of the second power source through a network of first and second resistors and output a feedback voltage to an inverting terminal of the error amplifier. The first resistor may be coupled to the second power source at one end and at another end is coupled to the inverting terminal of the error amplifier and to the second resistor. The second resistor may be coupled to the inverting terminal of the error amplifier and to the first resistor at one end and at another end is coupled to the ground terminal. The error amplifier may be configured to monitor the feedback voltage received at the inverting terminal of the error amplifier and a reference voltage received at an non-inverting terminal of the error amplifier and output a control signal when the feedback voltage is not substantially equal to the reference voltage.

The compensation circuit may include a first and second capacitors and a resistor. The first capacitor may be connected at one end to an output of the error amplifier and at another end to the ground terminal. The resistor of the compensation circuit may be connected at one end to the output of the error amplifier and at another end to the second capacitor. The second capacitor at one end may be connected to the resistor of the compensation circuit and at another end to the ground terminal.

The auxiliary control circuit may further include a second inverting gain buffer having an input terminal and an output terminal. The input terminal of the second gain buffer may be connected to the output terminal of the error amplifier, which regulates a voltage of the second power source. The output terminal of the second gain buffer may be connected to the high pass filter. When the voltage of the second power source falls below the reference voltage, the error amplifier may increase the control signal, thereby decreasing signal on the first terminal of the auxiliary comparator through the second gain buffer which in turn results in current flowing from the output terminal through the auxiliary switching converter to the second power source to charge the second power source.

In another general aspect, the instant application describes a power interface device comprising: a main switching converter coupled to an input terminal and an output terminal and configured to operate at a first switching frequency to source current from the input terminal to the output terminal; an auxiliary switching converter coupled to the input terminal and the output terminal in parallel with the main switching converter and configured to operate at a second and higher switching frequency than the first switching frequency to source current from the input terminal to the output terminal; a feedback and compensation circuit coupled to the output terminal and configured to detect a transient condition at the output terminal and output a transient signal based on the detected transient condition; a first buffer coupled to an output terminal of the feedback and compensation circuit; a low pass filter including a resistor and a capacitor, wherein the resistor is coupled to an output terminal of the first buffer at one end and to a first node at another end and the capacitor is coupled to the first node at one end and to a ground terminal at another end; a main control circuit including a main comparator circuit having a first input terminal and a second input terminal.

The first input terminal is coupled to the first node. The second input terminal is coupled to a sensed inductor current signal of the main switching converter. The main comparator circuit is configured to receive a lower frequency component of the transient signal from the low pass filter at the first input terminal and sensed inductor current signal at the second input terminal and generate a main control signal based on the lower frequency component of the transient signal for controlling the main switching converter. The auxiliary control circuit includes a gain buffer and an auxiliary comparator having a first input terminal and a second input terminal. The gain buffer includes an inverting terminal coupled to the output of the first buffer and a noninverting terminal coupled to the first node and configured to output a higher frequency component of the transient signal to the first input terminal of the auxiliary comparator. The auxiliary comparator is configured to compare the higher frequency component of the transient signal received at the first input terminal and a sensed high frequency inductor current sourced by the auxiliary switching converter and received at the second input terminal and generate an auxiliary control signal for controlling the auxiliary switching converter.

The above general aspect may include one or more of the following features. During a load step up transient condition, the auxiliary comparator may generate a high auxiliary control signal for sourcing high frequency current from the input terminal to the output terminal to improve transient response and reduce output voltage ripple due to the transient condition and the main comparator generates a high main control signal for sourcing low frequency current from the input terminal to the output terminal. The high frequency current may track the higher frequency component of the transient signal. The low frequency current may track the lower frequency component of the transient signal.

During a load step up transient condition, the auxiliary comparator may generate a high auxiliary control signal for sourcing high frequency current from the input terminal to the output terminal to improve transient response and reduce output voltage ripple due to the transient condition and the main comparator generates a high main control signal for sourcing low frequency current from the input terminal to the output terminal. The high frequency current may track the higher frequency component of the transient signal. The low frequency current may track the lower frequency component of the transient signal.

In another general aspect, the instant application describes a power interface device comprising: a main switching converter coupled to an input terminal and an output terminal and configured to operate at a first switching frequency to source current from the input terminal to the output terminal; an auxiliary switching converter coupled to the input terminal and the output terminal in parallel with the main switching converter and configured to operate at a second and higher switching frequency than the first switching frequency to source current from the input terminal to the output terminal; a feedback and compensation circuit coupled to the output terminal and configured to detect a transient condition at the output terminal and output a transient signal based on the detected transient condition; a main control circuit configured to receive the transient signal from the feedback and compensation circuit and generate a main control signal based on the transient signal for controlling the main switching converter; and an auxiliary control circuit configured to receive a higher frequency component of the transient signal from the feedback and compensation circuit and generate an auxiliary control signal based on the higher frequency component of the transient signal for controlling the auxiliary switching converter.

The feedback and compensation circuit includes: a feedback sense circuit configured to sense an output voltage at the output terminal and generate a feedback voltage, an error amplifier configured to receive the feedback voltage and a reference voltage and output the transient signal based on the sensed output voltage and the reference voltage, and a compensation circuit including a first capacitor, a second capacitor, and a resistor, the first capacitor coupled to an output of the error amplifier at one end and to a ground terminal at another end, the second capacitor coupled to the output of the error amplifier at one end and to the resistor at another end, the resistor coupled to the second capacitor at one end and to the ground terminal at another end. The auxiliary control circuit includes an auxiliary comparator configured to receive a higher frequency component of the transient signal from across the resistor and sensed high frequency inductor current from the auxiliary switching converter and output the auxiliary control signal for controlling the auxiliary switching converter.

In another general aspect, the instant application describes a power interface device comprising: a main switching converter coupled to an input terminal and an output terminal and configured to operate at a first switching frequency to source current from the input terminal to the output terminal; an auxiliary switching converter coupled to the input terminal and the output terminal and configured to operate at a second and higher switching frequency than the first switching frequency to source current from the input terminal to the output terminal; a feedback and compensation circuit coupled to the output terminal and configured to detect a transient condition at the output terminal and output a transient signal based on the detected transient condition; a main control circuit coupled to the feedback and compensation circuit and the main switching converter and configured to generate a main control signal based on the transient signal for controlling the main switching converter; a resistor-capacitor ("RC") and adder network coupled to the feedback and compensation circuit and configured to receive the transient signal from the feedback and compensation circuit and output a higher frequency component of the transient signal; and an auxiliary control circuit coupled to the RC and adder network and the auxiliary switching converter and configured to receive the higher frequency component of the transient signal and generate an auxiliary control signal based on the higher frequency component of the transient signal for controlling the auxiliary switching converter.

The above general aspect may include one or more of the following features. The RC and adder network may include a high pass filter and an adder circuit. The high pass filter may be coupled to the feedback and compensation circuit and configured to receive the transient signal from the feedback and compensation circuit and output the higher frequency component of the transient signal to the auxiliary control circuit. The adder circuit may be coupled to the high pass filter and the feedback and compensation circuit and configured to receive the higher frequency component of the transient signal from the high pass filter and the transient signal from the feedback and compensation circuit and output a lower frequency component of the transient signal to the main control circuit. The main control circuit may be configured to generate the main control signal based on the lower frequency component of the transient signal.

The RC and adder network may include a low pass filter and an adder circuit. The low pass filter may be coupled to the feedback and compensation circuit and configured to receive the transient signal from the feedback and compensation circuit and output a lower frequency component of the transient signal. The adder circuit may be coupled to the low pass filter and the feedback and compensation circuit and configured to receive the lower frequency component of the transient signal from the low pass filter and the transient signal from the feedback and compensation circuit and output the higher frequency component of the transient signal to the auxiliary control circuit.

In another general aspect, the instant application describes a power supply system comprising: a main switching converter coupled to a first input terminal and an output terminal and configured to operate at a first switching frequency to source current from the first input terminal; an auxiliary switching converter coupled to a second input terminal and configured to operate at a second and higher switching frequency than the first switching frequency to source current from the second input terminal; a main control loop at one end coupled to the output terminal and at another end coupled to the main switching converter and configured to detect a transient condition at the output terminal and generate a main control signal based on the detected transient condition for controlling the main switching converter; and an auxiliary control loop coupled to the auxiliary switching converter and configured to detect a transient condition and generate an auxiliary control signal based on the detected transient condition for controlling the auxiliary switching converter. The auxiliary control loop includes an auxiliary feedback and compensation circuit, a first gain buffer, a high pass filter, and an auxiliary comparator. The auxiliary feedback and compensation circuit is configured to detect the transient condition and output an auxiliary transient signal based on the detected transient condition. The first gain buffer is coupled to the auxiliary feedback and compensation circuit and configured to amplify the auxiliary transient signal received from the auxiliary feedback and compensation circuit. The high pass filter is coupled to the first gain buffer and configured to receive the amplified auxiliary transient signal from the first gain buffer and output a higher frequency component of the amplified auxiliary transient signal. The auxiliary comparator is coupled to the high pass filter and configured to receive the higher frequency component of the auxiliary transient signal at a first terminal and a sensed high frequency inductor signal sourced by the auxiliary switching converter at a second terminal and generate the auxiliary control signal based on comparison result of the higher frequency component and the sensed high frequency inductor signal for controlling the auxiliary switching converter.

The above general aspect may include one or more of the following features. The main control loop may include: a main feedback and compensation circuit coupled to the output terminal and configured to detect the transient condition at the output terminal and output a main transient signal based on the detected transient condition, and a main comparator coupled to the main feedback and compensation circuit and the main switching converter and configured to receive the main transient signal from the main feedback and compensation circuit and generate the main control signal based on the main transient signal for controlling the main switching converter.

The auxiliary switching converter at one end may be coupled to the output terminal and at another end may be coupled to the second input terminal. The auxiliary feedback and compensation circuit may be coupled to the output terminal and configured to detect the transient condition at the output terminal and output the auxiliary transient signal based on the detected transient condition.

The auxiliary control loop may further include a second inverting gain buffer including an input terminal and an output terminal. The output terminal of the second gain buffer may be connected to the high pass filter.

The power supply system may also include an input source feedback and regulation circuit connected at one end to the second input terminal and at another end to the input of the second gain buffer for controlling the auxiliary switching converter. The input source feedback and regulation circuit may include a feedback voltage sense circuit, an error amplifier, and a compensation circuit. The feedback voltage sense circuit may be configured to sense the voltage at the second input terminal through a network of first and second resistors and output a feedback voltage to an inverting terminal of the error amplifier. The first resistor may be coupled to the second input terminal at one end and at another end may be coupled to the inverting terminal of the error amplifier and to the second resistor. The second resistor may be coupled to the inverting terminal of the error amplifier and to the first resistor at one end and at another end may be coupled to the ground terminal. The error amplifier may be configured to monitor the feedback voltage received at the inverting terminal of the error amplifier and a reference voltage received at an non-inverting terminal of the error amplifier and output a control signal when the feedback voltage is not substantially equal to the reference voltage. The input terminal of the second gain buffer may be connected to the output of the error amplifier which regulates the voltage at the second input terminal.

The compensation circuit may include a first and second capacitors and a resistor. The first capacitor may be connected at one end to an output of the error amplifier and at another end to the ground terminal. The resistor of the compensation circuit may be connected at one end to the output of the error amplifier and at another end to the second capacitor, and the second capacitor at one end may be connected to the resistor of the compensation circuit and at another end to the ground terminal.

When the voltage at the second input terminal falls below the reference voltage, the error amplifier may increase the control signal, thereby decreasing signal on the first terminal of the auxiliary comparator through the second gain buffer which in turn results in current flowing from the output terminal through the auxiliary switching converter to an auxiliary power source connected to the second input terminal to charge the auxiliary power source. The auxiliary power source may include a capacitor.

The power supply system may further include a main power source coupled to the first input terminal; an auxiliary power source coupled to the second input terminal; and a load device coupled to the output terminal. The main power source may be coupled to the main switching converter. The auxiliary power source may be coupled to the auxiliary switching converter and may be independent from the first power source. The main switching converter may be configured to change a voltage of the main power source to correspond to a voltage of the load device.

The auxiliary switching converter may be placed on a same packing as the load device. The auxiliary switching converter may be connected at one end to the first input terminal and at another end is connected to the second input terminal. The auxiliary feedback and compensation circuit may be coupled to the first input terminal and configured to detect the transient condition at the first input terminal and output the auxiliary transient signal based on the detected transient condition at the first input terminal. The transient condition at the first input terminal may include temporary loss of voltage at the first input terminal.

BRIEF DESCRIPTION OF DRAWINGS

The drawing figures depict one or more implementations in accord with the present teachings, by way of example only, not by way of limitation. In the figures, like reference numerals refer to the same or similar elements.

FIG. 14A illustrates another exemplary power supply system including two separate control signals for driving the main switching converter and the auxiliary switching converter;

FIGS. 18A-18C illustrate exemplary load transient simulation waveforms for the power supply system controlled by the feedback control mechanism shown in FIG. 17;

FIGS. 20A-20C illustrate exemplary load transient simulation waveforms for the power supply system controlled by the feedback control mechanism shown in FIG. 19;

FIGS. 28A-28D illustrate simulation waveforms for the circuit diagram shown in FIG. 27;

FIGS. 32B-32E illustrate waveforms of the power supply system shown in FIG. 32A in response to the input voltage source of the main power source come temporary disconnected;

FIG. 34A1-34A3 illustrate simulation waveforms of a conventional supply having a large input voltage ripple caused by load transient;

FIG. 34B1-34B3 illustrate simulation waveform of a power supply system shown in FIG. 33, which is configured to reduce the input voltage ripple during load transient;

FIG. 35 illustrates another exemplary power supply system for which current or voltage transient is predictable by the load device or the application system.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuit have been described at a relatively high-level, without detail, in order to avoid unnecessarily obscuring aspects of the present teachings.

There is a continuing search for a power supply system having a fast response to a transient condition at a load device with an improved efficiency while reducing solution size and cost and increasing supply power density. The load device may have different power requirements. This naturally means the power supply system may have to run as efficient as possible both to reduce size and to reduce input power to save energy and increase efficiency. To this end, the power supply system may include a main switching converter and an auxiliary switching converter running in parallel with each other. The main switching converter may run at a first switching frequency and the auxiliary switching converter may run at a second switching frequency. The second switching frequency may be higher than the first switching frequency. Therefore, the main switching converter may have a higher efficiency (e.g., less power switching loss) than that of the auxiliary switching converter. In contrast, the auxiliary switching converter may have a better transient performance (e.g., a faster transient response) than that of the main switching converter in response to a transient at the load device. Since the auxiliary switching converter may have a higher switching loss than that of the main switching converter, the auxiliary switching converter may not be utilized to provide the main low frequency power to the load device during steady-state operation. Instead, the auxiliary switching converter may only be used to deal with the transients to sink or source additional current with sudden increase or decrease in the load current.

Figure 1:
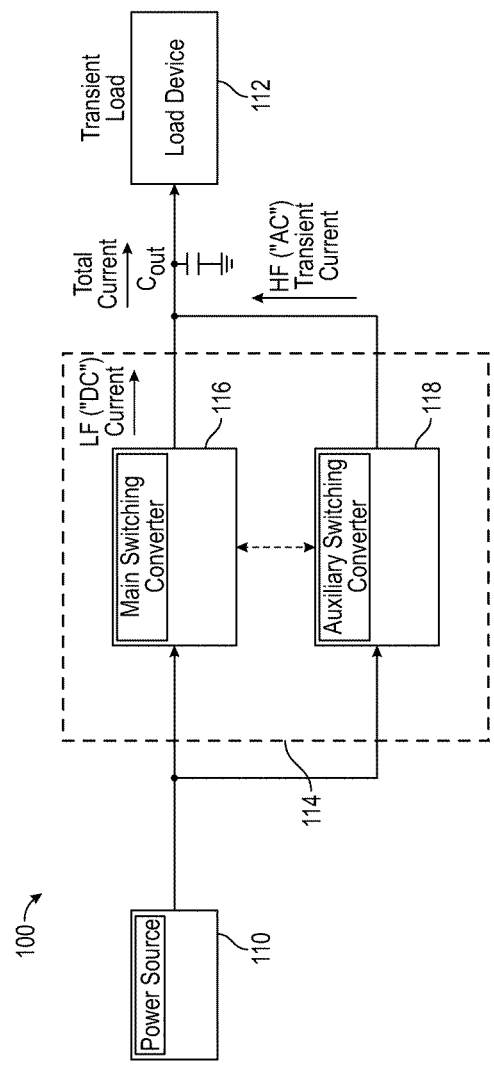
FIG. 1 illustrates an exemplary power supply system configured to have a fast transient response and a high efficiency.

FIG. 1 illustrates an exemplary power supply system 100 configured to have a fast transient response and a high efficiency. The power supply system 100 includes a power source 110, a load device 112, and a power interface device 114 coupled to the power source 110 and the load device 112. The power source 110 is configured to output a certain standard voltage. To this end, the power source 110 may be an electrical outlet. Most single phase alternating-current electrical outlets in the world supply power at 210-240 V or at 100-120 V. Alternatively, the power source 110 may include other types of power sources such as, for example, a battery, a solar photovoltaic, an AC generator, or a DC output voltage of a front-end power supply. Regardless of the type of the power source 110, usually the power source 110 provides a voltage different than the required voltage for the load device 112. The provided voltage may be higher or lower than the required voltage for the load device 112. To match the source voltage to the load voltage, the power supply system 100 includes the power interface device 114.

The power interface device 114 is configured to change the voltage of the power source 110 to an appropriate voltage for the load device 112. As noted above, the appropriate voltage for the load device 112 may be higher or lower than the voltage of the electrical power source 110. In one implementation, the appropriate voltage for the load device 112 is lower than the voltage of the electrical power source 110. In one specific example, the power interface device 114 is configured to reduce the voltage of the electrical power source 110 from 12 volts to 1 volt for the load device 112.

The load device 112 may include a resistive load, a magnetic load, a capacitive load, a heater, or modern electronic devices. Most modern electronic devices require between 0.5 and 24 volts DC. These devices can work either from batteries or mains. In either case, the power interface device 114 may be used to match the voltage requirements of these electronic devices with the voltage provided from the power source 110. The power interface device 114 may be internal to the load device 112 or may be external to the load device 112. Similarly, the power interface device 114 may be internal to the power source 110 or may be external to the power source 110.

The power interface device 114 may include a transformer, a rectifier, or switched-mode power supplies. The switched-mode power supplies have become widespread and are smaller and lighter because of their good efficiency and high switching frequency. Additionally, because switched-mode power supplies are typically rectified to operate at a DC voltage, they are minimally affected by the frequency of the mains (50 vs 60 Hz). The foregoing description assumes that power interface device 114 includes switched-mode power supplies; however, as noted above, the power interface device 114 may include circuits other than the switched-mode power supplies.

The power interface device 114 includes two switched-mode power converters, a main switching converter 116 and an auxiliary switching converter 118. The main switching converter 116 may run in parallel to the auxiliary switching converter 118 and at a lower switching frequency (fsw) for good efficiency and may source a lower frequency current to the load device 112. The auxiliary switching converter 118 may run at a higher switching frequency (fsw) to source fast transient higher frequency current to the load device 112. Due to the higher switching frequency (fsw), the auxiliary switching converter 118 may be less efficient or otherwise have more power loss than the main switching converter 116. Therefore, the auxiliary switching converter 118 may not be used to handle the main low frequency power to the load device 112. To this end, the low frequency current of the auxiliary switching converter 118 should be minimized for good efficiency and low thermal stress. Instead, the auxiliary switching converter 118 may be used only to deal with the transients of the load device 112 to sink or source additional current with sudden increase or decrease in the load current.

The power supply system 100 may have smaller size or be more efficient than the previously discussed power supply system using only capacitors or running only the main converter at a higher frequency. The power supply system 100 can reduce the size of the capacitor needed on the output and as a result reduce supply size, PCB area and costs.

The switching converters 116 and 118 may be controlled in several ways. For example, the switching converters 116 and 118 may be controlled via a non-linear control mechanism. Alternatively, the switching converters 116 and 118 may be controlled via a linear control mechanism.

Figure 2A:
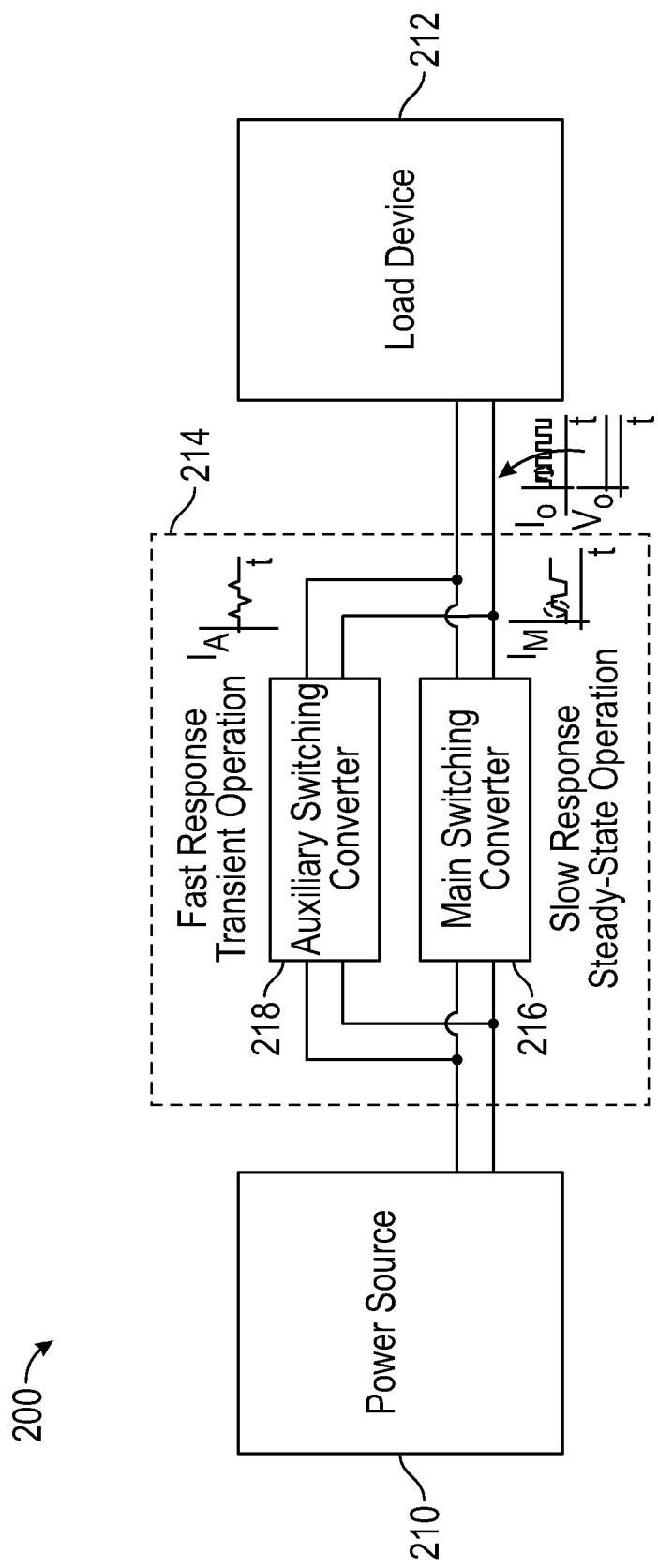
FIGS. 2A and 2B illustrate an exemplary power supply system including a main switching converter and an auxiliary switching converter.
Figure 2B:
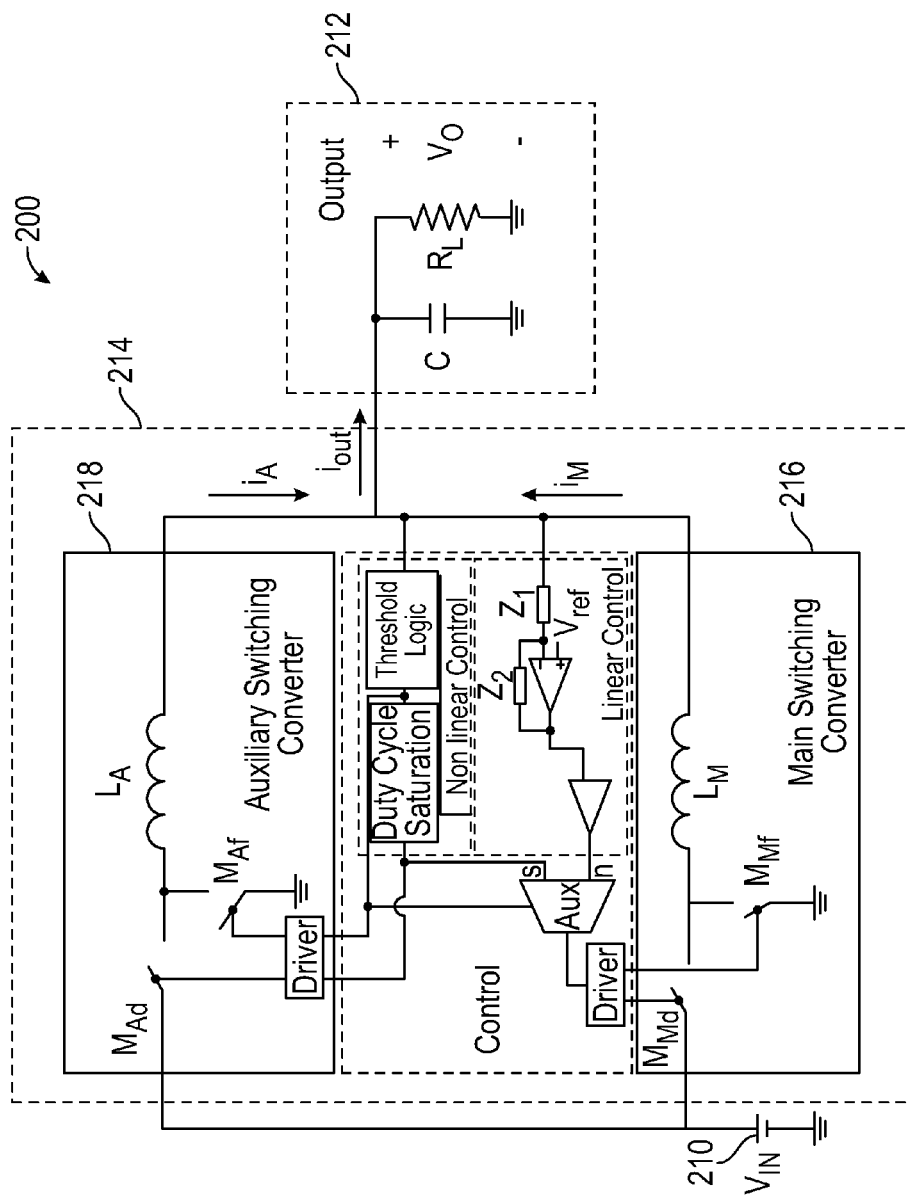

FIGS. 2A and 2B illustrate an exemplary power supply system 200 including a main switching converter and an auxiliary switching converter. The power supply system 200 employs a non-linear control mechanism for controlling the main switching converter and the auxiliary switching converter. The power supply system 200 includes a power source 210, a load device 212, and a power interface device 214 coupled to the power source 210 and the load device 212. The power source 210 and the load device 212 may be the same as the power source 110 and the load device 112 described with respect to FIG. 1 and therefore they are not described in more detail for brevity of description.

Similar to the power interface device 114, the power interface device 214 includes a main switching converter 216 and an auxiliary switching converter 218. The main switching converter 216 may include a slower switching frequency (fsw) than that of the auxiliary switching converter 218 and may be designed to work in steady-state operation. To this end, the main switching converter 216 may have good stability and low output voltage ripple, but consequently slow response to the transients at the load device 212. In contrast, the auxiliary switching converter 218 may be configured to source or sink current to or from the output terminal only during the transients. The main aim of the auxiliary switching converter 218 may be to provide a fast transient response by either sinking or sourcing current to address decrease or increase of the load current. The power supply system 200 is described in more detail in an IEEE publication, titled "The Fast Response Double Buck DC-DC Converter (FRDB): Operation and Output Filter Influence" by Andres Barrado Vol. 20, No. 6, November 2005, the content of which is incorporated herein by reference in its entirety.

FIG. 2B illustrates the exemplary components of the power supply system 200 in more detail. As shown, two buck topologies are used to implement the main switching converter 216 and the auxiliary switching converter 218, and a resistive load is used for the load device 212. The power supply system 200 may use a window comparator to detect if $V_{out}$ is outside of a regulation window. If so, the power supply system 200 turns on the auxiliary switching converter 218 to speed up transient response. If not, the power supply system 200 turns off the auxiliary switching converter 218 or maintains the auxiliary switching converter 218 in the off condition. Although the power supply system 200 provides faster transient response, the power supply system 200 requires an accurate window comparator, which is difficult to accomplish in practical applications if its $V_{out}$ window needs to be tight and it can be possibly falsely triggered by $V_{out}$ noise/ripple. Additionally, non-linear control may cause large auxiliary inductor current overshoot/undershoot and ringing.

Figure 3A:
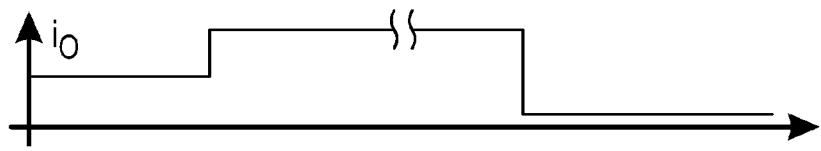
FIGS. 3(A)-3(E) illustrate exemplary waveforms associated with the power supply system shown in FIGS. 2A-2B.
Figure 3B:
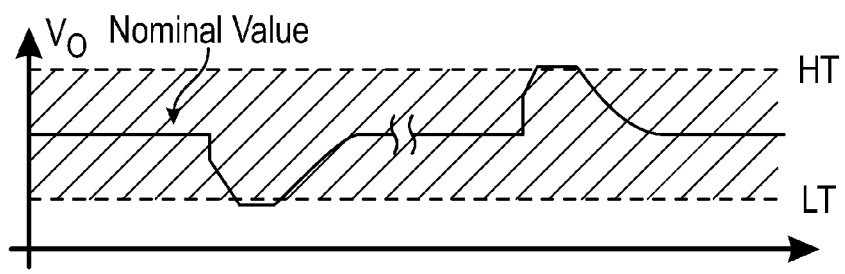
Figure 3C:
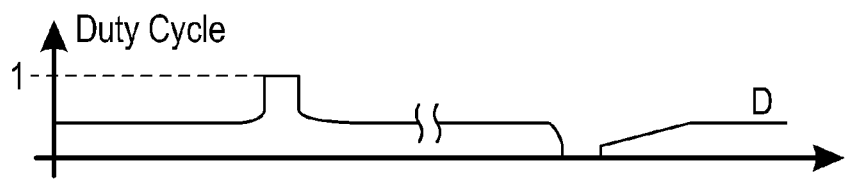
Figure 3D:
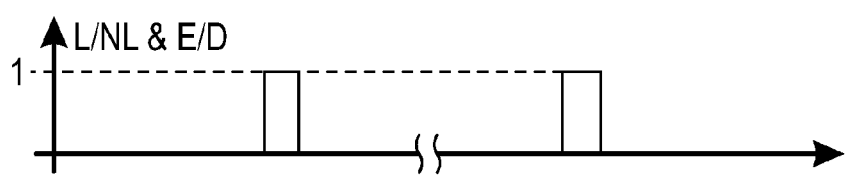
Figure 3E:
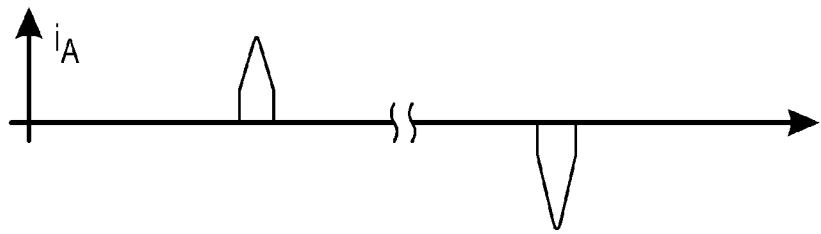

FIGS. 3(A)-3(E) illustrate exemplary waveforms associated with the power supply system 200 shown in FIGS. 2A-2B. Specifically, FIG. 3(A) illustrates a current load step in the load device 212 of the power supply system 200. FIG. 3(B) illustrates output voltage of the power supply 200 in response to the current load step of FIG. 3(A). As shown, in response to the load step of FIG. 3A, the voltage of capacitor reduces to supplement the inductor's slowly rising current to meet the increase in current demand from the load device 212. Similarly, the output capacitor is useful in sinking the current to meet the sudden decrease in current from the load device 212. FIG. 3(C) illustrates duty cycle of the auxiliary switching converter 218. As shown, once the output voltage falls outside of the regulation window, the auxiliary switching converter 218 is enabled to either source or sink current to the output with sudden increase or decrease in the load current. FIG. 3(D) illustrates L/NL & E/D signal for selecting between the auxiliary switching converter and the main switching converter. As shown, when the voltage falls outside of the regulation window, the L/NL & E/D signal enables the auxiliary switching converter 218 to either source or sink current to the output with sudden increase or decrease in the load current. FIG. 3(E) illustrates sourced or sunk current by the auxiliary switching converter 218 in response to sudden increase or decrease in the load current.

Figure 4:
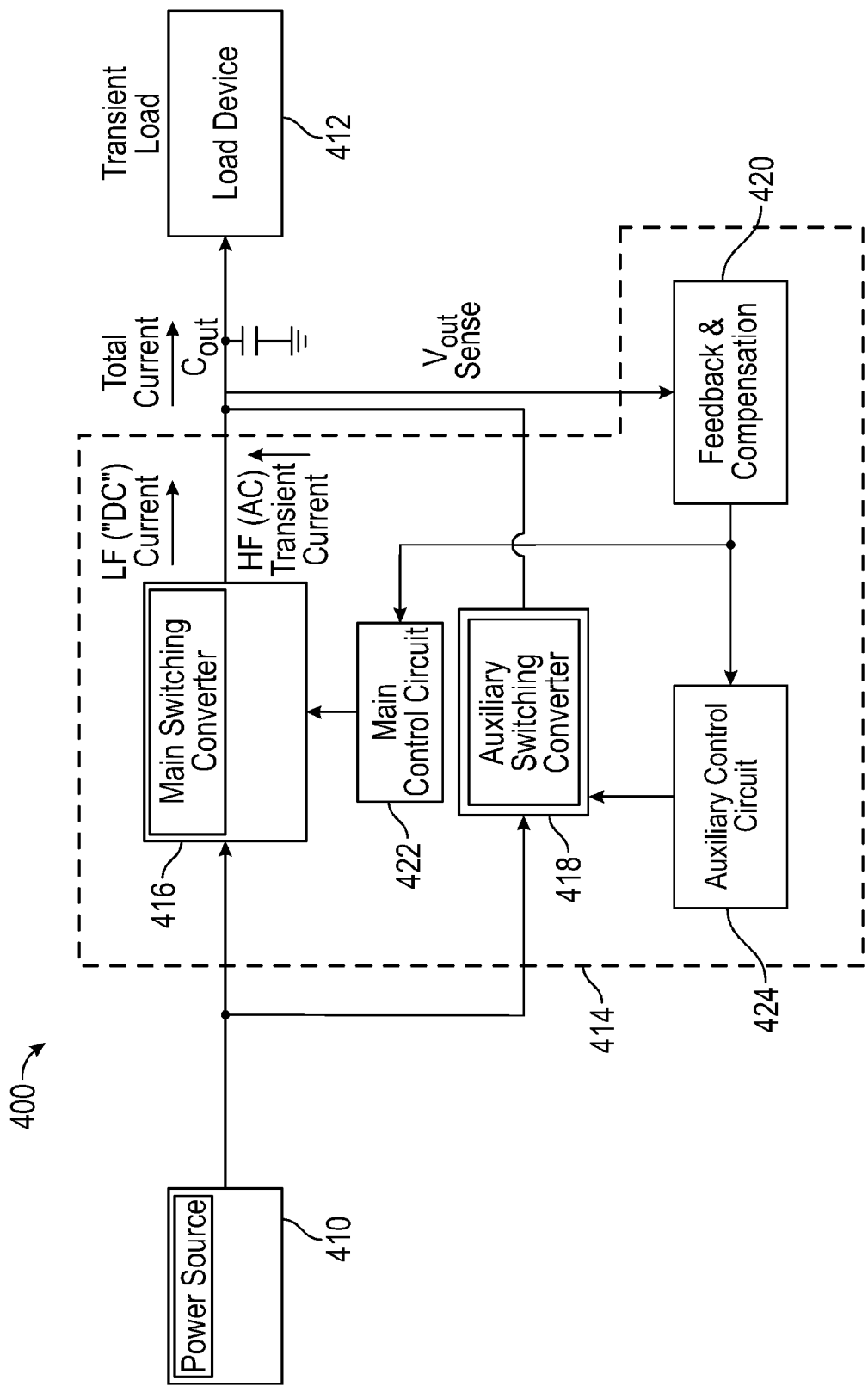
FIG. 4 illustrates another exemplary power supply system including a main switching converter and an auxiliary switching converter.

FIG. 4 illustrates another exemplary power supply system 400 including a main switching converter and an auxiliary switching converter. The power supply system 400 does not use non-linear control with $V_{out}$ transient detection as shown in FIG. 2. Instead, a linear control is used so it may be easier to design and optimize the power supply system 400. The power supply system 400 also does not need an additional power capacitor for separating the high frequency current from the low frequency current for driving the auxiliary switching converter. This can reduce the size and costs of the power supply system 400.

The power supply system 400 includes a power source 410, a load device 412 and a power interface device 414 coupled to the power source 410 and the load device 412. The power source 410 and the load device 412 are similar to the power source 110 and the load device 112. Therefore, for brevity of description, they are not described in more detail. The power interface device 414 includes a main switching converter 416, an auxiliary switching converter 418, a feedback and compensation circuit 420, a main control circuit 422, and an auxiliary control circuit 424.

The main switching converter 416 is connected in parallel with the auxiliary switching converter 418. The main switching converter 416 may be configured to source or sink only a low frequency current. To this end, the main switching converter 416 may be switching at a low frequency to maintain high efficiency of the main switching converter 416. The auxiliary switching converter 418 may be configured to source or sink only a high frequency current. To this end, the auxiliary switching converter 418 may be switching at a high frequency to achieve high loop bandwidth and track high frequency transient. In one specific example, low and high are relative terms with respect to each other. For example, the low switching frequency may correspond to any switching frequency lower than the high switching frequency.

The main switching converter 416 may configured to sink and/or source current both during the steady-state operation and the transient. Similarly, the auxiliary switching converter may operate both during the transient and outside of the transient in the steady-state operation. During the transient, the auxiliary switching converter 418 may source or sink high frequency current to respond to the sudden increase or decrease in the load current. During the steady-state condition, the auxiliary switching converter 418 may source or sink high frequency current with a zero average or low frequency current to reduce power loss associated with the auxiliary switching converter 418. In this manner, in the steady-state condition, the power loss associated with the low frequency current in the auxiliary switching converter 418 is reduced or eliminated and as such the total power loss in the auxiliary switching converter 418 is minimized. The auxiliary switching converter 418, however, may still experience a little switching power loss due to the switching of its switches in the steady-state condition.

The power interface device 414 also includes the feedback and compensation circuit 420. The feedback and compensation circuit 420 is connected at one end to the output terminal and at the other end to the main control circuit 422 and the auxiliary control circuit 424. The feedback and compensation circuit 420 is configured to detect transients at the load device 412 and generate a transient signal for controlling the switches in the main switching converter 416 and the auxiliary switching converter 418 based on the transient signal to provide a stable $V_{out}$ as quickly as possible.

The transient may include a scenario in which there is a sudden increase or decrease in the load current or voltage. To illustrate one example, during a 25 A current load step at the output, the transient may correspond to the beginning of the load step, where there is a sudden increase in the load current before reaching a first steady-state level at the increased level of 25 A. Similarly, the transient may correspond to the ending of the load step where there is a sudden decrease in the load current before reaching a second steady-state level. The second steady-state may correspond to a state prior to the 25 A current load step or to a new state higher or lower than the state prior to the 25 A current load step.

The transient signal is provided to the main control circuit 422 and the auxiliary control circuit 424. The transient signal includes a lower frequency component and a higher frequency component. The main control circuit 422 is configured to separate the lower frequency component of the transient signal from the total feedback compensation transient signal and drive the main switching converter 416 based on the lower frequency component to respond to the transient condition. The auxiliary control circuit 424 is configured to separate the higher frequency component of the transient signal from the total feedback compensation transient signal and drive the auxiliary switching converter 418 based on the higher frequency component to respond to the transient condition.

To illustrate one specific example, if there is a sudden increase in the load current due to a positive current load step (e.g., from 75 A to 100 A), the auxiliary control circuit 424 may drive the auxiliary switching converter 418 based on the higher frequency component of the transient signal. Specifically, the auxiliary control circuit 424 may issue a control signal to the auxiliary switching converter 418 to source high frequency current to the output terminal until the total output current reaches the desired level of 100 A. In response, the auxiliary switching converter 418 may operate with an increased duty cycle and increase the sourced high frequency current to the output terminal until the total output current reaches the desired level of 100 A. Due to its higher switching frequency and higher loop bandwidth, the auxiliary switching converter 418 may source current faster to the output terminal from the power source 410 than the main switching converter 416. The sourced high frequency current from the auxiliary switching converter 418 may include non-zero average low frequency (or DC) current and may track the higher frequency component of the transient signal.

Once the current at the output terminal reaches the desired level (e.g., 100 A) and the load device 412 reaches the steady-state condition, the auxiliary switching converter 418 may reduce its duty cycle to the original duty cycle. The auxiliary switching converter 418 may operate based on the original duty cycle and may source a zero average low frequency (or DC) current output. To this end, a current or voltage threshold level may be set for the auxiliary switching converter 418 in the steady-state operation such that the average low frequency (or DC) current of the auxiliary switching converter 218 associated with the high frequency current ripple is zero. As such, the average sourced current from the auxiliary switching converter 418 may be non-zero during the transient and substantially zero outside the transient during the steady-state operation. That is, once the transient ends (e.g., the new current threshold of 100 A is reached), the auxiliary switching converter 418 may sink or source substantially zero average low frequency (or DC) current.

In keeping with the previous example, if there is a sudden increase in the load current due to the positive current load step (e.g., from 75 A to 100 A), the main control circuit 422 may drive the main switching converter 416 based on the lower frequency component of the transient signal. Specifically, the main control circuit 422 may issue a control signal to the main switching converter 416 to source current to the output terminal until the total output current reaches the desired level of 100 A. In response, the main switching converter 416 may operate with an increased duty cycle and increase the sourced low frequency current to the output terminal until the total output current reaches the desired level of 100 A. The sourced current from the main switching converter 416 may track the lower frequency component of the transient signal. Once the transient ends (e.g., the new current threshold of 100 A is reached), the main switching converter 416 may continue to source and/or sink current to maintain the stability of $V_{out}$ in accordance with its fixed switching frequency and its original duty cycle. The duty cycle may be defined in accordance with Equation 1 below:

$$D = V_{out}/V_{in} \quad \text{(Equation 1)}$$

To illustrate another specific example, if there is a sudden decrease in the load current due to a negative current load step (e.g., from 100 A to 75 A), the auxiliary control circuit 424 may operate the auxiliary switching converter 418 with a decreased duty cycle to increase sunk current from the output terminal. Specifically, the auxiliary control circuit 424 may issue a control signal to the auxiliary switching converter 418 to sink current from the output terminal to the ground terminal until the total output current reaches the desired level of 75 A. In response, the auxiliary switching converter 418 may operate with a decreased duty cycle and increase the sunk high frequency current from the output terminal until the total output current reaches the desired level of 75 A. As mentioned above, due to its higher switching frequency and higher loop bandwidth, the auxiliary switching converter 418 may sink current faster from the output terminal to the ground terminal than the main switching converter 416. The sunk current by the auxiliary switching converter 418 may track the higher frequency component of the transient signal.

Once the current at the output terminal reaches the desired level (e.g., 75 A) and the load device 412 reaches the steady-state condition, the auxiliary switching converter 418 may increase its duty cycle to the original duty cycle. The auxiliary switching converter 418 may operate based on the original duty cycle and may source a zero average low frequency (or DC) current output. As such, the average sunk current from the auxiliary switching converter 418 may be non-zero during the transient and substantially zero outside the transient during the steady-state operation. That is, once the transient ends (e.g., the new current threshold of 75 A is reached), the auxiliary switching converter 418 may sink or source substantially zero average low frequency (or DC) current.

In keeping with the previous example, if there is a sudden decrease in the load current due to the negative current load step (e.g., from 100 A to 75 A), the main control circuit 422 may drive the main switching converter 416 based on the lower frequency component of the transient signal. Specifically, the main control circuit 422 may issue a control signal to the main switching converter 416 to sink current from the output terminal until the total output current reaches the desired level of 75 A. In response, the main switching converter 416 may operate with a decreased duty cycle and increase the sunk low frequency current from the output terminal until the total output current reaches the desired level of 75 A. The sunk current may track the lower frequency component of the transient signal. Once the transient ends (e.g., the new current threshold of 75 A is reached), the main switching converter 416 may continue to source and/or sink current to maintain the stability of $V_{out}$ in accordance with its fixed switching frequency and its original duty cycle as defined in Equation 1 above.

To separate the lower frequency component of the transient signal from the transient signal (e.g., the output of the feedback and compensation circuit 420), the auxiliary control circuit 424 may employ a high pass filter. The high pass filter is configured to filter out the lower frequency component of the transient signal and allow the higher frequency component of the transient signal to activate or drive the auxiliary switching converter 418. Similarly, the main control circuit 422 may employ a low pass filter. The low pass filter is configured to filter out the higher frequency component of the transient signal and allow the lower frequency current to activate or drive the main switching converter 416.

Figure 5:
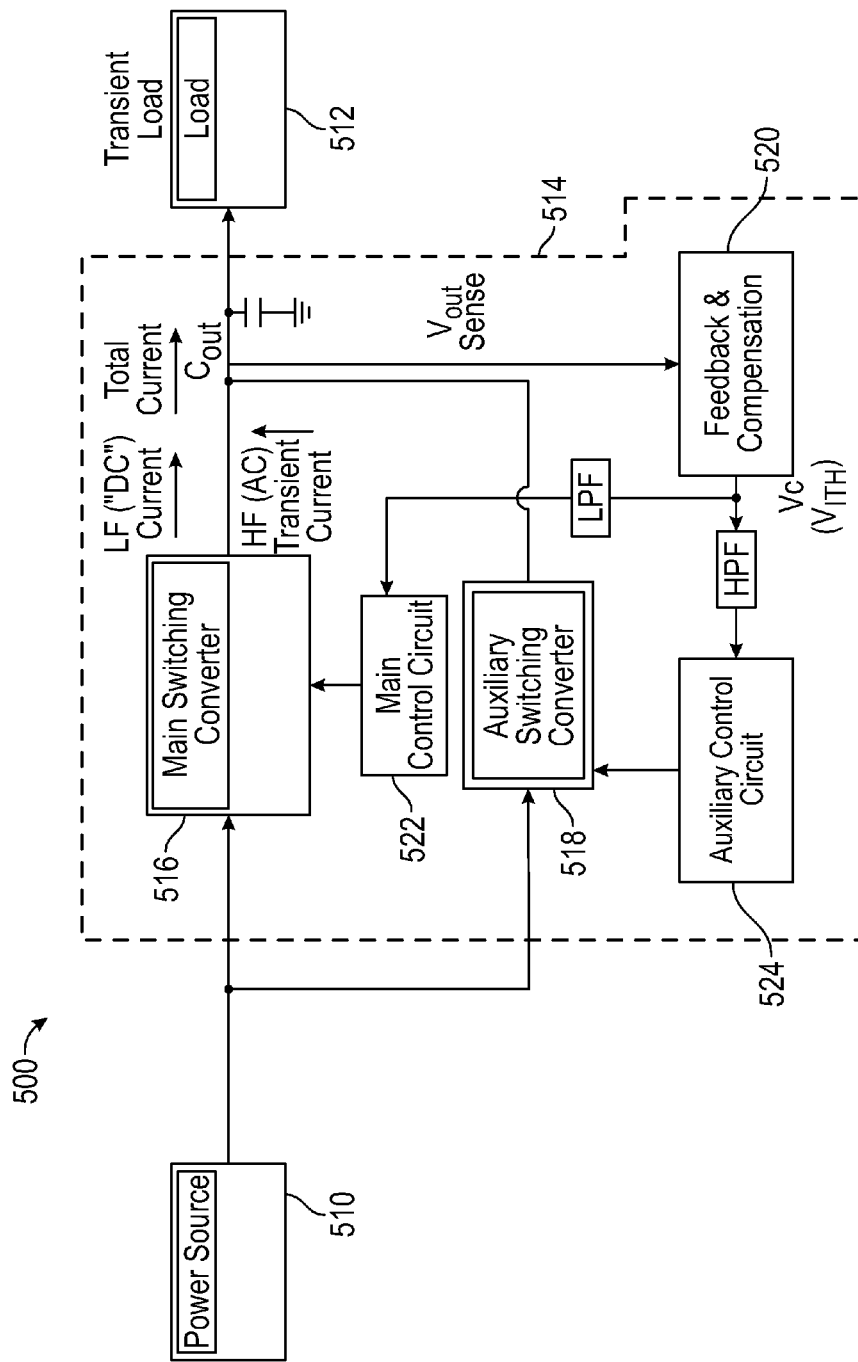
FIG. 5 illustrates another exemplary power supply system including a main switching converter and an auxiliary switching converter.

FIG. 5 illustrates another exemplary power supply system 500 including a main switching converter and an auxiliary switching converter. The power supply system 500 is similar to the power supply system 400 with the exception the low pass filter ("LPF") and the high pass filter ("HPF") are shown to be included inside the power interface device 514 but outside the main control circuit 522 and the auxiliary control circuit 524, respectively. In contrast, in the power supply system 500, the LPF and the HPF were described to be inside the main control circuit 522 and the auxiliary control circuit 524, respectively.

Figure 6:
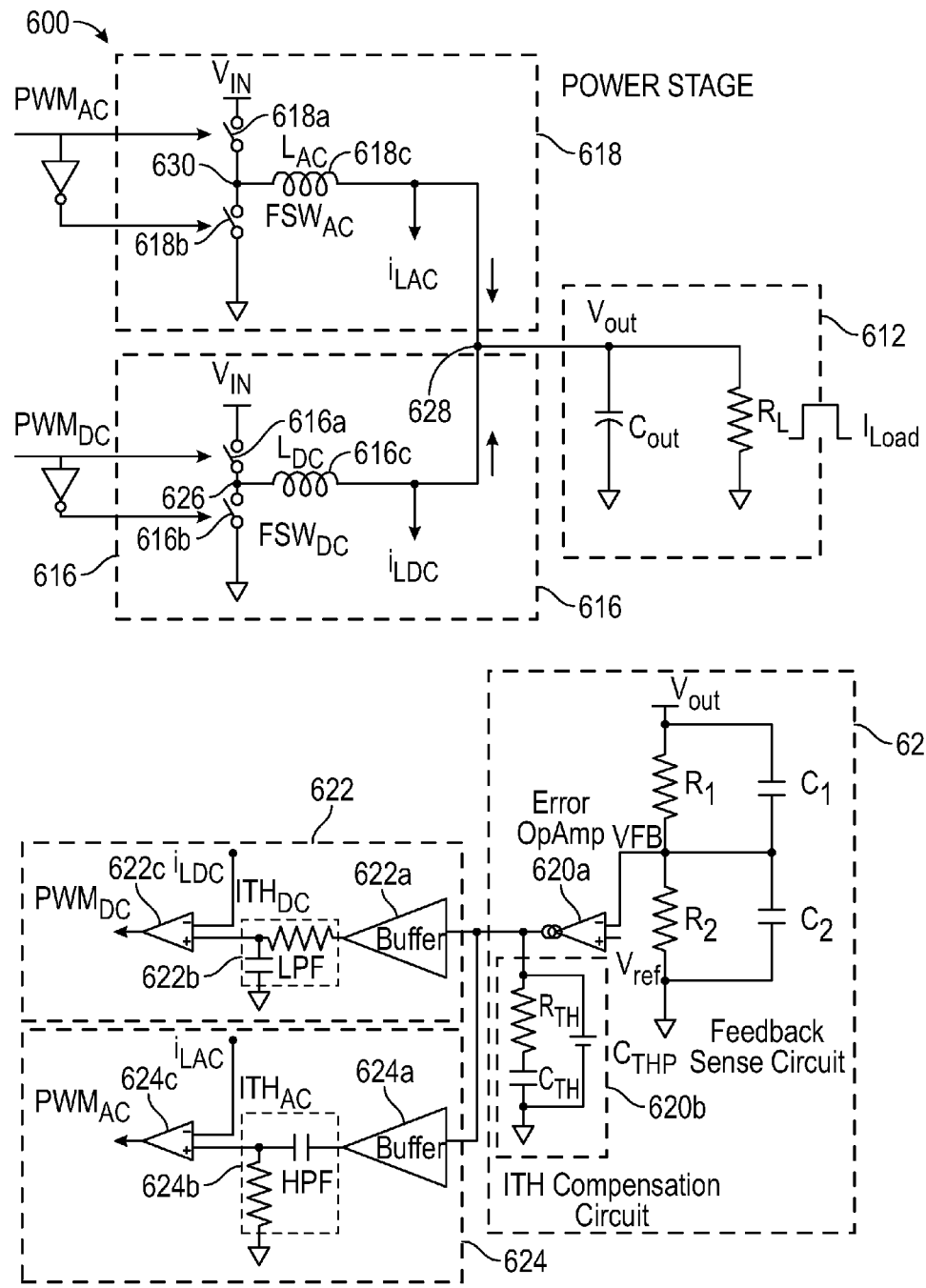
FIG. 6 illustrates an exemplary circuit diagram of the power supply system shown in FIG. 5 having a fast transient response.

FIG. 6 illustrates an exemplary circuit diagram 600 of the power supply system 400 shown in FIG. 4 having a fast transient response. As shown, the power interface of the circuit diagram 600 includes a main switching converter 616, an auxiliary switching converter 618 connected in parallel with the main switching converter 616, a feedback and compensation mechanism 620, a main control circuit 622, and an auxiliary control circuit 624.

The main switching converter 616 corresponds to the main switching converter 416 and the auxiliary switching converter 618 corresponds to the auxiliary switching converter 618. The main switching converter 616 and the auxiliary switching converter 618 can be classified as pulse-width-modulation (PWM) type. The PWM produce a pulse train having a constant frequency variable pulse width. The main switching converter 616 is configured to run at a lower switching frequency fsw than that of the auxiliary switching converter 618. The auxiliary switching converter 618 is configured to run at a higher switching frequency than that of the main switching regulator 616 to quickly respond to the transients at the load device 612. Although the specific example shows two switching converters 616 and 618, the power interface device 600 may include more than two switching converters. For example, the main switching converter 616 can have two or more phases. Similarly, the auxiliary switching converter 618 can have two or more phases. To this end, the instant application is not limited to a single main switching converter 616 and a single auxiliary switching converter 618. Any number of such converters may be connected in parallel with each other.

The switching converters 616 and 618 may be current-mode switching regulators that include an inductor. The switching converters 616 and 618 may be synchronous switching regulators but they also may be non-synchronous switching regulators. In one specific example, the switching converters 616 and 618 may be a step-down, current mode, switching regulators in which the input voltage $V_{in}$ is greater than the output voltage $V_{out}$. In another specific example, the switching converters 616 and 618 may be a step-up, current mode, switching regulators in which the input voltage $V_{in}$ is lower than the output voltage $V_{out}$. In the foregoing and the following implementations, it is assumed that the switching converters 616 and 618 are a step-down, current mode, switching regulators.

The main switching converter 616 may include a first main switch 616a, a second main switch 616b, and a main inductor 616c. The first main switch 616a and the second main switch 616b may be power FET switches. The power FET switches may be n-channel FET or p-channel FET switches. Similarly, the auxiliary switching converter 618 may include a first auxiliary switch 618a, a second auxiliary switch 618b, and an auxiliary inductor 618c. The first auxiliary switch 618a and the second auxiliary switch 618b may be power FET switches. The FET switches may be n-channel FET or p-channel FET switches. Although FET type switches are described, other appropriate technologies may also be used.

In the main switching converter 616, the first main switch 616a may be connected at one end to the $V_{in}$ and at another end to a main node 626. The second main switch 616b may be connected at one end to the main node 626 and at the other end to the ground terminal. The main inductor 616c may be connected at one end to the main node 626 and at the other end to the output terminal 628. The output terminal 628 may be connected to the output capacitor Cout and the load resistance $R_L$.

In the auxiliary switching converter 618, the first auxiliary switch 618a may be connected at one end to $V_{in}$ and at another end to an auxiliary node 630. The second auxiliary switch 618b may be connected at one end to the auxiliary node 630 and at the other end to the ground terminal. The auxiliary inductor 618c may be connected at one end to the auxiliary node 630 and at the other end to the output terminal 628.

The power interface device 600 is configured to source or sink output current to the load device 612 coupled to the output terminal 628 and maintain a regulated voltage $V_{out}$. To this end, the first main switch 616a and the second main switch 616b in the main switching converter 616 are switched ON and OFF by a main control circuit 622. The main switches 616a and 616b may be driven out of phase with respect to each other to source or sink current to the load device 612 coupled to output terminal 628. Similarly, the first auxiliary switch 618a and the second auxiliary switch 618b in the auxiliary switching regulator 618 are switched ON and OFF by an auxiliary control circuit 624. The auxiliary switches 618a and 618b may be driven out of phase with respect to each other to source or sink current to the load device 612 coupled to output terminal 628.

The main switching converter 616 is configured to run at a first switching frequency. The auxiliary switching converter 618 is configured to run at a second switching frequency. The second switching frequency may be higher than the first switching frequency. The higher second switching frequency may allow the auxiliary switching converter 618 to respond to the transients at the load device 612 more quickly than the main switching converter 616. That is, due to the faster switching frequency, the auxiliary switching converter 618 is configured to source or sink current to or from the load device 612 more quickly than the main switching converter 616. Due to the higher switching frequency, the auxiliary switching converter 618 may have more power loss than the main switching converter 616. To reduce this power loss, the operation of the auxiliary switching converter 618 may be limited to the transient conditions experienced by the load device 612. That is, the auxiliary switching converter 618 may only source or sink current during the transients and may provide zero load current during the steady-state operation.

Although not shown, additional circuit may be added to the power interface device 600 to provide a brief dead-time or blanking interval between the moment that one switching transistor turns OFF and the moment that the other switching transistor turns ON. When the switches 616a, 618a are ON and the switches 616b, 618b are OFF, current flows from the $V_{in}$ to the output terminal 628 through the inductors 616c, 618c in each of the single phase switching regulators 616 and 618. In this scenario, the rate of change of inductor current 616c and 618c over time may be equal to $(V_{in}-V_{out})/L$. When the switches 616a, 618a are OFF and the switches 616b, 618b are ON, current flows from the ground terminal to output terminal 628 though the inductors 616c and 618c. In this scenario, the rate of change of inductor currents 616c and 618c over time may be equal to $-V_{out}/L$. In each of the above-described scenarios, the total current at the output terminal may be the cumulative inductor currents through inductors 616c and 618c.

The power interface device 600 also includes the feedback and compensation mechanism 620. The feedback and compensation mechanism 620 is connected at one end to the output terminal 628 and at the other end to the control circuits 622, 624. The feedback and compensation mechanism 620 is configured to detect transient conditions and control the switches in the single phase switching regulators 616 and 618 to provide a stable $V_{out}$ as quickly as possible. To this end, the feedback and compensation mechanism 620 includes a feedback voltage sense circuit, an error amplifier 620a, and a compensation circuit 620b.

The feedback voltage sense circuit is configured to sense the $V_{out}$ through a network of resistors and capacitors including $R_1$, $R_2$, $C_1$, and $C_2$. The network of resistors $R_1$ and $R_2$ form a resistor divider and scale the signal $V_{out}$ to make it proportional to a reference voltage $V_{ref}$. The reference voltage $V_{ref}$ may correspond to the desired output voltage. The optional capacitors $C_1$ and $C_2$ may be provided to make the resistor divider frequency dependent. This frequency dependent divided $V_{out}$ may be referred to as feedback voltage $V_{fb}$. The feedback voltage $V_{fb}$ and the reference voltage $V_{ref}$ are provided as input to the error amplifier gm (shown as a trans-conductance (gm) amplifier) 620a. The error amplifier 620a may be either a current-output type transconductance amplifier or a voltage-output type amplifier. In one specific example, the error amplifier 620a is a current-output type transconductance amplifier.

The error amplifier 620a monitors the feedback voltage $V_{fb}$ that is proportional to $V_{out}$ at its inverting input and a reference voltage $V_{ref}$ at its non-inverting input. The feedback voltage $V_{fb}$ should be approximately equal to the reference voltage $V_{ref}$. When these two voltages are not equal, the error amplifier 620a may provide a transient signal ITH at its output. The transient signal ITH may include a higher frequency component $ITH_{AC}$ and a lower frequency component $ITH_{DC}$.

In keeping with the previous example, the error amplifier 620a may be a current-output type transconductance amplifier and may output the transient current signal ITH. In this scenario, when the feedback voltage $V_{fb}$ is not proportional to the reference voltage $V_{ref}$, the error amplifier 620a may source current to its output terminal to enable either increase or decrease of the output voltage to match the reference voltage $V_{ref}$. When the feedback voltage $V_{fb}$ is substantially proportional to the reference voltage $V_{ref}$, the error amplifier 620a may source substantially zero current to its output terminal to enable maintaining of the output voltage at its current level.

In another example, the error amplifier 620a may be a voltage-output type amplifier and may output a transient voltage signal ITH. In this scenario, when the feedback voltage $V_{fb}$ is not proportional to the reference voltage $V_{ref}$, the error amplifier 620a may source a voltage to its output terminal to enable either increase or decrease of the output voltage to match the reference voltage $V_{ref}$. When the feedback voltage $V_{fb}$ is substantially proportional to the reference voltage $V_{ref}$, the error amplifier 620a may source substantially zero voltage to its output terminal to enable maintaining of the output voltage at its current level.

The voltage output from the amplifier 620a may correspond to the difference between the actual output voltage and the desired output voltage. The output voltage of the error amplifier 620a is inverse to the feedback voltage $V_{fb}$. As the feedback voltage $V_{fb}$ decreases, the output voltage of the error amplifier 620a increases. As the feedback voltage $V_{fb}$ increases, the output voltage of error amplifier 620a decreases.

The frequency compensation circuit 620b includes capacitors $C_{th}$ and $C_{thp}$ and a resistor $R_{th}$ to provide frequency compensation for the feedback loop. The capacitor $C_{thp}$ is connected at one end to an output of the error amplifier 620a and at another end to the ground terminal. The capacitor $C_{th}$ is connected at one end to the output of the amplifier 620a and at another end to the resistor $R_{th}$. The resistor $R_{th}$ at one end is connected to the capacitor $C_{th}$ and at another end to the ground terminal. The frequency compensation circuit 620b is configured to receive the transient signal ITH and output a frequency compensated transient signal ITH to the main control circuit 622 and the auxiliary control circuit 624.

The main control circuit 622 includes a main buffer 622a, a low pass filter 622b, and a main comparator 622c. The main buffer 622a may be configured to provide electrical impedance transformation from the feedback and compensation mechanism 620 to the main control circuit 622. The main buffer 622a may be a voltage buffer or a current buffer. The type of the buffer may be selected to correspond to the type of the error amplifier 620a. The main buffer 622a includes an input terminal and an output terminal. The input terminal of the main buffer 622a is coupled to the output terminal of the amplifier 620a. The output terminal of the main buffer 622a is coupled to the low pass filter 622b.

The low pass filter 622b is configured to block the higher frequency component $ITH_{AC}$ of the transient signal ITH and allow the lower frequency component $ITH_{DC}$ of the transient signal ITH to pass through. The low pass filter 622b includes a resistor and a capacitor. The resistor at one end is connected to the output of the main buffer 622a and at another end is connected to a first node. The capacitor at one end is connected to the first node and at another end is connected to the ground terminal.

The main comparator 622c includes a non-inverting terminal, an inverting terminal, and an output terminal. The non-inverting terminal is connected to the first node and configured to receive the lower frequency component $ITH_{DC}$. The inverting terminal is connected to the main inductor 616c and is configured to receive the sensed main inductor 616c signal. The sensed main inductor 616c signal may be a sensed current $i_{LDC}$ in the main inductor 616c (low frequency inductor current). The main comparator 622c is configured to compare the lower frequency component $ITH_{DC}$ with the sensed current $i_{LDC}$ and generate a main control signal for main power FETs 616a and 616b. The main control signal may be a PWM control signal.

If the lower frequency component $ITH_{DC}$ is more than the sensed main inductor signal, the main comparator 622c may output a first main control signal. In one implementation, the lower frequency component $ITH_{DC}$ and the sensed main inductor signal may be both a voltage signal. In another implementation, the lower frequency component $ITH_{DC}$ and the sensed main inductor signal may be both a current signal.

The first main control signal may be a high signal. The high signal may be provided to the first main switch 616a to turn ON the first main switch 616a and enable the main switching converter 616 to source additional current to the output terminal 628 with the increased load current. The high signal may also be provided to an invertor connected to the second main switch 616b to turn OFF the second main switch 616b. At the beginning of the clock cycle, the first main switch 616a may turn ON with an increased duty cycle until the new current threshold due to the transient is reached. During the time the first main switch 616a is ON, the low frequency current flows from the power source $V_{in}$ through the first main switch 616a and the main inductor 616c to the output terminal 628. As a result, the low frequency current ramps up in the main inductor 616c toward the new current threshold.

In this manner, the main switching converter 616 sources low frequency current tracking the lower frequency component $ITH_{DC}$ to reach the new current threshold set by the transient. In one implementation, during the transient, the first main switch 616a may remain ON and the second main switch 616b may remain OFF until the new current threshold set by the transient is reached. In another implementation, during the transient, the main switching converter 616 may operate with an increased duty cycle to increase the sourced low frequency current to the output terminal 628. During the increased duty cycle and in response to the first main control signal, the main switches 616a and 616b may alternatively turn ON and OFF to increase the sourced low frequency current to the output terminal 628. The increased duty cycle may correspond to the duty cycle of the first main signal. The fixed switching frequency of the main switching converter 616 may not be maintained during the transient if the on-time for the first main switch 616a is longer than the cycle time T, for example.

If the lower frequency component $ITH_{DC}$ is less than the sensed main inductor signal, the main comparator 622c may output a second main control signal. The second main control signal may be a low signal. The low signal may be provided to the first main switch 616a to turn OFF the first main switch 616a. The second main control signal may also be provided to the invertor connected to the second main switch 616b to turn ON the second main switch 616b and enable the main switching converter 616 to sink additional current from the output terminal 628 with the decreased load current. At the beginning of the clock cycle, the first main switch 616a may turn OFF and the second main switch 616b may turn ON until the new current threshold due to the transient is reached. During the time the second main switch 616b is ON, the low frequency current flows from the output terminal 628 though the main inductor 616c to the ground terminal. As a result, the low frequency current ramps down in the main inductor 616c toward the new current threshold.

In this manner, the main switching converter 616 sinks low frequency current tracking the lower frequency component $ITH_{DC}$ to reach the new current threshold set by the transient. In one implementation, during the transient, the first main switch 616a may remain OFF and the second main switch 616b may remain ON until the new current threshold set by the transient is reached. In another implementation, during the transient, the main switching converter 616 may operate with a decreased duty cycle to increase the sunk low frequency current from the output terminal 628. During the decreased duty cycle and in response to the low signal, the main switches 616a and 616b may alternatively turn ON and OFF to increase the sunk low frequency current from the output terminal 628. In either case, the fixed switching frequency of the main switching converter 616 may not be maintained during the transient if the on-time for the second main switch 616b is longer than the cycle time T, for example.

Once the transient ends (e.g., the new current threshold is reached), the main switching converter 616 continues to source and sink current to maintain the stability of $V_{out}$ in accordance with its fixed switching frequency and a duty cycle. The on-time and the off-time of the main switches 616a and 616b are determined based on the duty-cycle. In one specific example, the duty-cycle may correspond to the duty-cycle set prior to the transient and is identified above in Equation 1. To this end, the main switching converter 616 is configured to source and/or sink current both during the transient and steady-state operation.

As noted above, the total output transient signal ITH of the error amplifier 620b is also passed to the auxiliary control circuit 624. The auxiliary control circuit 624 includes an auxiliary buffer 624a, a high pass filter 624b, and an auxiliary comparator 624c. The auxiliary buffer 624a may be configured to provide electrical impedance transformation from the feedback and compensation mechanism 620 to the auxiliary control circuit 624. The auxiliary buffer 624a may be a voltage buffer or a current buffer. The type of buffer may be selected based on the type of the error amplifier 620a. The auxiliary buffer 624a may include an input terminal and an output terminal. At the input terminal, the auxiliary buffer 624a is connected to the output of the error amplifier 620a. At the output terminal, the auxiliary buffer 624a is connected to the high pass filter 624b.

The high pass filter 624b is configured to block the lower frequency component $ITH_{DC}$ and allow the higher frequency component $ITH_{AC}$ of the transient signal ITH to pass through. The high pass filter 624b includes a resistor and a capacitor. The capacitor at one end is connected to the output of the auxiliary buffer 624a and at another end is connected to a second node. The resistor at one end is connected to the second node and at another end is connected to the ground terminal.

The auxiliary comparator 624c includes a non-inverting terminal, an inverting terminal, and an output terminal. The non-inverting terminal is connected to the second node and configured to receive the higher frequency component $ITH_{AC}$. The inverting terminal is connected to the auxiliary inductor 618c and is configured to receive the sensed auxiliary inductor 618c signal. The sensed auxiliary inductor 618c signal may include sensed current $i_{LAC}$ in the auxiliary inductor 618c (high frequency inductor current). The auxiliary comparator 624c is configured to compare the higher frequency component $ITH_{AC}$ with the sensed current $i_{LAC}$ and generate an auxiliary control signal for auxiliary switches 618a and 618b. The auxiliary control signal may include a PWM pulse train.

If the higher frequency component $ITH_{AC}$ is more than the sensed auxiliary inductor signal, the auxiliary comparator 624c may output a first auxiliary control signal. The first auxiliary control signal may be a high signal. In one implementation, the higher frequency component $ITH_{AC}$ and the sensed auxiliary inductor signal may be both a voltage signal. In another implementation, the higher frequency component $ITH_{AC}$ and the sensed auxiliary inductor signal may be both a current signal.

The high signal may be provided to the first auxiliary switch 618a to turn ON the first auxiliary switch 618a and enable the auxiliary switching converter 618 to source additional current to the output terminal 628 with the increased load current. The high signal may also be provided to an invertor connected to the second auxiliary switch 618b to turn OFF the second auxiliary switch 618b. At the beginning of the clock cycle, the first auxiliary switch 618a may turn ON with an increased duty cycle until the new current threshold due to the transient is reached. During the time the first auxiliary switch 618a is ON, the high frequency current flows from the power source $V_{in}$ through the first auxiliary switch 618a and the auxiliary inductor 618c to the output terminal 628. As a result, the high frequency current ramps up in the auxiliary inductor 618c toward the new current threshold.

In this manner, the auxiliary switching converter 618 sources high frequency current tracking the higher frequency component $ITH_{AC}$ to reach the new current threshold set by the transient. In one implementation, during the transient, the first auxiliary switch 618a may remain ON and the second auxiliary switch 618b may remain OFF until the new current threshold set by the transient is reached. In another implementation, during the transient, the auxiliary switching converter 618 may operate with an increased duty cycle to increase the sourced high frequency current to the output terminal 628. During the increased duty cycle and in response to the high signal, the auxiliary switches 618a and 618b may alternatively turn ON and OFF to increase the sourced high frequency current to the output terminal 628. The increased duty cycle may correspond to the duty cycle of the first auxiliary control signal. The fixed switching frequency of the auxiliary switching converter 618 may not be maintained during the transient if the on-time for the first auxiliary switch 618a is longer than the cycle time T, for example.

If the higher frequency component $ITH_{AC}$ is less than the sensed auxiliary inductor signal, the auxiliary comparator 624c may output a second auxiliary control signal. The second auxiliary control signal is a low signal. The low signal may be provided to the first auxiliary switch 618a to turn OFF the first auxiliary switch 618a. The low signal may also be provided to the invertor connected to the second auxiliary switch 618b to turn ON the second auxiliary switch 618b and enable the auxiliary switching converter 618 to sink additional current from the output terminal 628 with the decreased load current. At the beginning of the clock cycle, the first auxiliary switch 618a may turn OFF and the second auxiliary switch 618b may turn ON until the new current threshold due to the transient is reached. During the time the second auxiliary switch 618b is ON, the high frequency current flows from the output terminal 628 though the auxiliary inductor 618c to the ground terminal. As a result, the high frequency current ramps down in the auxiliary inductor 618c toward the new current threshold.

In this manner, the auxiliary switching converter 618 sinks high frequency current tracking the higher frequency component $ITH_{AC}$ to reach the new current threshold set by the transient. In one implementation, during the transient, the first auxiliary switch 618a may remain OFF and the second auxiliary switch 618b may remain ON until the new current threshold set by the transient is reached. In another implementation, during the transient, the auxiliary switching converter 618 may operate with a decreased duty cycle to increase the sunk high frequency current from the output terminal 628. During the decreased duty cycle and in response to the second auxiliary control signal, the auxiliary switches 618a and 618b may alternatively turn ON and OFF to increase the sunk high frequency current from the output terminal 628. In either case, the fixed switching frequency of the auxiliary switching converter 618 may not be maintained during the transient if the on-time for the second auxiliary switch 618b is longer than the cycle time T, for example.

Once the transient ends (e.g., the new current threshold is reached), the auxiliary switching converter 618 continues to operate but may source or sink substantially zero average low frequency (or DC) current. In this manner, the power loss due to the high switching frequency of the auxiliary switching converter 618 may be limited substantially to its operation during the transient and not outside of the transient.

If the main switching converter 616 is a peak-current mode regulator, first the second main switch 616b may be turned OFF and then the first main switch 616a may be turned ON by an internal clock or timer, thereby increasing the current $i_{LDC}$ of the main inductor 616c. Similarly, if the auxiliary switching converter 618 is a peak-current mode regulator, first the second auxiliary switch 618b may be turned OFF and then the first auxiliary switch 618a may be turned ON by an internal clock or timer, thereby increasing the current $i_{LAC}$ of the auxiliary inductor 618c.

If the main switching converter 616 is a valley-current mode regulator, first the first main switch 616a is turned OFF and then the second main switch 616b is turned ON by the internal clock or timer, thereby decreasing the current $i_{LDC}$ of the main inductor 616c. Similarly, if the auxiliary switching converter 618 is a valley-current mode regulator, first the first auxiliary switch 618a is turned OFF and then the second auxiliary switch 618b is turned ON by the internal clock or timer, thereby decreasing the current $i_{LAC}$ of the auxiliary inductor 618c.

Although a single first main switch 616a and a second main switch 616b are shown in the main switching converter 616, other implementations are possible. For example, the number of first main (high side) switches may be two or more. Similarly, the number of second main (low side) switches may be two or more. To this end, the control circuit may simultaneously enable more than one high side switch depending on the signal from the driver circuit 622. Similarly, the control circuit may simultaneously enable more than one low side switch depending on the signal from the driver circuit 622.

Figure 7:
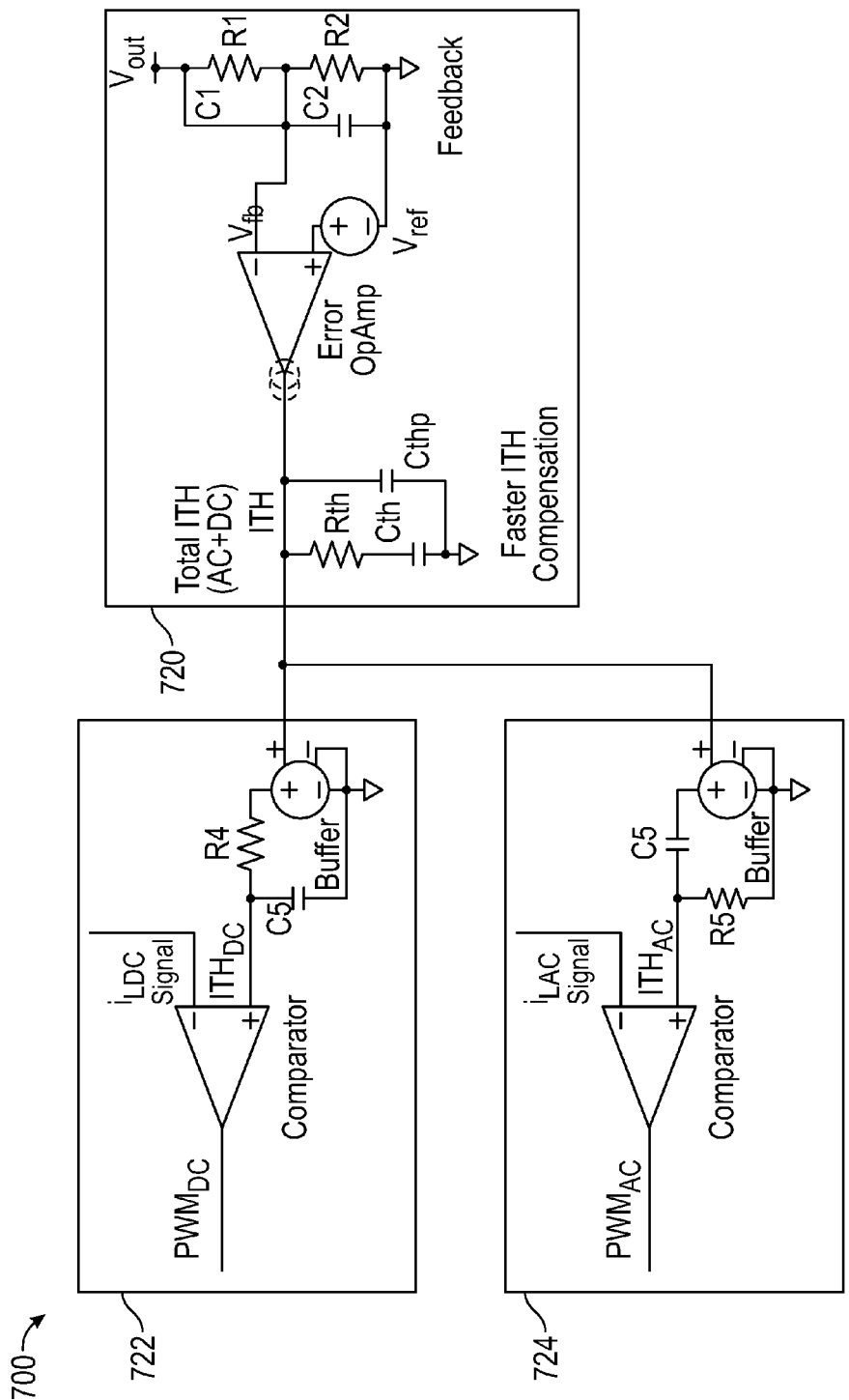
FIG. 7 illustrates an exemplary simulation circuit diagram for the control mechanism of the power supply system shown in FIG. 6.

FIG. 7 illustrates an exemplary simulation circuit diagram 700 for the control mechanism of the power supply system 600 shown in FIG. 6. The circuit diagram 700 includes a feedback and compensation mechanism 720, a main control circuit 722, and an auxiliary control circuit 724. The feedback and compensation mechanism 720 corresponds to the feedback and compensation mechanism 620; the main control circuit 722 corresponds to the main control circuit 622; and the auxiliary control circuit 724 corresponds to the auxiliary control circuit 624. Therefore, they are not described further for brevity of description.

Figure 8A:
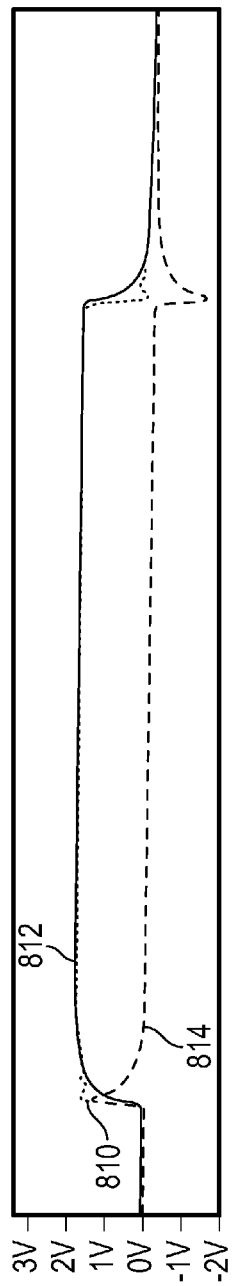
FIGS. 8A-8C illustrate exemplary load transient simulation waveforms for the circuit diagram shown in FIG. 6.
Figure 8B:
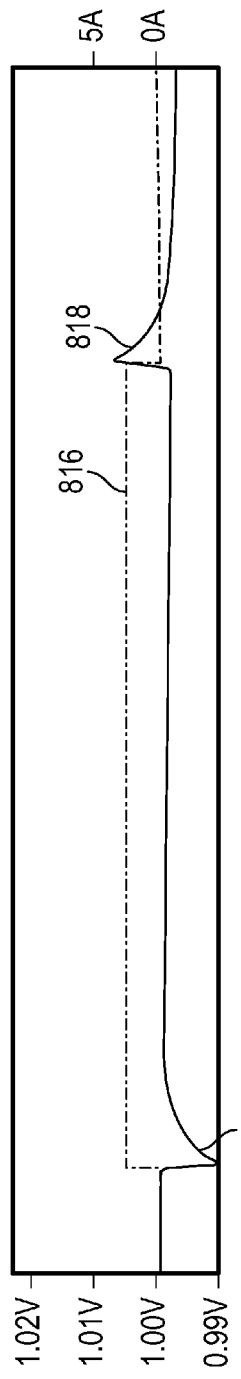
Figure 8C:
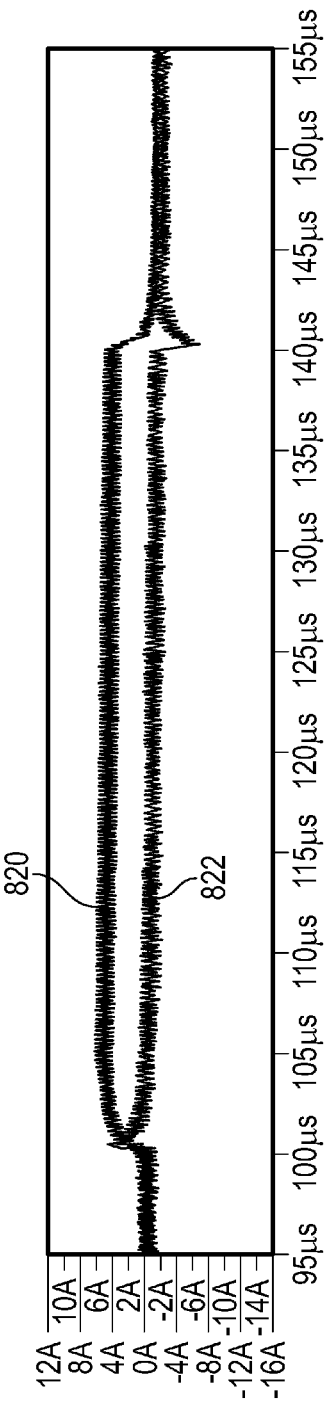

FIGS. 8A-8C illustrate exemplary load transient simulation waveforms for the circuit diagram 600 shown in FIG. 6. FIG. 8A illustrates the transient signal ITH 810, the higher frequency component $ITH_{AC}$ 814 of the transient signal ITH 810, and the lower frequency component $ITH_{DC}$ 812 of the transient signal ITH 810. As shown, the transient signal ITH 810 is a summation of the higher frequency component $ITH_{AC}$ 814 and the lower frequency component $ITH_{DC}$ 812.

The higher frequency component $ITH_{AC}$ 814 has voltage overshoot or undershoot only during the sudden increase or decrease in the output current. In this case, the higher frequency component $ITH_{AC}$ 814 is only present during the positive edge and the negative edge of the load step shown in FIG. 8B. The lower frequency component $ITH_{DC}$ 812 may also be changed at a slower speed during the sudden increase or decrease in the output current. However, once the new current threshold is reached due to the transient, the lower frequency component of current in steady state may follow the lower frequency component $ITH_{DC}$ 812. As such, the lower frequency component $ITH_{DC}$ 812 is not shown to fade away after the transient ends. To this end, the higher frequency component $ITH_{AC}$ 814 may rise quickly in response to positive edge of the load step shown in FIG. 8B and then falls. In contrast, the lower frequency component $ITH_{DC}$ 812 may raise slowly in response to the positive edge of the load step shown in FIG. 8B and once it reaches a specific threshold level, it may remain there for the duration of the load step. Similarly, the higher frequency component $ITH_{AC}$ 814 may fall quickly in response to negative edge of the load step shown in FIG. 8B. In contrast, the lower frequency component $ITH_{DC}$ 812 may fall slowly in response to the negative edge of the load step shown in FIG. 8B.

FIG. 8B illustrates a current load step 816 and the corresponding output voltage 818 in response to the current load step 816. As shown, the output voltage 818 declines with the positive edge of the load step 816 and rises with a negative edge of the load step 816. The reason for this is because the voltage of capacitor reduces to supplement the inductor's slowly rising current to meet the increase in current demand from the load device. Similarly, the output capacitor is useful in sinking the current to meet the sudden decrease in current from the load device. Therefore, as shown, there is a slight voltage ripple at the output. However, this voltage ripple may be significantly reduced compared to the voltage ripple of the conventional power supply system not employing the teachings of the instant application. In one specific example, the output voltage ripple may be reduced by approximately 50%. This may be accomplished without a need for a complicated control method or employing an additional AC capacitor between the output terminal and the control loop for the auxiliary switching converter. The AC capacitor is configured to prevent DC or low frequency current from entering the control loop for auxiliary switching converter. The AC capacitor can add to the cost and size of the power supply system. Instead, the power supply system of the instant application as described with respect to FIG. 4 may prevent the DC or low frequency current from entering the auxiliary switching converter via a filtering network that is configured to filter out the lower frequency component of the transient signal ITH.

FIG. 8C illustrates a lower frequency inductor $iL_{DC}$ current 820 provided by the main switching converter in response to the lower frequency component $ITH_{DC}$ 812 and a higher frequency inductor $iL_{AC}$ current 822 provided by the auxiliary switching converter in response to the higher frequency component $ITH_{AC}$ 814. As shown, the higher frequency current 822 tracks the higher frequency component $ITH_{AC}$ 814 and the lower frequency current 820 tracks the lower frequency component $ITH_{DC}$ 812 in transient state and also tracks the lower frequency current in steady state operation. To this end, the auxiliary switching converter may only source or sink current during the transients (e.g., sourcing current in response to the positive edge of the load step and sinking current in response to the negative edge of the load step). In contrast, the main switching converter may source or sink current both during the transient and the steady state operation.

Figure 9A:
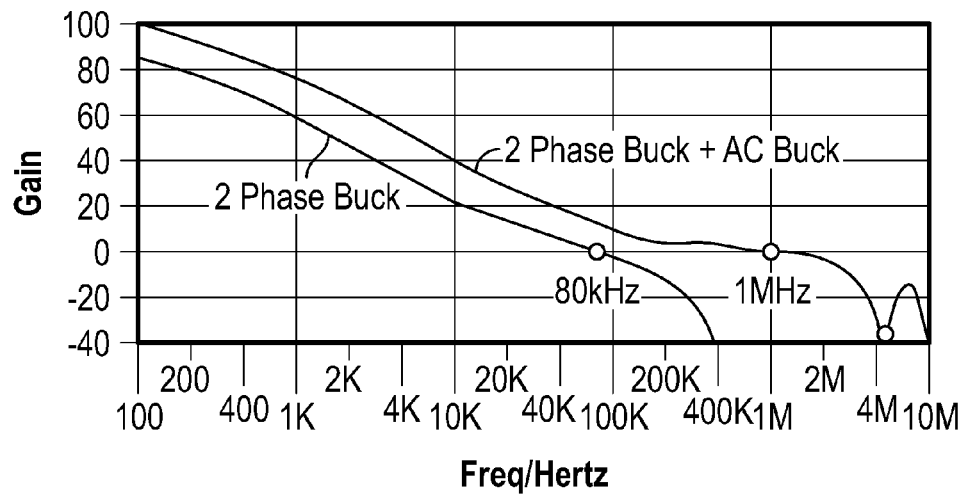
FIG. 9A illustrates a feedback loop gain comparison between a first power supply system including two phase buck switching converters and a second power supply system including two phase buck switching converters in parallel with an auxiliary switching converter.

FIG. 9A illustrates a loop gain comparison between a first power supply system including two phase buck switching converters and a second power supply system including two phase buck switching converters in parallel with an auxiliary switching converter. As can be seen, with the addition of the auxiliary switching converter, the bandwidth of the second power supply system can be pushed from 80 kHz to 1 MHz, making a faster transient response possible. Usually the power supply system is stable when phase margin is greater than zero. In one implementation, it may be desirable to have 40-45 degrees phase.

Figure 9B:
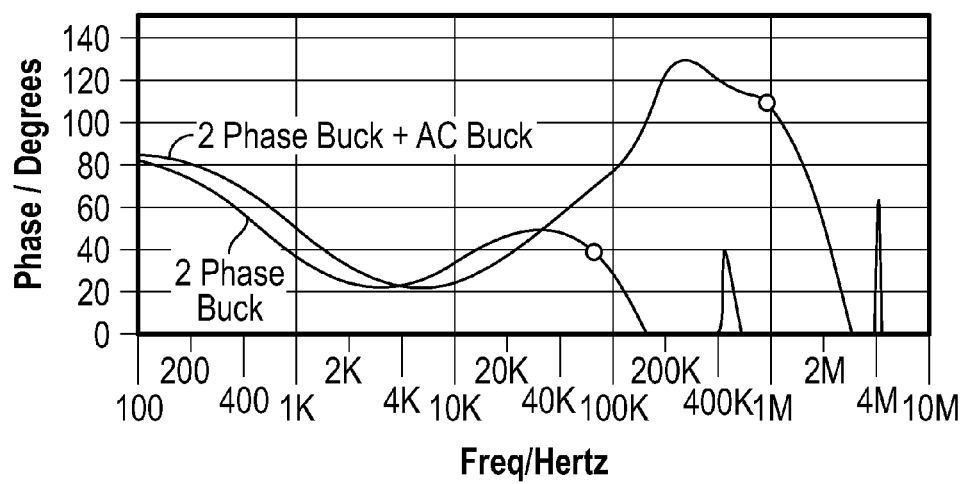
FIG. 9B illustrates feedback loop phase margins for the first power supply system and the second power supply system of FIG. 9A.

FIG. 9B illustrates phase margin for the first power supply system and the second power supply system of FIG. 9A. As can be seen the phase margin of the first power supply system using only two phase buck switching converters at 100 kHz is about 40 degrees. In contrast, the phase margin of the second power supply system is substantially higher, higher than 60 degrees at 100 kHz.

Figure 10:
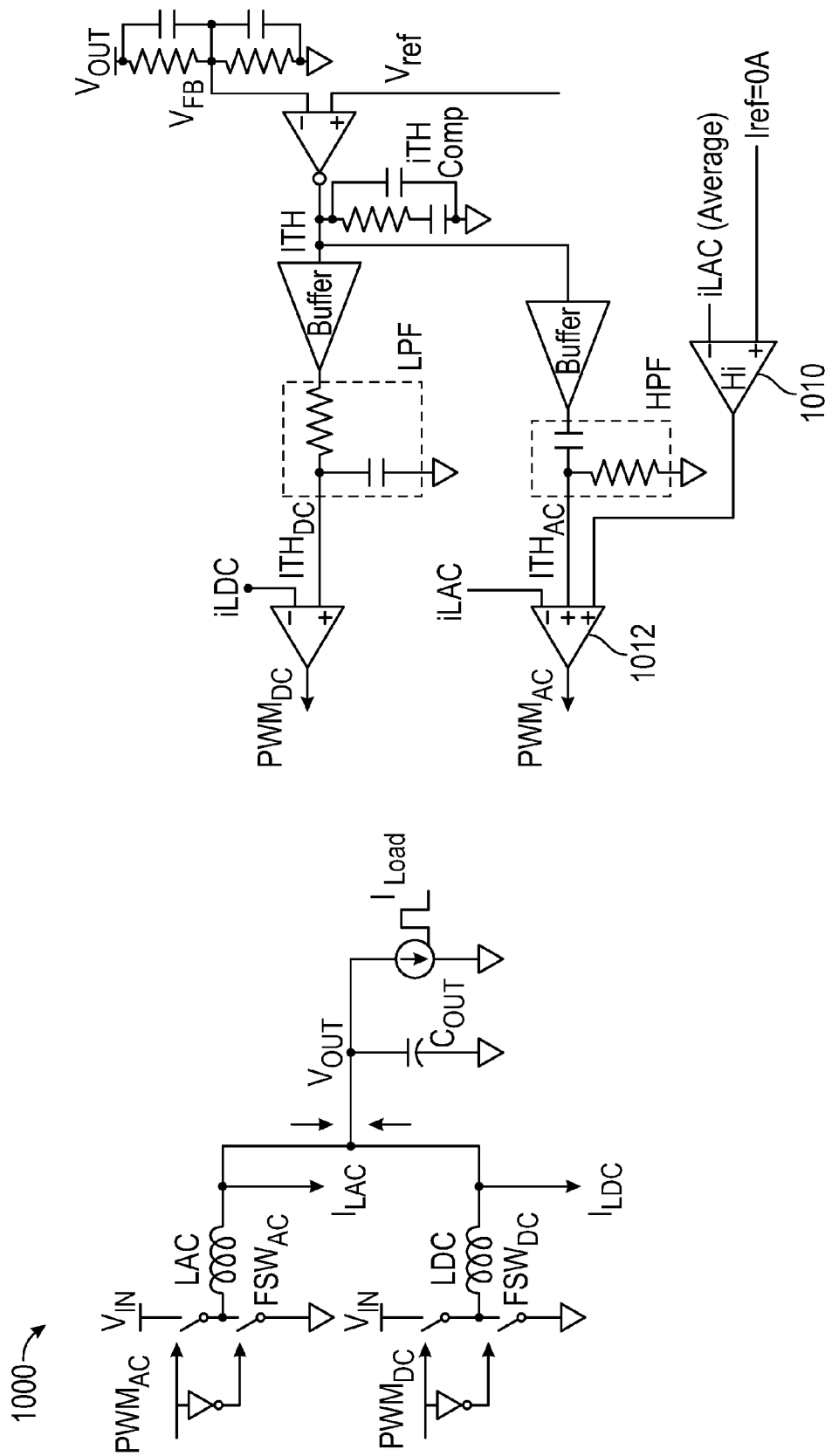
FIG. 10 illustrates another exemplary power supply system including a main switching converter and an auxiliary switching converter.

FIG. 10 illustrates another exemplary power supply system 1000 including a main switching converter and an auxiliary switching converter. The power supply system 1000 is similar to the power supply system 500 except it includes an optional error amplifier 1010 to further ensure that the higher frequency inductor $iL_{AC}$ current generated by the auxiliary switching converter has zero average current in steady state. To this end, the additional error amplifier 1010 receives the average high frequency current $iL_{AC}$ sourced from the auxiliary switching converter at its inverting terminal and the 0 A Tref at its non-inverting terminal. The error amplifier output provides an offset signal to current comparator 1012 to form a slow loop and ensure inductor $iL_{AC}$ current has 0 A DC average value. The comparator 1012 also receives the sensed current $iL_{AC}$ and the higher frequency component of the transient signal ITH. The higher frequency component of the transient signal ITH is added to the offset signal and compared with the sensed current $iL_{AC}$. The comparator 1012 uses these input to generate an auxiliary control signal for driving the auxiliary switching converter.

In another implementation, the power supply system may include two separate and independent control mechanisms. The two separate independent control mechanisms may include a first control mechanism for driving a main switching converter and a second and separate control mechanism for driving the auxiliary switching converter. This design may be useful if the main switching converter is part of a power module, which does not provide an interconnection pin to share its control mechanism with the auxiliary switching converter to enable a faster transient response. To enable the faster transient response, an auxiliary power interface device may be combined with this power module without changing the main switching converter. The auxiliary power interface device may include an auxiliary control mechanism and an auxiliary switching converter. The auxiliary control mechanism is configured to receive the sensed $V_{out}$ and the low frequency average $V_{out}$ signal generated through a low pass filter, and detect the higher frequency compensation component of the $V_{out}$ and run the auxiliary switching converter based on the higher frequency compensation component of the $V_{out}$.

Figure 11:
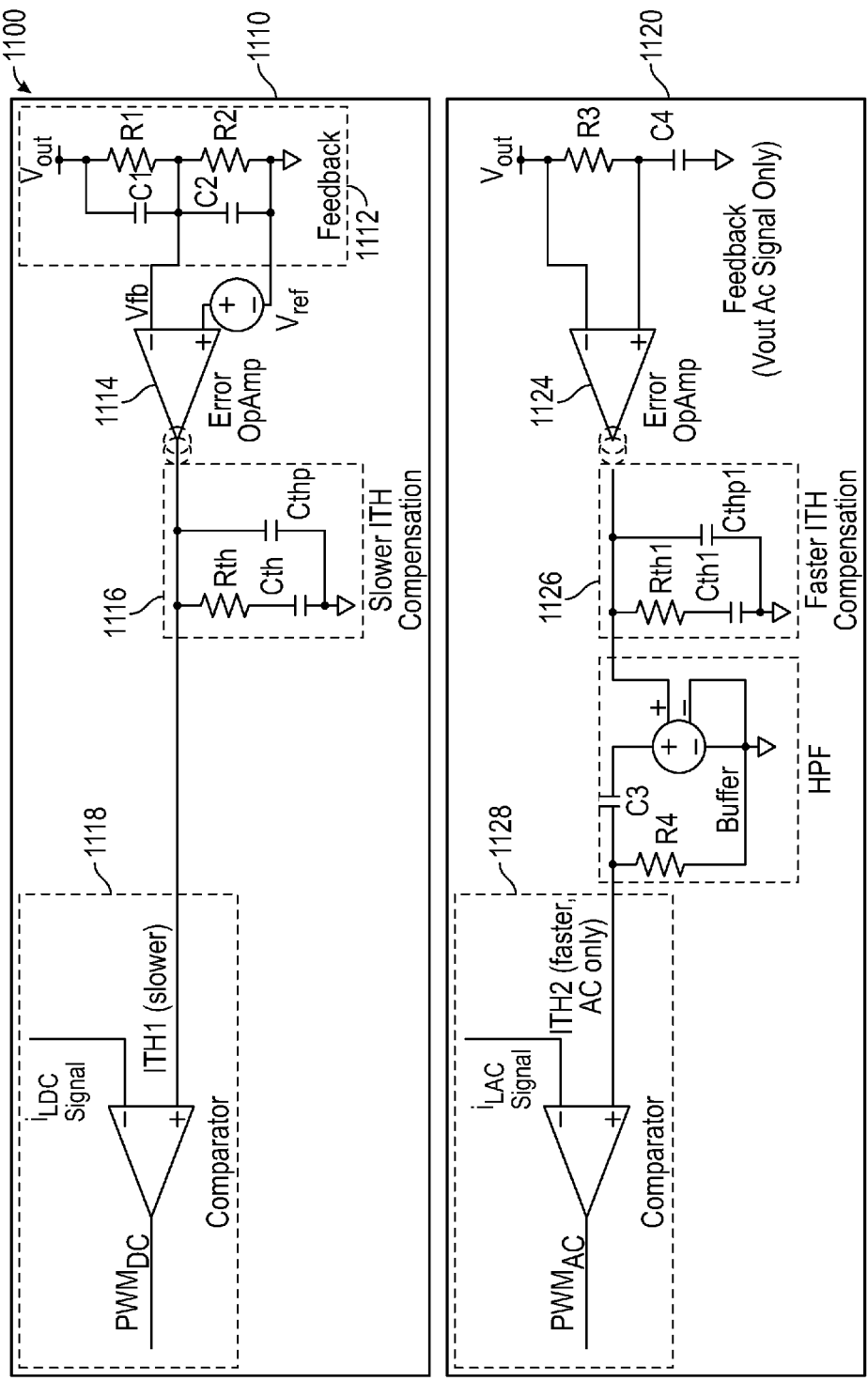
FIG. 11 illustrates an exemplary circuit diagram including two independent control mechanisms for a power supply system of the instant application.

FIG. 11 illustrates an exemplary circuit diagram 1100 including two independent control mechanisms of the instant application. The two independent control mechanisms include a main switching converter control mechanism 1110 and an auxiliary switching converter control mechanism 1120. The main switching converter control mechanism 1110 may be part of a power module that does not provide an interconnection for sharing the main switching control mechanism 1110 with an auxiliary switching converter.

The main switching converter control mechanism 1110 includes a main feedback voltage sense circuit 1112, a main error amplifier 1114, a main compensation circuit 1116, and a main control circuit 1118. The main feedback voltage sense circuit 1112 is connected at one end to the $V_{out}$ and at the other end to the main error amplifier 1114. The main feedback voltage sense circuit 1112 is configured to sense the $V_{out}$ through a network of resistors and capacitors including R1, R2, C1, and C2. The network of resistors R1 and R2 form a resistor divider and scale the signal $V_{out}$ to make it proportional to $V_{ref}$. The optional capacitors C1 and C2 are provided to make the divider frequency dependent. This frequency dependent divided $V_{out}$ may be referred to as feedback voltage $V_{fb}$. The feedback voltage $V_{fb}$ and a reference voltage $V_{ref}$ are input to the main error amplifier gm (shown as a trans-conductance (gm) amplifier) 1114. The main error amplifier 1114 may be either a current-output type transconductance amplifier or voltage-output type amplifier.

The main error amplifier 1114 monitors the feedback voltage $V_{fb}$ that is proportional to $V_{out}$ at its inverting input and a reference voltage $V_{ref}$ at its non-inverting input. The feedback voltage $V_{fb}$ should be approximately equal to the reference voltage $V_{ref}$. When these two voltages are substantially not equal, the main error amplifier 1114 may provide a transient signal at its output. The main frequency compensation circuit 1116 includes capacitors and resistors to provide frequency compensation for the feedback loop. The main frequency compensation circuit 1116 may attenuate the higher frequency component of the transient signal and output the lower frequency transient signal. The lower frequency transient signal is provided to the main control circuit 1118.

The main control circuit 1118 includes a comparator. The comparator receives at its inverting input the sensed current $i_{LDC}$ in the inductor of the main switching converter and at its non-inverting input the lower frequency component of the transient signal. The lower frequency component of the transient signal is compared with the sensed current $i_{LDC}$ in the inductor (low frequency inductor current) to generate the main control signal for driving the main switching converter.

The auxiliary switching converter control mechanism 1120 includes an auxiliary feedback sense circuit, an auxiliary error amplifier 1124, an auxiliary compensation circuit 1126, an auxiliary buffer, a high pass filter ("HPF"), and an auxiliary control circuit 1128. The auxiliary feedback sense circuit at one end is connected to the $V_{out}$ and at another end is connected to the auxiliary error amplifier 1124. The auxiliary feedback sense circuit includes a low pass filter. The low pass filter is configured to output the lower frequency average $V_{out}$ signal. The sensed $V_{out}$ is directly coupled to the inverting terminal of the auxiliary error amplifier 1124 and the lower frequency average $V_{out}$ signal is coupled to the non-inverting terminal of the auxiliary error amplifier 1124.

The sensed $V_{out}$ should be approximately equal to its lower frequency average $V_{out}$ signal during the steady-state operation. When these two voltages are not equal during a transient event, the auxiliary error amplifier 1124 may provide a higher frequency compensation component of the $V_{out}$ at its output. The auxiliary frequency compensation circuit 1126 includes capacitors and resistors to provide frequency compensation for the feedback loop. The auxiliary frequency compensation circuit 1126 may enhance the higher frequency compensation component of the $V_{out}$ and output the higher frequency compensation component of the $V_{out}$ to the auxiliary buffer and then to the HPF. The auxiliary buffer may be configured to provide electrical impedance transformation from the auxiliary compensation circuit 1126 to the auxiliary control circuit 1128. The higher frequency compensation component of the $V_{out}$ may then pass through the HPF to ensure it does not contain a lower frequency compensation component before being provided to the auxiliary control circuit 1128. The higher frequency compensation component of the $V_{out}$ is then provided to the non-inverting terminal of the auxiliary comparator and compared with the sensed current $i_{LAC}$ in the inductor (high frequency inductor current) of the auxiliary switching converter to generate an auxiliary control signal for driving the auxiliary switching converter.

In one specific example, $V_{in}$ may be 12V, $V_{out}$ may be 1V, the current load step may be 25 A, the switching frequency of the main switching converter may be 500 kHz, the switching frequency of the auxiliary switching converter may be 5 MHz, the inductance of the inductors in the main switching converter may be 220 nH, and the inductance of the inductor in the auxiliary switching converter may be 20 nH.

Figure 12:
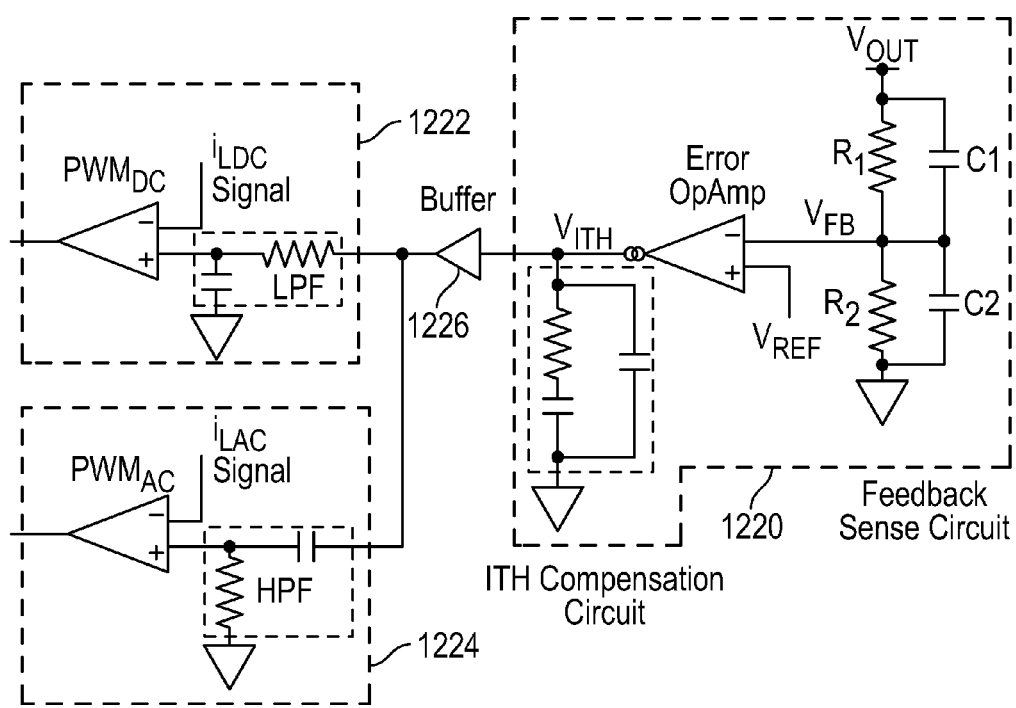
FIG. 12 illustrates another exemplary circuit diagram for the control loop of the power supply system shown in FIG. 6.

FIG. 12 illustrates another exemplary circuit diagram 1200 for the control loop of the power supply system 600 shown in FIG. 6. The circuit diagram 1200 includes a feedback and compensation mechanism 1220, a main control circuit 1222 and an auxiliary control circuit 1224. The feedback and compensation mechanism 1220 is similar to the feedback and compensation circuit 720 described with respect to FIG. 7. The control circuits 1222 and 1224 are similar to the control circuits 722 and 724 described with respect to FIG. 7 except they do not include their own buffer and instead share a common buffer 1226. The common buffer 1226 is configured to connect the feedback and compensation mechanism 1220 to the control circuits 1222 and 1224. As such, the circuit diagram 1200 has fewer components than the circuit diagram 700.

The common buffer 1226 is commonly shared by the main control circuit 1222 and the auxiliary control circuit 1224 and configured to isolate the main control circuit 1222 and the auxiliary control circuit 1224 from an impedance of the feedback and compensation circuit 1220. The common buffer 1226 at one end is connected to the output of the amplifier in the feedback and compensation circuit 1220 and at another end is connected to the main control circuit 1222 and the auxiliary control circuit 1224.

The main control circuit 1222 includes a low pass filter and a comparator. The low pass filter includes a resistor and a capacitor. The resistor at one end is connected to the output of the common buffer 1226 and at another end is connected to a first node. The capacitor at one end is connected to the first node and at another end is connected to the ground terminal. The comparator includes a non-inverting terminal, an inverting terminal, and an output terminal. The non-inverting terminal is connected to the first node and configured to receive the lower frequency component $ITH_{DC}$. The inverting terminal is connected to the inductor 616c and is configured to receive the sensed current $i_{LDC}$ in the inductor 616c (low frequency inductor current). The comparator is configured to compare the lower frequency component $ITH_{DC}$ with the sensed current $i_{LDC}$ and generate the main control signal for power FETs 616a and 616b.

The auxiliary control circuit 1224 includes a high pass filter and a comparator. The high pass filter includes a resistor and a capacitor. The capacitor at one end is connected to the output of the common buffer 1226 and at another end is connected to a second node. The resistor at one end is connected to the second node and at another end is connected to the ground terminal. The comparator includes a non-inverting terminal, an inverting terminal, and an output terminal. The non-inverting terminal is connected to the second node and configured to receive the higher frequency component $ITH_{AC}$. The inverting terminal is connected to the inductor 618c and is configured to receive the sensed current $i_{LAC}$ in the inductor 618c (high frequency inductor current). The comparator is configured to compare the higher frequency component $ITH_{AC}$ with the sensed current $i_{LAC}$ and generate the auxiliary control signal for power FETs 618a and 618b.

Figure 13A:
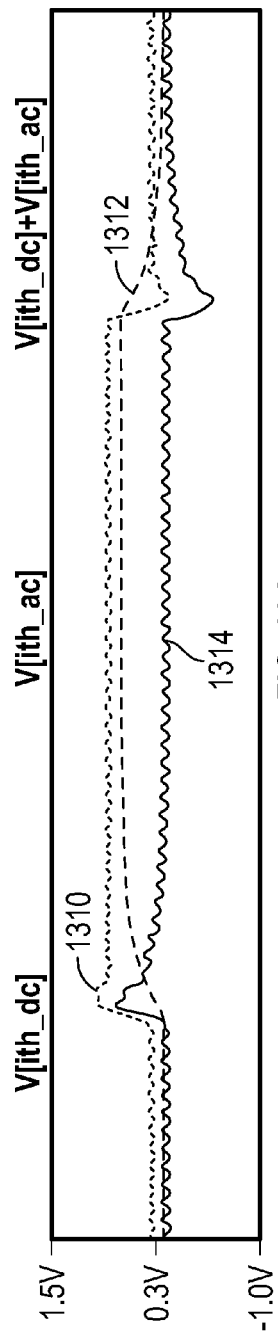
FIGS. 13A-13C illustrate exemplary load transient simulation waveforms for the power supply system 600 controlled by the control mechanism shown in FIG. 12.
Figure 13B:
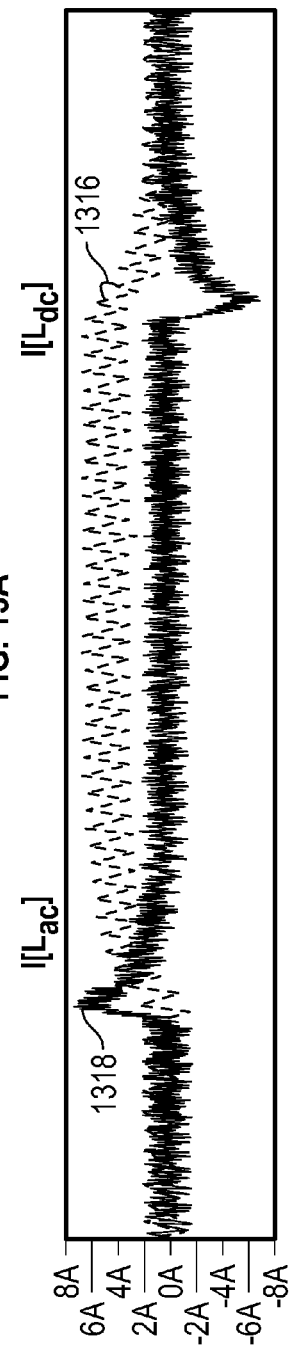
Figure 13C:
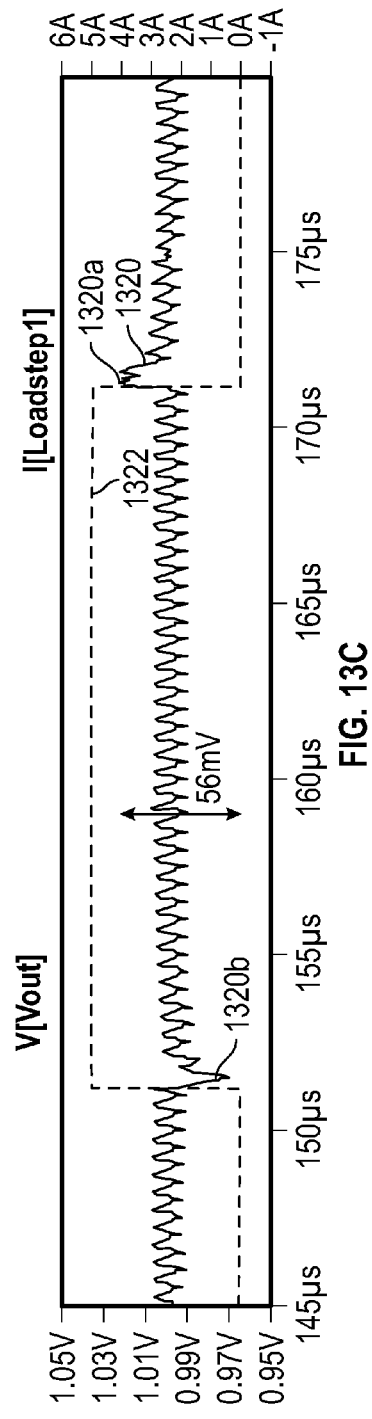

FIGS. 13A-13C illustrate exemplary load transient simulation waveforms for the power supply system 600 controlled by the control mechanism shown in FIG. 12. FIG. 13A illustrates the transient voltage signal ITH 1310, the higher frequency component $ITH_{AC}$ 1314 of the transient voltage signal ITH 1310, and the lower frequency component $ITH_{DC}$ 1312 of the transient voltage signal ITH 1310. As shown, the transient voltage signal ITH 1310 is a summation of the higher frequency component $ITH_{AC}$ 1314 and the lower frequency component $ITH_{DC}$ 1312. As shown, the higher frequency component $ITH_{AC}$ 1314 has a sharp rise in response to the positive edge of the current load step shown in FIG. 13C and then it slowly falls. Similarly, the higher frequency component $ITH_{AC}$ 1314 has a sharp fall in response to the negative edge of the current load step shown in FIG. 13C and then it slowly rises. In contrast, the lower frequency component $ITH_{DC}$ 1312 has a slow rise in response to the positive edge of the current load step shown in FIG. 13C and once it hits a given threshold level, it remains at that given threshold level for the duration of the current load step shown in FIG. 13C. Once the current load step terminates and in response to the negative edge of the current load step shown in FIG. 13C, the lower frequency component $ITH_{DC}$ 1312 slowly declines to a new threshold level. As such, the lower frequency component $ITH_{DC}$ 1312 is not shown to fade away after the transient ends.

FIG. 13B illustrates low frequency regulator inductor current waveform 1316 and high frequency regulator inductor current waveform 1318 during transients in the power supply system 600 shown in FIG. 6 and controlled by the control mechanism shown in FIG. 12. As shown, the low frequency regulator inductor current waveform 1316 tracks the lower frequency component $ITH_{DC}$ 1312, and the high frequency regulator inductor current waveform 1318 tracks the higher frequency component $ITH_{AC}$ 1314.

FIG. 13C illustrates output voltage overshoot 1320a and undershoot 1320b for a load step 1322 in the power supply system 600 shown in FIG. 6 and controlled by the control mechanism shown in FIG. 12. As shown, the voltage overshoot and undershoot for the circuit 1200 is minimized in response to the transient.

FIG. 14A illustrates another exemplary power supply system 1400A including two separate control signals for driving the main switching converter and the auxiliary switching converter. The power supply system 1400A includes a power source 1410, a load device 1412, and a power interface 1414 coupled to the power source 1410 and the load device 1412. The power source 1410 and the load device 1412 are similar to the power source 110 and the load device 112 shown in FIG. 1 and therefore for brevity are not described.

The power interface 1414 is similar to the power interface 514 with the exception that the power supply system 1400 employs only a low pass filter (LPF) for filtering out the higher frequency component of the transient signal instead of the high pass filter. To illustrate, the power interface 1414 includes a main switching converter 1416, an auxiliary switching converter 1418, a feedback and compensation circuit 1420, a main control circuit 1422, an auxiliary control circuit 1424, a LPF 1426, and an adder circuit 1428.

The main control circuit 1422 is coupled to the feedback and compensation circuit and the main switching converter 1416. The main control circuit 1422 is configured to receive the transient signal from the feedback and compensation circuit 1420 and to generate a main control signal based on the transient signal for driving the main switching converter 1416. In response to the main control signal, the main switching converter 1416 either sources or sinks current to the load device 1412. The current may be low frequency current due to the low switching frequency of the main switching converter 1416.

The main control circuit 1422 is configured to directly receive the transient signal from the feedback and compensation mechanism 1420. To this end and unlike the main control circuit 522, the main control circuit 1422 does not employ a low pass filter. Instead, to reduce the impact of the higher frequency component of the transient signal on the main switching converter 1416, the feedback and compensation circuit 1420 may output a transient signal with an attenuated higher frequency component. The transient signal is directly received by the main comparator inside the main control circuit 1422. The main comparator is configured to receive the transient signal from the feedback and compensation mechanism 1420 at its non-inverting terminal and the sensed low frequency inductor voltage sourced by the main switching converter 1416 at its inverting terminal and generate the main control signal.

The low pass filter 1426 at one end is coupled to the feedback and compensation circuit 1420 and at another end is coupled to the adder circuit 1428. The low pass filter 1426 is configured to receive the transient signal from the feedback and compensation circuit 1420 and output a lower frequency component of the transient signal to the adder circuit 1428. The adder circuit 1428 is coupled to the low pass filter 1426 and the feedback and compensation circuit 1420.

The adder circuit 1428 is configured to receive the lower frequency component of the transient signal from the low pass filter 1426 at its inverting terminal and the transient signal from the feedback and compensation circuit 1420 at its non-inverting terminal, subtract the lower frequency component of the transient signal from the transient signal, and output the higher frequency component of the transient signal to the auxiliary control circuit 1424. In addition, the adder may also have an amplify gain K to enhance its output of the higher frequency component of transient signal.

The auxiliary control circuit 1424 is coupled to the adder circuit 1428 and the auxiliary switching converter 1418. The auxiliary control circuit 1424 is configured to receive the higher frequency component of the transient signal and generate an auxiliary control signal based on the higher frequency component for driving the auxiliary switching converter 1418. In response to the auxiliary control signal, the auxiliary switching converter 1418 either sources or sinks current to the load device 1412. The current may be high frequency current due to the high switching frequency of the auxiliary switching converter 1418. However, the current may only be sourced or sunk during the transient and not in steady state. In the steady state, the average current output from the auxiliary switching converter 1418 may be substantially zero.

The auxiliary control circuit 1424 may include an auxiliary comparator. The auxiliary comparator is configured to receive the higher frequency component of the transient signal from the adder circuit 1428 at its non-inverting terminal and the sensed high frequency inductor voltage sourced by the auxiliary switching converter 1418 at its inverting terminal and generate the auxiliary control signal.

Figure 14B:
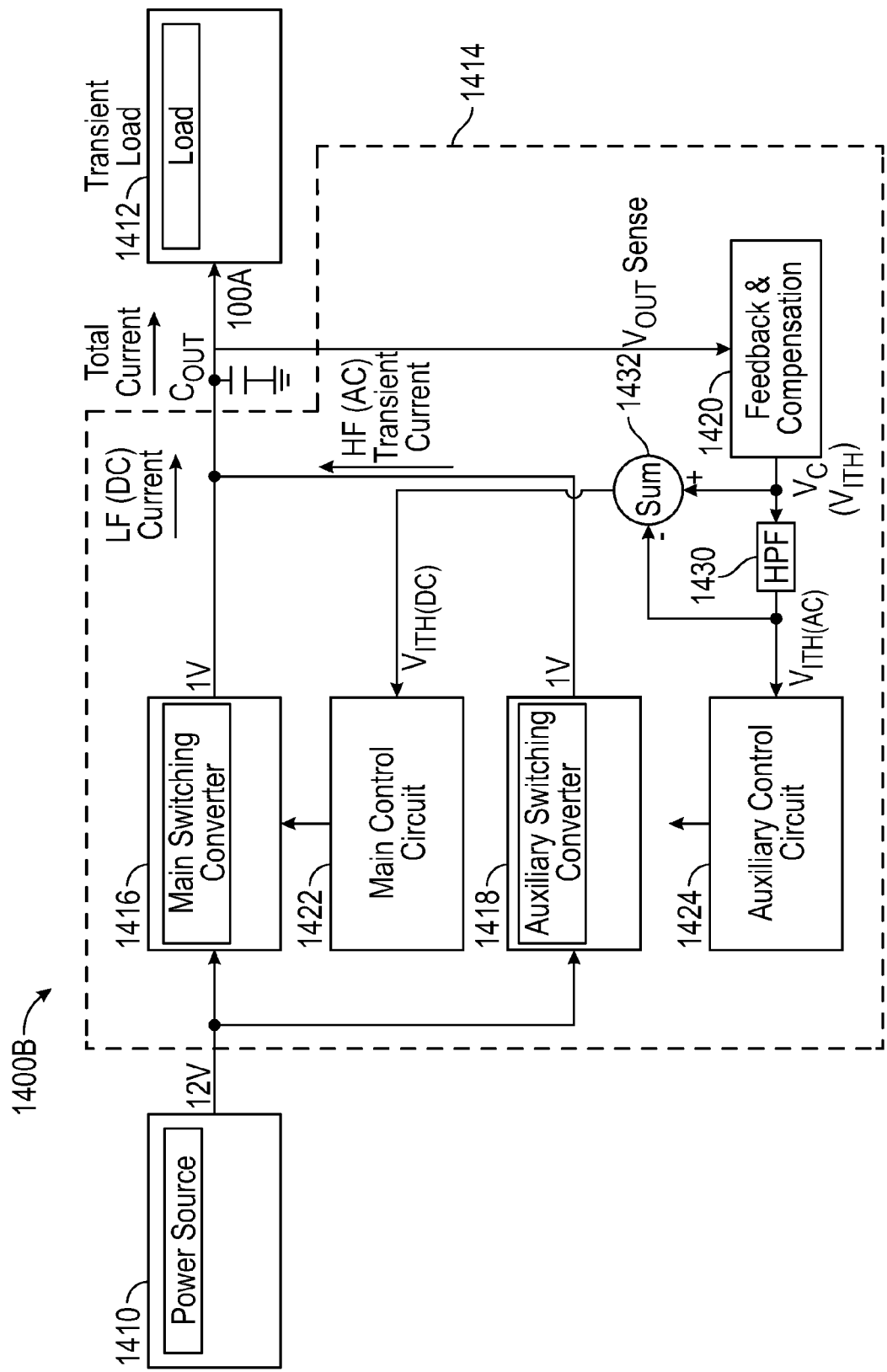
FIG. 14B illustrates another exemplary power supply system including two separate control signals for driving the main switching converter and the auxiliary switching converter.

FIG. 14B illustrates another exemplary power supply system 1400B including two separate control signals for driving the main switching converter and the auxiliary switching converter. The power supply system 1400B is similar to the power supply system 1400A except the power supply system 1400B utilizes a high pass filter (HPF) instead a low pass filter.

To this end, the power supply system 1400B includes a main switching converter 1416, an auxiliary switching converter 1418, a feedback and compensation circuit 1420, a main control circuit 1422, an auxiliary control circuit 1424, a HPF 1430, and an adder circuit 1432. The main switching converter 1416, auxiliary switching converter 1418, feedback and compensation circuit 1420, main control circuit 1422, and auxiliary control circuit 1424 are similar to those described with respect to FIG. 14A and are not described further. The HPF 1430 and the adder circuit 1432 are described further below.

The HPF 1430 is coupled to the feedback and compensation circuit 1420, the auxiliary control circuit 1424, and the adder circuit 1432. The HPF is configured to receive the transient signal from the feedback and compensation circuit 1420 and output a higher frequency component of the transient signal. The higher frequency component of the transient signal is provided to the auxiliary control circuit 1424. The auxiliary control circuit 1424 is configured to generate an auxiliary control signal based on the higher frequency component of the transient signal for driving the auxiliary switching converter 1418. The higher frequency component is also supplied to the adder circuit 1432.

The adder circuit 1432 is coupled to HPF 1430, the feedback and compensation circuit 1420, and the main control circuit 1422. The adder circuit 1432 is configured to receive the higher frequency component of the transient signal from the HPF 1430 and the transient signal from the feedback and compensation circuit 1420 and output a lower frequency component of the transient signal to the main control circuit 1422. The main control circuit 1422 is configured to generate a main control signal based on the lower frequency component of the transient signal for driving the main switching converter 1416.

The adder circuit 1432 is configured to receive the higher frequency component of the transient signal from the HPF 1430 at its inverting terminal and the transient signal from the feedback and compensation circuit 1420 at its non-inverting terminal, subtract the higher frequency component of the transient signal from the transient signal, and output the lower frequency component of the transient signal to the main control circuit 1422.

Referring again to FIG. 14A, in another implementation, the LPF 1426 may be placed between node 1450 and the main control circuit 1422. In this manner, the transient signal is passed through the LPF 1426 to provide a lower frequency component of the transient signal to the main control circuit 1422. The lower frequency component of the transient signal also goes the inverting input of the adder circuit 1428. The adder circuit 1428 receives the transient signal on its non-inverting input and outputs the amplified higher frequency component of the transient signal to the auxiliary control circuit 1424 for controlling the auxiliary switching converter 1418. The amplification of the higher frequency component of the transient signal may increase the bandwidth and the response time of the auxiliary switching converter 1418 to the transient condition.

Figure 15:
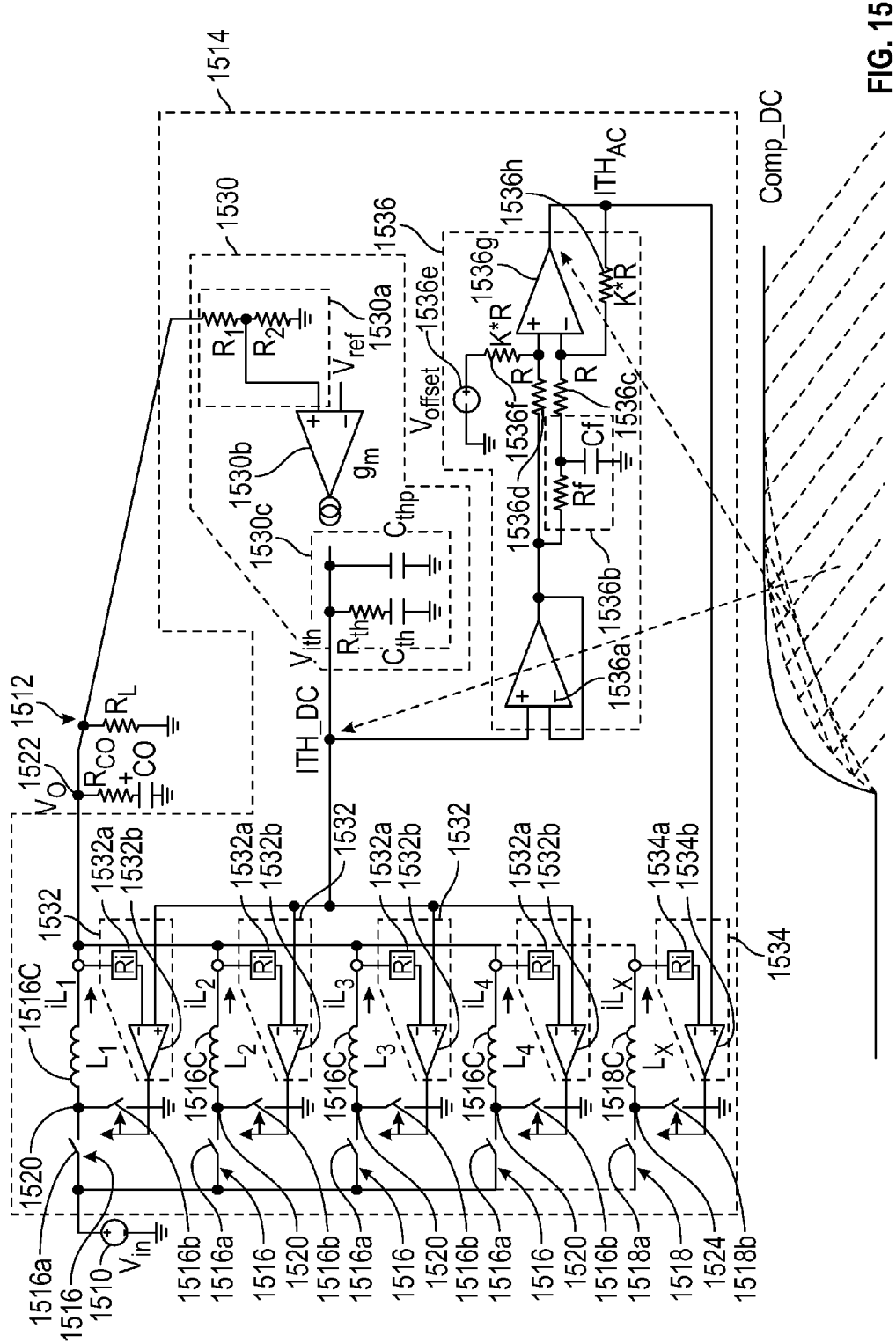
FIG. 15 illustrates an exemplary circuit diagram for the power supply system shown in FIG. 14A having a fast transient response.

FIG. 15 illustrates an exemplary circuit diagram 1500 for the power supply system 1400A shown in FIG. 14A having a fast transient response. As shown, the circuit diagram 1500 includes a power source 1510, a load device 1512, and a power interface device 1514 connecting the power source 1510 to the load device 1512. The power interface device 1514 includes a plurality of main switching converters 1516 and an auxiliary switching converter 1518 connected in parallel with each other. The power interface device 1514 also includes a feedback and compensation circuit 1530, a main control circuit 1532, an auxiliary control circuit 1534, and a high pass filter 1536.

The main switching converter 1516 and the auxiliary switching converter 1518 can be classified as pulse-width-modulation (PWM) type, producing a pulse train having a fixed frequency and a variable pulse width. The main switching converter 1516 is configured to run at a lower switching frequency fsw than that of the auxiliary switching converter 1518. The auxiliary switching regulator 1518 is configured to run at a higher frequency than that of the main switching regulator 1516 to quickly respond to the transients at the load device 1512. Although the specific example shows four main switching converters 1516 and a single auxiliary switching converter 1518, the power supply system 1500 may include more or less than four main switching converters 1516 and more than one auxiliary switching converter 1518. Any number of such regulators may be connected in parallel with each other.

The switching converters 1516 and 1518 may be current-mode switching regulators that include an inductor. The switching converters 1516 and 1518 may be synchronous switching regulators but they also may be non-synchronous switching regulators. In one specific example, the switching converters 1516 and 1518 may be a step-down, current mode, switching regulator in which the input voltage $V_{in}$ is greater than the output voltage $V_{out}$.

Each of the main switching converters 1516 may include a first main switch 1516a, a second main switch 1516b, and a main inductor 1516c. The first main switch 1516a and the second main switch 1516b may be power FET switches. The power FET switches may be n-channel FET or p-channel FET switches. Similarly, the auxiliary switching converter 1518 may include a first auxiliary switch 1518a, a second auxiliary switch 1518b, and an auxiliary inductor 1518c. The first auxiliary switch 1518a and the auxiliary second switch 1518b may be power FET switches. The FET switches may be n-channel FET or p-channel FET switches. Although FET type switches are described, other appropriate technologies may also be used.

In the main switching converter 1516, the first main switch 1516a may be connected at one end to the $V_{in}$ and at another end to a main node 1520. The second main switch 1516b may be connected at one end to the main node 1520 and at the other end to the ground terminal. The main inductor 1516c may be connected at one end to the main node 1520 and at the other end to the output terminal 1522. The output terminal 1522 may be connected to the output capacitor $C_{out}$ and the load resistance $R_L$.

In the auxiliary switching regulator 1518, the first auxiliary switch 1518a may be connected at one end to $V_{in}$ and at another end to an auxiliary node 1524. The second auxiliary switch 1518b may be connected at one end to the auxiliary node 1524 and at the other end to the ground terminal. The auxiliary inductor 1518c may be connected at one end to the auxiliary node 1524 and at the other end to the output terminal 1528.

The power interface device 1514 is configured to source or sink output current to the load device 1512 coupled to the output terminal 1522 to maintain a regulated voltage $V_{out}$ at the output terminal 1522. To this end, the first main switch 1516a and the second main switch 1516b in the main switching converter 1516 are switched ON and OFF by the main control circuit 1532. The switches 1516a and 1516b may be driven out of phase with respect to each other to source or sink current to the load device 1512 coupled to output terminal 1522. Similarly, the first auxiliary switch 1518a and the second auxiliary switch 1518b in the auxiliary switching regulator 1518 are switched ON and OFF by an auxiliary control circuit 1534. The switches 1518a and 1518b may be driven out of phase with respect to each other to source or sink current to the load device 1512 coupled to output terminal 1522.

The main switches 1516a and 1516b are configured to run at a first switching frequency. The auxiliary switches 1518a and 1518b are configured to run at a second switching frequency. The second switching frequency may be higher than the first switching frequency to respond to the transients at the output terminal 1522 more quickly. That is, due to the faster switching frequency, the auxiliary switching converter 1518 is configured to source or sink current to or from the output terminal 1522 more quickly than the main switching converter 1516. Due to the higher frequency, the auxiliary switching converter 1518 may have more power loss than the main switching converter 1516. To reduce the power loss associated with the auxiliary switching converter 1518, the operation of the auxiliary switching converter 1518 may be controlled such that in the steady-state operation, the auxiliary switching converter 1518 provides substantially zero low frequency (or DC) current to the output terminal 1522 as discussed above.

Although not shown, additional circuit may be added to the power interface device 1514 to provide a brief dead-time or blanking interval between the moment that one switching transistor turns OFF and the moment that the other switching transistor turns ON. When the switches 1516a, 1518a are ON and the switches 1516b, 1518b are OFF, current flows from the $V_{in}$ to the output terminal 1522 through the inductors 1516c, 1518c in each of the switching converters 1516 and 1518. In this scenario, the rate of change of inductor current 1516c and 1518c over time may be equal to $(V_{in} - V_{out})/L$. When the switches 1516a, 1518a are OFF and the switches 1516b, 1518b are ON, current flows from the ground terminal to output terminal 1522 though the inductors 1516c and 1518c. In this scenario, the rate of change of inductor currents 1516c and 1518c over time may be equal to $-V_{out}/L$. In each of the above-described scenarios, the total current at the output terminal 1522 may be the cumulative inductor currents through inductors 1516c and 1518c.

The power interface device 1514 also includes the feedback and compensation mechanism 1530. The feedback and compensation mechanism 1530 is connected at one end to the output terminal 1522 and at the other end to the main control circuit 1532 and the auxiliary control circuit 1534. In one implementation, a low pass filter may be connected in between the feedback and compensation mechanism 1530 and the main control circuit 1532. The low pass filter is configured to filter out the higher frequency component of the transient signal ITH and provide the main control circuits 1532 with only the low frequency component of the transient signal. In another implementation, the components of the compensation circuit may be selected such that the transient signal ITH has an attenuated higher frequency component such that it can be directly supplied to the main control circuits 1532 as shown in FIG. 15.

The feedback and compensation circuit 1530 includes a feedback sense circuit 1530a, an error amplifier 1530b, and a compensation circuit 1530c. The feedback sense circuit 1530a is configured to sense the $V_{out}$ through a network of resistors $R_1$ and $R_2$. The network of resistors $R_1$ and $R_2$ form a resistor divider and scale the signal $V_{out}$ to make it proportional to $V_{ref}$. In one implementation, the resistor $R_1$ is equal to 4.16 kilohms and $R_2$ is equal to 10 kilohms.

Although not shown, the feedback sense circuit 1530a may also include a network of capacitors $C_1$ and $C_2$. The optional capacitors $C_1$ and $C_2$ may be provided to make the resistor divider frequency dependent. This frequency dependent divided $V_{out}$ may be referred to as feedback voltage $V_{fb}$. The feedback voltage $V_{fb}$ and a reference voltage $V_{ref}$ are provided as input to the error amplifier gm (shown as a trans-conductance (gm) amplifier) 1530b. In one implementation, the reference voltage $V_{ref}$ may correspond to the regulated output voltage In one specific example, the reference voltage $V_{ref}$ is equal to 0.6 volt. The error amplifier 1530b may be either a current-output type transconductance amplifier or voltage-output type amplifier.

The error amplifier 1530b monitors the feedback voltage $V_{fb}$ that is proportional to $V_{out}$ at its inverting input and a reference voltage $V_{ref}$ at its non-inverting input. The feedback voltage $V_{fb}$ should be approximately equal to the reference voltage $V_{ref}$. When these two voltages are not substantially equal, the error amplifier 1530b may provide a transient signal ITH at its output. As described before, depending on the type of the error amplifier 1530b, the error amplifier 1530b may output a transient voltage signal ITH or a transient current signal ITH. In the following examples, it is assumed that the error amplifier 1530b outputs a transient voltage signal ITH.

The output voltage of the error amplifier 1530b may correspond to the difference between the actual output voltage and the desired output voltage. The output voltage of the error amplifier 1530b is inverse to the feedback voltage $V_{fb}$. As the feedback voltage $V_{fb}$ decreases, the output voltage of the error amplifier 1530b increases. As the feedback voltage $V_{fb}$ increases, the output voltage of error amplifier 1530b decreases. The frequency compensation circuit 1530c includes capacitors $C_{th}$ and $C_{thp}$ and a resistor $R_{th}$ to provide frequency compensation for the feedback loop. In one implementation, $C_{th}$ is equal to 1.5 nF, $C_{thp}$ is equal to 100 pF, and resistor $R_{th}$ is equal to 10 kilohms. In the current-mode supply system, instead of voltage, the error amplifier 1530b may provide transient current signal at its output. In either case, the transient signal (current or voltage) is used to control the total output current of converters 1516 and 1518.

The main control circuit 1532 includes a main resistor 1532a and a main comparator 1532c. The main control circuit 1532 may also include a main buffer. The main buffer may be configured to provide electrical impedance transformation from the feedback and compensation mechanism 1530 to the main control circuit 1532. The main buffer may be a voltage buffer or a current buffer. The type of the main buffer may be selected based on the type of the error amplifier 1530b. The main comparator 1532c is configured to receive at its non-inverting input either the transient signal ITH or the lower frequency component $ITH_{DC}$ of the transient signal ITH and compare it with the sensed voltage $i_L * R_i$ (low frequency current of inductor 1516c*resistance Ri) to generate the main control signal for power FETs 1516a and 1516b. The main resistor $R_i$ is provided to sense the main inductor 316c current and generate the corresponding voltage for comparison with the lower frequency component $ITH_{DC}$ of the transient signal ITH.

If the lower frequency component $ITH_{DC}$ is more than the sensed inductor voltage signal, the main comparator 1532b may output a first main control signal. The first main control signal may be a high signal. The high signal may be provided to the first main switch 1516a to turn ON the first main switch 1516a and enable the main switching converter 1516 to source additional current to the output terminal 1522 with the increased load current. The high signal may also be provided to an invertor connected to the second main switch 1516b to turn OFF the main switch 1516b. At the beginning of the clock cycle, the first main switch 1516a may turn ON with an increased duty cycle until the new current threshold due to the transient is reached. During the time the first main switch 1516a is ON, the current flows from the power source $V_{in}$ through the first main switch 1516a and the main inductor 1516c to the output terminal 1522. Due to the low switching frequency of the main switching converter 1516, the output current is a low frequency current. As a result, the low frequency current ramps up in the inductor 1516c toward the new current threshold.

In this manner, the main switching converter 1516 sources low frequency current tracking the lower frequency component $ITH_{DC}$ to reach the new current threshold set by the transient. In one implementation, during the transient, the first main switch 1516a may remain ON and the second main switch 1516b may remain OFF until the new current threshold set by the transient is reached. In another implementation, during the transient, the main switching converter 1516 may operate with an increased duty cycle to increase the sourced low frequency current to the output terminal 1522. During the increased duty cycle and in response to the main control signal, the main switches 1516a and 1516b may alternatively turn ON and OFF to increase the sourced low frequency current to the output terminal 1522. The increased duty cycle may correspond to the duty cycle of the main control signal. The fixed switching frequency of the main switching converter 1516 may not be maintained during the transient if the on-time for the first main switch 1516a is longer than the cycle time T, for example.

In one implementation, the main control circuit 1532 may activate only one of the main switching converters 1516 to source the necessary current to the output terminal 1522. In another implementation, the main control circuit 1532 may activate more than one of the main switching converters 1516 to source the necessary current to the output terminal 1522.

If the lower frequency component $ITH_{DC}$ is less than the sensed inductor signal, the main comparator 1532b may output a second main control signal. The second main control signal is a low signal. The low signal may be provided to the first main switch 1516a to turn OFF the first main switch 1516a. The low signal may also be provided to the invertor connected to the second main switch 1516b to turn ON the second main switch 1516b and enable the main switching converter 1516 to sink additional current from the output terminal 1522 with the decreased load current. At the beginning of the clock cycle, the first main switch 1516a may turn OFF with a decreased duty cycle and the second main switch 1516b may turn ON until the new current threshold due to the transient is reached. During the time the second main switch 1516b is ON, the low frequency current flows from the output terminal 1522 though the main inductor 1516c to the ground terminal. As a result, the low frequency current ramps down in the main inductor 1516c toward the new current threshold.

In this manner, the main switching converter 1516 sinks low frequency current tracking the lower frequency component $ITH_{DC}$ to reach the new current threshold set by the transient. In one implementation, during the transient, the first main switch 1516a may remain OFF and the second main switch 1516b may remain ON until the new current threshold set by the transient is reached. In another implementation, during the transient, the main switching converter 1516 may operate with a decreased duty cycle to increase the sunk low frequency current from the output terminal 1522. During the decreased duty cycle and in response to the second main control signal, the main switches 1516a and 1516b may alternatively turn ON and OFF to increase the sunk low frequency current from the output terminal 1522. In either case, the fixed switching frequency of the main switching converter 1516 may not be maintained during the transient if the on-time for the second main switch 1516b is longer than the cycle time T, for example.

Once the transient ends (e.g., the new current threshold is reached), the main switching converter 1516 continues to source and sink current to maintain the stability of $V_{out}$ in accordance with its fixed switching frequency and a duty cycle. The on-time and the off-time of main switches 1516a and 1516b are determined based on the duty-cycle. In one specific example, the duty-cycle may correspond to the duty-cycle set prior to the transient. To this end, the main switching converter 1516 is configured to source and/or sink current both during the transient and steady-state operation.

As noted above, the total transient signal ITH output from the feedback and compensation circuit 1530 is also passed to the auxiliary control circuit 1534 via the high pass filter 1536. The high pass filter 1536 includes a buffer 1536a, a low pass filter 1536b, resistors 1536c and 1536d, an offset voltage 1536e, a resistor 1536f, an amplifier 1536g, and a resistor 1536h. The buffer 1536a is configured to isolate the auxiliary control circuit 1534 from the impedance of the feedback and compensation network 1530. The output of the buffer 1536a is supplied to the non-inverting terminal of the amplifier 1536g through the resistor 1536d. The output of the buffer 1536a is also supplied to the inverting terminal of the amplifier 1536g through the low pass filter 1536b and the resistor 1536c. The low pass filter 1536b includes a resistor $R_f$ and a capacitor $C_f$ and is configured to filter out the higher frequency component $ITH_{AC}$ of the transient signal ITH and forward the lower frequency component $ITH_{DC}$ of the transient signal ITH to the inverting terminal of the amplifier 1536g via the resistor 1536c. In one specific example, the resistance of the resistor $R_f$ is equal to 1 kilohms and the capacitance of the capacitor $C_f$ is equal to 1 nF.

The lower frequency component $ITH_{DC}$ is subtracted from the transient signal ITH (having both the higher frequency and lower frequency components) and the difference is amplified by a K factor. As such, the output of the amplifier 1536g may correspond to the amplified higher frequency component $ITH_{AC}$ of the transient signal ITH. The amplified higher frequency component $ITH_{AC}$ is supplied to the auxiliary control circuit 1534.

In one implementation, the resistors 1536c, 1536d, 1536f, and 1536h combined together provide a gain factor for the higher frequency component $ITH_{AC}$ of the transient signal ITH. In one specific example, the resistance of the resistors 1536c, 1536d, 1536f, and 1536h is equal to 10 kilohms. The factor K may be equal to 30.

The $V_{offset}$ 1536e may be provided so that during the steady-state operation, the low frequency (or DC) current of the auxiliary switching converter 1518 is substantially zero. To this end, the $V_{offset}$ 1536e may be set to a value corresponding to half ripple of the high frequency (or AC) current such that during the steady-state operation average ripple AC current is substantially equal to zero. In one specific example, the $V_{offset}$ 1536e is set to 100 millivolt.

The auxiliary control circuit 1534 includes an auxiliary resistor 1534a and an auxiliary comparator 1534b. The auxiliary resistor 1534a is provided to sense the auxiliary inductor 1518c current and provide the sensed auxiliary inductor 1518c voltage. The auxiliary comparator 1534b is configured to receive at its non-inverting terminal the amplified higher frequency component $ITH_{AC}$ and at its inverting terminal the sensed auxiliary inductor 1518c voltage. The auxiliary comparator 1534b compares the higher frequency component $ITH_{AC}$ with the sensed auxiliary inductor 1518c voltage.

If the higher frequency component $ITH_{AC}$ is more than the sensed auxiliary inductor signal, the comparator 1534b may output a first auxiliary control signal. The first auxiliary signal may be a high signal. The high signal may be provided to the first auxiliary switch 1518a to turn ON the first auxiliary switch 1518a and enable the auxiliary switching converter 1518 to source additional current to the output terminal 1522 with the increased load current. The high signal may also be provided to an invertor connected to the second auxiliary switch 1518b to turn OFF the second auxiliary switch 1518b. At the beginning of the clock cycle, the first auxiliary switch 1518a may turn ON with an increased duty cycle until the new current threshold due to the transient is reached. During the time the first auxiliary switch 1518a is ON, the high frequency current flows from the power source $V_{in}$ through the first auxiliary switch 1518a and auxiliary inductor 1518c to the output terminal 1522. As a result, the high frequency current ramps up in the auxiliary inductor 318c toward the new current threshold.

In this manner, the auxiliary switching converter 1518 sources high frequency current tracking the higher frequency component $ITH_{AC}$ to reach the new current threshold set by the transient. In one implementation, during the transient, the first auxiliary switch 1518a may remain ON and the second auxiliary switch 1518b may remain OFF until the new current threshold set by the transient is reached. In another implementation, during the transient, the auxiliary switching converter 1518 may operate with an increased duty cycle to increase the sourced high frequency current to the output terminal 1522. During the increased duty cycle and in response to the first auxiliary control signal, the auxiliary switches 1518a and 1518b may alternatively turn ON and OFF to increase the sourced high frequency current to the output terminal 1522. The increased duty cycle may correspond to the duty cycle of the first auxiliary control signal. The fixed switching frequency of the auxiliary switching converter 1518 may not be maintained during the transient if the on-time for the first auxiliary switch 1518a is longer than the cycle time T, for example. Once the steady-state is reached, the auxiliary switching converter 1518 may source and sink high frequency current with substantially zero average low frequency (or DC) current to the load device 1512.

If the higher frequency component $ITH_{AC}$ is less than the sensed auxiliary inductor current signal, the auxiliary comparator 1534b may output a second auxiliary control signal. The second auxiliary control signal is a low signal. The low signal may be provided to the first auxiliary switch 1518a to turn OFF the first auxiliary switch 1518a. The low signal may also be provided to the invertor connected to the second auxiliary switch 1518b to turn ON the second auxiliary switch 1518b and enable the auxiliary switching converter 1518 to sink additional current from the output terminal 1522 with the decreased load current. At the beginning of the clock cycle, the first auxiliary switch 1518a may turn OFF with a decreased duty cycle and the second auxiliary switch 1518b may turn ON until the new current threshold due to the transient is reached. During the time the first auxiliary switch 1518b is ON, the high frequency current flows from the output terminal 1522 though the auxiliary inductor 1518c to the ground terminal. As a result, the high frequency current ramps down in the auxiliary inductor 1518c toward the new current threshold.

In this manner, the auxiliary switching converter 1518 sinks high frequency current tracking the higher frequency component $ITH_{AC}$ to reach the new current threshold set by the transient. In one implementation, during the transient, the first auxiliary switch 1518a may remain OFF and the second auxiliary switch 1518b may remain ON until the new current threshold set by the transient is reached. In another implementation, during the transient, the auxiliary switching converter 1518 may operate with a decreased duty cycle to increase the sunk high frequency current from the output terminal 1522. During the decreased duty cycle and in response to the second auxiliary control signal, the auxiliary switches 1518a and 1518b may alternatively turn ON and OFF to increase the sunk high frequency current from the output terminal 1522. In either case, the fixed switching frequency of the auxiliary switching converter 1518 may not be maintained during the transient if the on-time for the second auxiliary switch 1518b is longer than the cycle time T, for example.

The control signals from the main control circuit 1532 and the auxiliary control circuit 1534 may be provided to a control circuit internal to the main switching converter 1516 and auxiliary switching converter 1518, respectively. The control circuit uses the main control signal of the main control circuit 1532 along with a system clock signal to control the state of main switches 1516a and 1516b of the main switching converter 1516. Similarly, the control circuit uses the auxiliary control signal of the auxiliary control circuit 1534 along with the system clock signal to control the state of auxiliary switches 1518a and 1518b of the auxiliary switching converter 1518.

If the main switching converter 1516 is a peak-current mode regulator, first its second (low-side) main switch 1516b may be turned OFF and then its first (high-side) main switch 1516a may be turned ON by internal clock, thereby increasing the current of the main inductor 1516c. Similarly, if the auxiliary switching converter 1518 is a peak-current mode regulator, first its first (low-side) auxiliary switch 1518b may be turned OFF and then its second (high-side) auxiliary switch 1518a may be turned ON by internal clock, thereby increasing the current of the auxiliary inductor 1518c.

If the main switching converter 1516 is a valley-current mode regulator, first the first (high-side) main switch 1516a is turned OFF and then the second (low-side) main switch 1516b is turned ON by internal clock or timer, thereby decreasing the current of the main inductor 1516c. Similarly, if the auxiliary switching converter 1518 is a valley-current mode regulator, first the first (high-side) auxiliary switch 1518a is turned OFF and then the second (low-side) auxiliary switch 1518b is turned ON by internal clock or timer, thereby decreasing the current of the inductor 1518c.

Figure 16A:
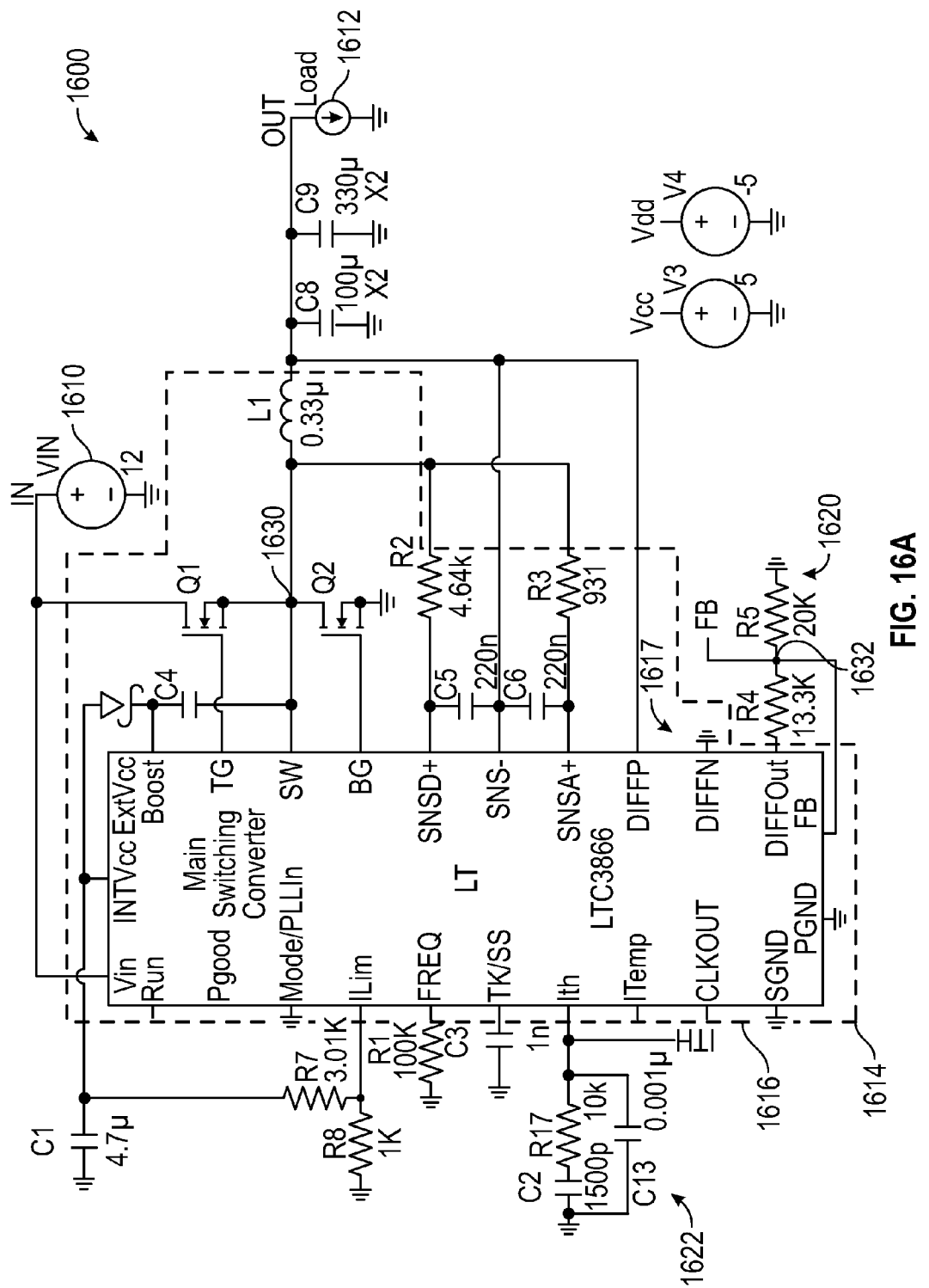
FIG. 16A illustrates an exemplary simulation circuit diagram 1600 for the power system shown in FIG. 15.
Figure 16A:
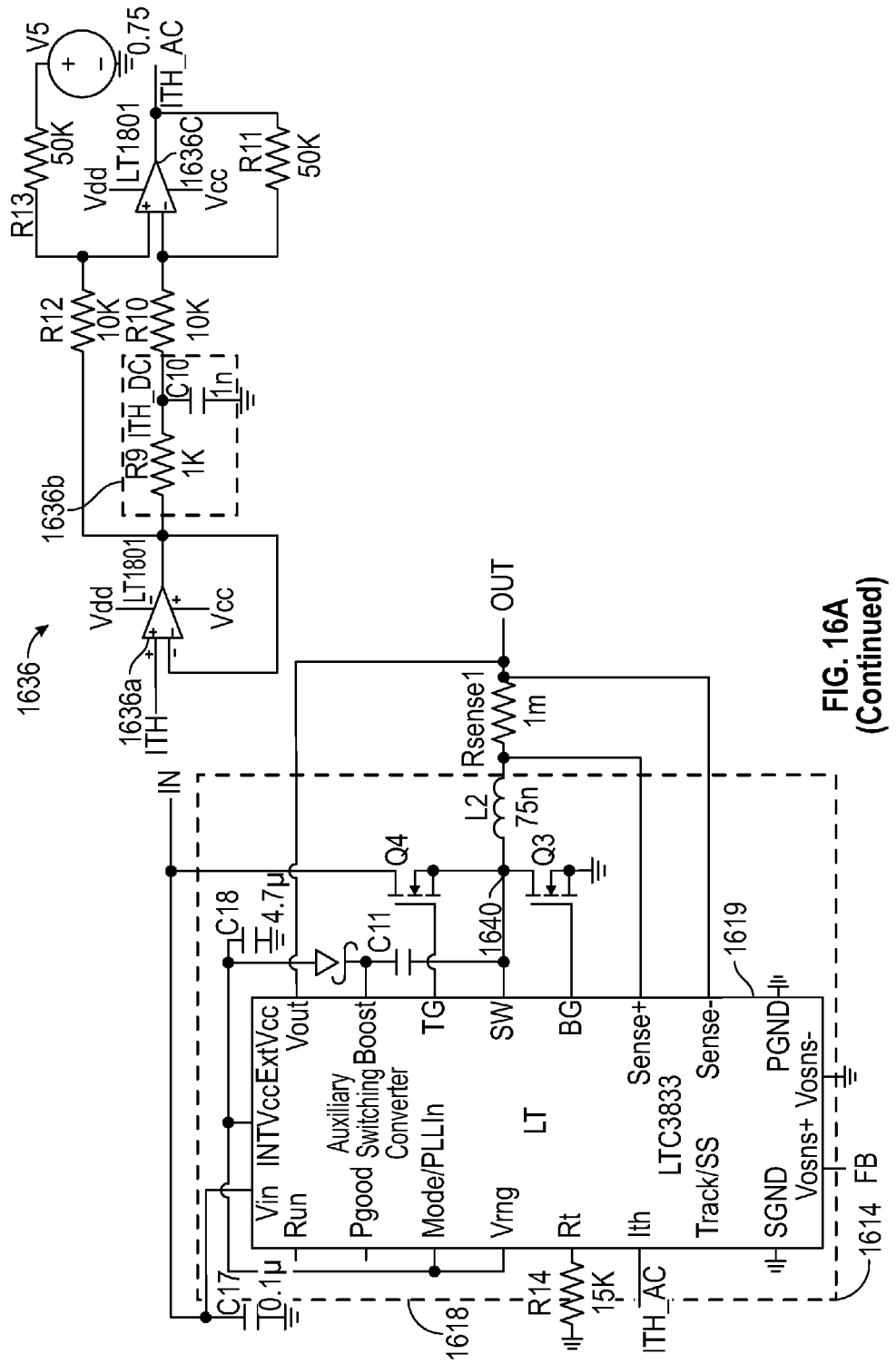

FIG. 16A illustrates an exemplary simulation circuit diagram 1600 for the power system 1500 shown in FIG. 15 with following values:

Power Supply $V_{in}$=12V
Output Voltage $V_{out}$=1V
Number of Main Switching Converter Phase=1
Number of Auxiliary Switching Converter Phase=1
Switching Frequency of Main Switching Converters $F_{sw-DC}$=400 kHz
Switching Frequency of Auxiliary Switching Converter $F_{sw-AC}$=2 MHz
Inductance of Main Switching Converter=330 nH (per phase)
Inductance of Auxiliary Switching Converter=75 nH
Output Capacitance Co=3*330 µF+2*100 µF In FIG. 16A, the circuit diagram 1600 includes a power source 1610, a load device 1612, and a power interface 1614. The power interface 1614 includes a main switching converter 1616 and an auxiliary switching converter 1618. The main switching converter 1616 includes a main controller 1617, a first main switch Q1, a second main switch Q2, and a main inductor L1. The main controller 1617 may be an LTC3866, produced by Linear Technology Corp. The LTC3866 is a single phase current mode synchronous step-down switching regulator controller that drives all N-channel power MOSFET switches.

The first main switch Q1 is connected to the power source 1610 at its drain terminal, a main node 1630 at its source terminal, and to the TG pin of the main controller 1617 at its gate terminal. The second main switch Q2 is connected to the main node 1630 at its drain terminal, a ground terminal at its source terminal, and to the BG pin of the main controller 1617 at its gate terminal. The main node 1630 is connected to the SW pin of the main controller 1617 and to the main inductor L1. The main inductor L1 at one end is connected to the main node 1630 and at another end is connected to the load device 1612 at the output terminal.

The auxiliary switching converter 1618 includes an auxiliary controller 1619, a first auxiliary switch Q4, a second auxiliary switch Q3, and an auxiliary inductor L2. The auxiliary controller 1619 may be LTC3833, produced by Linear Technology Corp. The LTC 3833 is a synchronous step-down DC/DC switching regulator controller targeted for high power applications. The controlled on-time valley current mode architecture allows for both fast transient response and constant frequency switching in steady-state operation, independent of VIN, VOUT and load current.

The first auxiliary switch Q4 is connected to the power source 1610 at its drain terminal, an auxiliary node 1640 at its source terminal, and to the TG pin of the auxiliary controller 1619 at its gate terminal. The second auxiliary switch Q3 is connected to the auxiliary node 1640 at its drain terminal, a ground terminal at its source terminal, and to the BG pin of the auxiliary controller 1619 at its gate terminal. The auxiliary node 1640 is connected to the SW pin of the auxiliary controller 1619 and to the auxiliary inductor L2. The auxiliary inductor L2 at one end is connected to the auxiliary node 1640 and at another end is connected to the load device 1612 at the output terminal through a sense resistor Rsense1.

The circuit diagram 1600 also includes a feedback sense circuit 1620, an error amplifier, a compensation circuit 1622, a high pass filter 1624. The feedback sense circuit 1620 includes resistors R4 and R5. The resistor R4 at one end is connected to the output terminal through the DIFFOut pin of the main controller 1617 and at another end is connected to a node 1632. The resistor R5 at one is connected to the node 1632 and at another end is connected to the ground terminal. The node 1632 provides the feedback voltage $V_{fb}$ that is proportional to a reference voltage $V_{ref}$. The reference voltage $V_{ref}$ may correspond to the desired voltage at the output terminal. The feedback voltage is provided to the FB pin of the main controller 1617, which in turn may be provided to the error amplifier. The error amplifier compares the feedback voltage $V_{fb}$ with the reference voltage $V_{ref}$ and if they are not substantially equal to each other may output a transient signal ITH.

In one implementation, the error amplifier may be placed inside the main controller 1617. In another implementation, the error amplifier may be placed outside of the main controller 1617. The output transient signal ITH may be connected to the ITH pin of the main controller 1617. The ITH pin may in turn be connected to the feedback compensation circuit 1622. The feedback compensation circuit 1622 may be configured to provide frequency compensation for the feedback loop. As shown, in one specific example, the feedback compensation circuit 1622 includes a capacitor C2 and C13 and a resistor R17. The capacitor C2 at one end is connected to the ground terminal and at another end is connected to the resistor R17. The resistor R17 at one end is connected to the capacitor C2 and at another end is connected to the ITH pin of the main controller 1617. The capacitor C13 at one end is connected in parallel with the capacitor C2 and resistor R17.

The ITH signal is provided to the main controller 1617 for driving main switches Q1 and Q2. The main controller 1617 is connected to a network of resistors R2 and R3. The resistors are provided to sense the main inductor L1 current and provide the sensed main inductor L1 voltage. The sensed main inductor L1 voltage is compared with the transient signal ITH or a lower frequency component $ITH_{DC}$ of the transient signal ITH via a main comparator. The main comparator may be placed inside the main controller 1617. The main comparator is configured to receive at its non-inverting terminal the transient signal ITH or a lower frequency component $ITH_{DC}$ and at its inverting terminal the sensed main inductor L1 voltage. The main comparator compares the transient signal ITH or a lower frequency component $ITH_{DC}$ with the sensed main inductor L1 voltage.

If the transient signal ITH or a lower frequency component $ITH_{DC}$ is more than the sensed main inductor signal, the main comparator may output a first main control signal. As described above, the first main control signal may be a high signal configured to enable the main switching converter 1616 to source additional current to the output terminal with the increased load current. If the transient signal ITH or a lower frequency component $ITH_{DC}$ is less than the sensed main inductor signal, the main comparator may output a second main control signal. As described above, the second main control signal may be a low signal configured to enable the main switching converter 1616 to sink additional current from the output terminal with the decreased load current.

The transient signal ITH is also passed to the high pass filter 1624. The high pass filter 1636 includes a buffer 1636a, a low pass filter 1636b, resistors R10-R13, an offset voltage V5, and an amplifier 1636c. The buffer 1636a is configured to isolate the auxiliary controller 1619 from the impedance of the feedback and compensation network 1622. The output of the buffer 1636a is supplied to the non-inverting terminal of the amplifier 1636c through the resistor R12. The output of the buffer 1636a is also supplied to the inverting terminal of the amplifier 1636c through the low pass filter 1636b and the resistor R10. The low pass filter 1636b includes a resistor R9 and a capacitor C10 and is configured to filter out the higher frequency component $ITH_{AC}$ of the transient signal ITH and forward the lower frequency component $ITH_{DC}$ of the transient signal ITH to the inverting terminal of the amplifier 1636c via the resistor R10.

The lower frequency component $ITH_{DC}$ is subtracted from the transient signal ITH (having both the higher frequency and lower frequency components) and the difference is amplified by a K factor. As such, the output of the amplifier 1636c may correspond to the amplified higher frequency component $ITH_{AC}$ of the transient signal ITH. The amplified higher frequency component $ITH_{AC}$ is supplied to ITH pin of the auxiliary controller 1616.

In one implementation, the resistors R10-R13 combined together provide a gain factor for the higher frequency component $ITH_{AC}$ of the transient signal ITH. The $V_{offset}$ V5 may be provided so that during the steady-state operation, the low frequency (or DC) current of the auxiliary switching converter 1618 is substantially zero. To this end, the $V_{offset}$ V5 may be set to a value corresponding to half ripple of the high frequency (or AC) current such that during the steady-state operation average ripple AC current is substantially equal to zero.

The higher frequency component $ITH_{AC}$ is provided to auxiliary controller 1619 for driving auxiliary switches Q3 and Q4. The auxiliary controller 1619 is connected to the resistor Rsense. The resistor Rsense is provided to sense the auxiliary inductor L2 current and provide the sensed auxiliary inductor L2 voltage. The sensed auxiliary inductor L2 voltage is compared with the high frequency component $ITH_{AC}$ via an auxiliary comparator. The auxiliary comparator may be placed inside the auxiliary controller 1619. The auxiliary comparator is configured to receive at its non-inverting terminal the amplified higher frequency component $ITH_{AC}$ and at its inverting terminal the sensed auxiliary inductor L2 voltage. The auxiliary comparator compares the higher frequency component $ITH_{AC}$ with the sensed auxiliary inductor L2 voltage.

If the higher frequency component $ITH_{AC}$ is more than the sensed auxiliary inductor signal, the auxiliary comparator may output a first auxiliary control signal. As described above, the first auxiliary control signal may be a high signal configured to enable the auxiliary switching converter 1618 to source additional current to the output terminal 1522 with the increased load current. If the higher frequency component $ITH_{AC}$ is less than the sensed auxiliary inductor signal, the auxiliary comparator may output a second auxiliary control signal. As described above, the second auxiliary control signal may be a low signal configured to enable the auxiliary switching converter 1618 to sink additional current from the output terminal with the decreased load current.

Figure 16B:
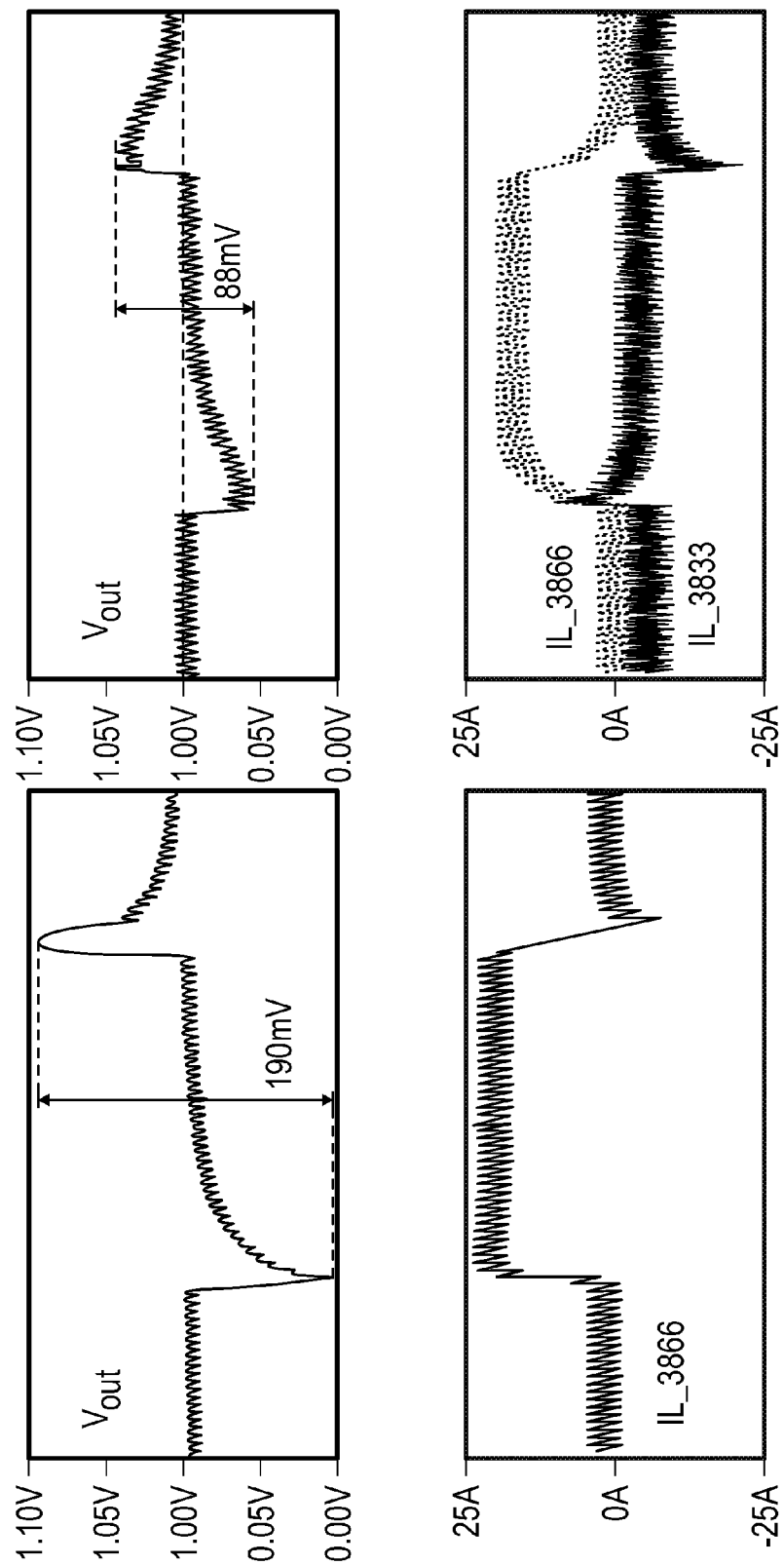
FIG. 16B illustrates a load transient performance comparison between a first power supply system having single phase lower frequency buck converter for handling both the lower frequency and higher frequency components of the transient signal and a second power supply system shown in FIG. 16A having a single phase lower frequency converter for handling lower frequency component of the transient signal and a higher frequency converter for handling high frequency component of the transient signal.

FIG. 16B illustrates a load transient performance comparison between a first power supply system having single phase lower frequency buck converter for handling both the lower frequency and higher frequency components of the transient signal and a second power supply system having a single phase lower frequency converter for handling lower frequency component of the transient signal and a higher frequency converter for handling high frequency component of the transient signal. The second power supply system may correspond to the system shown in FIG. 16A. As can be seen the peak-to-peak voltage ripple during the load transient condition in the first power supply system is 190 mV. In contrast, the peak-to-peak voltage ripple during the transient condition in the second power supply system is 88 mV. That is, the second power supply system provides more than 50% transient ripple reduction, while maintaining similar efficiency in steady state operation.

Figure 17:
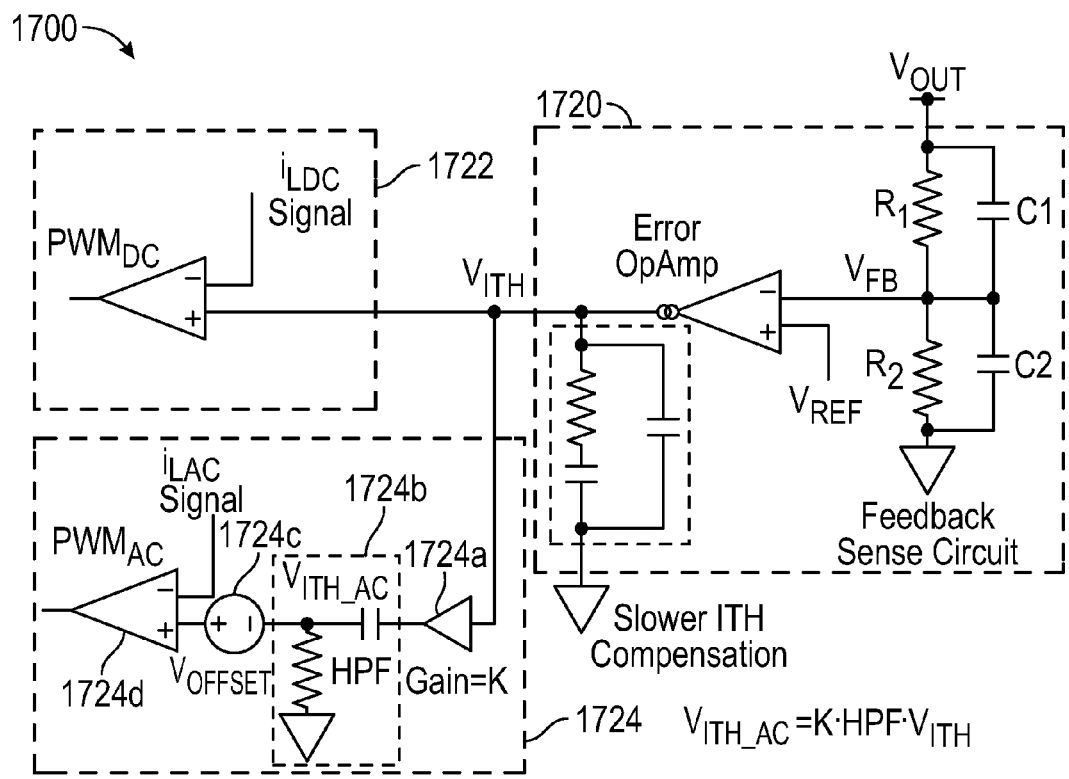
FIG. 17 illustrates another exemplary circuit diagram of a feedback control mechanism configured to control a power supply system having a main switching converter and an auxiliary switching converter.

FIG. 17 illustrates another exemplary circuit diagram of a feedback control mechanism 1700 configured to control a power supply system having a main switching converter and an auxiliary switching converter. The feedback control mechanism 1700 may be used instead of the feedback control mechanism shown in FIGS. 6, 7, 10-12, and 15. The feedback control mechanism 1700 includes a feedback and compensation circuit 1720, a main control circuit 1722, and an auxiliary control circuit 1724. The feedback and compensation circuit 1720 is similar to the feedback and compensation circuit 620 and therefore it is not described further for brevity.

The auxiliary control circuit 1724 includes an auxiliary buffer 1724a, which has a gain of K, a high pass filter 1724b, an offset voltage 1724c, and an auxiliary comparator 1724d. The auxiliary buffer 1724a at one end is coupled to the feedback and compensation circuit 1720 and at another end is coupled to the high pass filter 1724b. The auxiliary buffer 1724a is configured to isolate the auxiliary control circuit 1724 from an impedance of the feedback and compensation circuit 1720. The high pass filter 1724b is coupled to the auxiliary buffer 1724a and the offset voltage 1724c. The high pass filter 1724b is configured to receive the transient signal ITH from the auxiliary buffer 1724a and output a higher frequency component $ITH_{AC}$ of the transient signal TIH. The high pass filter 1724b includes a capacitor and a resistor. The capacitor at one end is connected to the auxiliary buffer 1724a and at another end is connected to the offset voltage 1724c. The resistor at one end is connected to the offset voltage 1724c and at another end to the ground terminal.

The offset voltage 1724c includes a positive terminal and a negative terminal. The positive terminal of the offset voltage 1724c is coupled to the non-inverting terminal of the auxiliary comparator 1724d. The negative terminal of the offset voltage 1724c is coupled to the high pass filter 1724b. The auxiliary comparator 1724d is configured to receive the buffered higher frequency component of the transient signal plus the offset voltage at non-inverting terminal and a sensed high frequency inductor voltage sourced by the auxiliary switching converter at the inverting terminal and generate an auxiliary control signal for driving the auxiliary switching converter.

The offset voltage 1724c is configured to offset high frequency current sourced by the auxiliary switching converter to enable sourcing substantially zero average current from the auxiliary switching converter outside of the transient, during the steady state. The auxiliary buffer 1724a also amplifies the higher frequency component of the transient signal. This may be necessary since the feedback and compensation circuit 1720 may attenuate the higher frequency component of the transient signal as further described below.

The main control circuit 1722 includes a main comparator 1722a and does not include a buffer and a low pass filter. The main comparator 1722a is configured to receive the transient signal ITH directly from the feedback and compensation circuit 1720 at its non-inverting terminal and sensed inductor current from the main switching converter and generate a main control signal. The main control signal is used to drive the main switching converter. To reduce the impact of the higher frequency component $ITH_{AC}$ of the transient signal ITH on the main switching converter, the higher frequency component $ITH_{AC}$ of the transient signal ITH may be attenuated by the compensation mechanism inside the feedback and compensation circuit 1720. This may be accomplished based on the values chosen for the resistors and capacitors in the compensation circuit. Since the higher frequency component $ITH_{AC}$ of the transient signal ITH is attenuated by the compensation circuit, the main control circuit 1722 may not need to filter out the high frequency component $ITH_{AC}$ and can utilize the transient signal ITH as-is to drive the main switching converter of the power supply system.

FIGS. 18A-18C illustrate exemplary load transient simulation waveforms for the power supply system controlled by the feedback control mechanism 1700 shown in FIG. 17. FIG. 18A illustrates the slower transient voltage signal ITH 1812 and the higher frequency component $ITH_{AC}$ 1814 extracted and amplified from the slower transient voltage signal ITH 1812. As shown, the higher frequency component $ITH_{AC}$ 1814 has a sharp rise in response to the positive edge of the current load step shown in FIG. 18C and then it slowly falls. Similarly, the higher frequency component $ITH_{AC}$ 1814 has a sharp fall in response to the negative edge of the current load step shown in FIG. 18C and then it slowly rises. In contrast, the slower transient voltage signal ITH 1812 has a slow rise in response to the positive edge of the current load step shown in FIG. 18C and once it hits a given threshold level, it remains at that given threshold level for the duration of the current load step shown in FIG. 18C. Once the current load step terminates and in response to the negative edge of the current load step shown in FIG. 18C, the slower transient voltage signal ITH 1812 slowly declines to a new threshold level. As such, the slower transient voltage signal ITH 1812 is not shown to fade away after the transient ends.

FIG. 18B illustrates low frequency regulator inductor current waveform 1816 and high frequency regulator inductor current waveform 1818 during transients in the power supply system controlled by the feedback control mechanism 1700 of FIG. 17. As shown, the low frequency regulator inductor current waveform 1816 tracks the slower transient signal ITH 1812, and the high frequency regulator inductor current waveform 1818 tracks the higher frequency component $ITH_{AC}$ 1814.

FIG. 18C illustrates output voltage overshoot 1820a and undershoot 1820b for a load step 1822 during transients in the power supply system controlled by the feedback control mechanism 1700 of FIG. 17. As shown, the voltage overshoot and undershoot for the power supply system is minimized in response to the transient.

Figure 19:
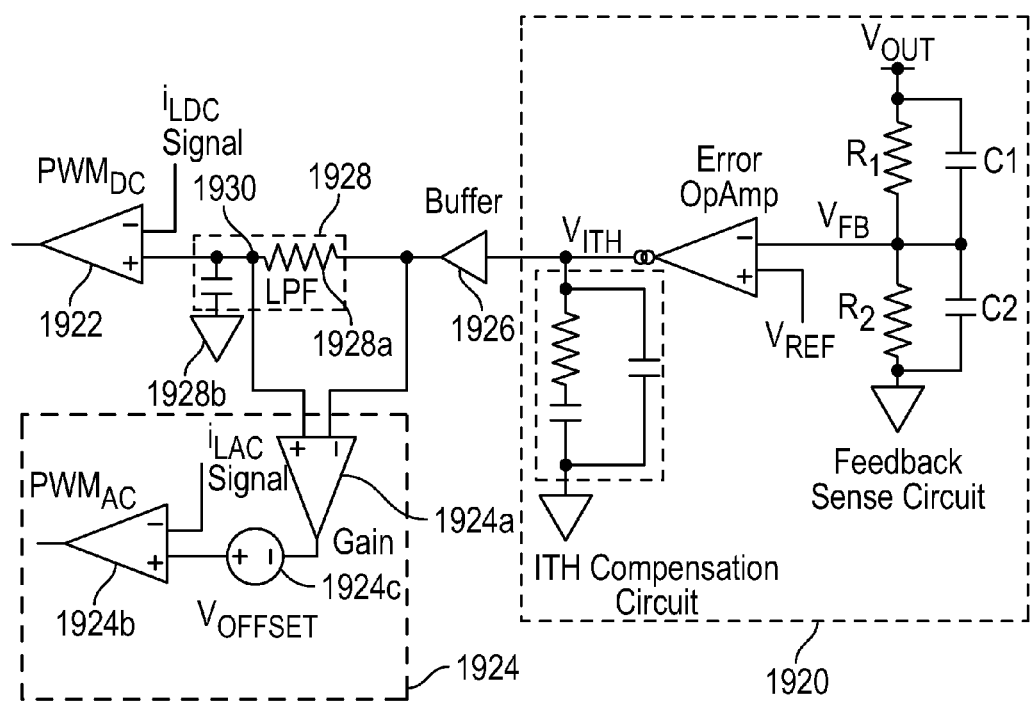
FIG. 19 illustrates another exemplary circuit diagram of a feedback control mechanism configured to control a power supply system having a main switching converter and an auxiliary switching converter.

FIG. 19 illustrates another exemplary circuit diagram of a feedback control mechanism 1900 configured to control a power supply system having a main switching converter and an auxiliary switching converter. The feedback control mechanism 1900 is similar to the feedback control mechanism 1200 except in the feedback control mechanism 1900 the control circuits 1922 and 1924 share a common RC filter 1928 in addition to a common buffer 1926. Additionally, the auxiliary control circuit 1924 includes an auxiliary buffer 1924a, which is not shown in the auxiliary control circuit 1224 of FIG. 12.

The common buffer 1926 is similar to the buffer 1226 of FIG. 12. The common RC filter 1928 is a single RC filter shared among the control circuits 1922 and 1924. The common RC filter 1928 includes a resistor 1928a and a capacitor 1928b. The common RC filter 1928 is configured to provide the lower frequency component of the transient signal to the main control circuit 1922 and a higher frequency component of the transient signal to the auxiliary control circuit 1924. The signal across the capacitor 1928*b* provides the lower frequency component of the transient signal and the differential signal across the resistor 1928*a* provides the higher frequency component of the transient signal.

The resistor 1928*a* is coupled to an output terminal of the common buffer 1926 at one end and to a first node 1930 at another end. The capacitor 1928*b* is coupled to the first node 1930 at one end and to a ground terminal at another end. The main control circuit 1922 includes a main comparator having a non-inverting terminal and an inverting terminal. The non-inverting terminal is coupled to the first node 1930. The inverting terminal is coupled to a main inductor of the main switching converter. The main comparator is configured to receive the lower frequency component $ITH_{DC}$ of the transient signal ITH from across the capacitor 1928*b* at the non-inverting terminal and sensed main inductor voltage at the inverting terminal and generate a main control signal based on the lower frequency component $ITH_{DC}$ of the transient signal ITH for driving the main switching converter.

The auxiliary control circuit 1924 includes the auxiliary buffer 1924*a* and an auxiliary comparator 1924*b* having a non-inverting input terminal and an inverting input terminal. The auxiliary buffer 1924*a* is configured to receive a higher frequency component $ITH_{AC}$ of the transient signal ITH from across the resistor 1928*a* and provide the higher frequency component $ITH_{AC}$ of the transient signal ITH to the non-inverting input terminal of the auxiliary comparator 1924*b* through an offset voltage 1924*c*. The auxiliary comparator 1924*b* is configured to compare the higher frequency component $ITH_{AC}$ of the transient signal ITH received at the non-inverting input terminal and a sensed auxiliary inductor voltage sourced by the auxiliary switching converter and received at the inverting terminal and generate an auxiliary control signal for driving the auxiliary switching converter. The offset voltage 1924*c* is configured to offset high frequency current sourced by the auxiliary switching converter to enable sourcing substantially zero average current from the auxiliary switching converter outside of the transient, during the steady state. The auxiliary buffer 1924*a* may have a gain factor and configured to amplify the higher frequency component $ITH_{AC}$ of the transient signal ITH by its gain factor. This may be necessary since the feedback and compensation circuit 1920, similar to the feedback and compensation circuit 1720, may attenuate the higher frequency component $ITH_{AC}$ of the transient signal ITH.

FIGS. 20A-20C illustrate exemplary load transient simulation waveforms for the power supply system controlled by a feedback control mechanism 1900 shown in FIG. 19. FIG. 20A illustrates the transient voltage signal ITH 2010, the higher frequency component $ITH_{AC}$ 2014 of the transient voltage control signal ITH 2010, and the lower frequency component $ITH_{DC}$ 2012 of the transient voltage control signal ITH 2010. As shown, the transient voltage control signal ITH 2010 is a summation of the higher frequency component $ITH_{AC}$ 2014 and the lower frequency component $ITH_{DC}$ 2012. The higher frequency component $ITH_{AC}$ 2014 has a sharp rise in response to the positive edge of the current load step shown in FIG. 20C then falls back. Similarly, the higher frequency component $ITH_{AC}$ 2014 has a sharp fall in response to the negative edge of the current load step shown in FIG. 20C then rises back. In contrast, the lower frequency component $ITH_{DC}$ 2012 has a slow rise in response to the positive edge of the current load step shown in FIG. 20C and once it hits a given threshold level, it remains at that given threshold level for the duration of the current load step shown in FIG. 20C. Once the current load step terminates and in response to the negative edge of the current load step shown in FIG. 20C, the lower frequency component $ITH_{DC}$ 2012 slowly declines to a new threshold level. As such, the lower frequency component $ITH_{DC}$ 2012 is not shown to fade away after the transient ends.

FIG. 20B illustrates the low frequency regulator inductor current waveform 2016 and the high frequency regulator inductor current waveform 2018 during transients in the power supply system controlled by the feedback control mechanism 1900 shown in FIG. 19. As shown, the low frequency regulator inductor current waveform 2016 tracks the lower frequency component $ITH_{DC}$ 2012, and the high frequency regulator inductor current waveform 2018 tracks the higher frequency component $ITH_{AC}$ 2014.

FIG. 20C illustrates output voltage overshoot 2020*a* and undershoot 2020*b* for a load step 2022 in the power supply system controlled by the feedback control mechanism 1900 shown in FIG. 19. As shown, the voltage overshoot and undershoot for the power supply system is minimized in response to the transient.

Instead of adding additional RC and buffer to the power interface, in one implementation, RC component of the compensation network may be used to provide the low pass filter and high pass filter. In this implementation, the compensation network and the filtering network may be combined into a single RC network to save component count. However, by using the compensation network to carry out the filtering network functionality as well, one may comprise the responsiveness of the circuit to the transient condition. This is mainly because there is now less flexibility in choosing different value for compensation and different value for filtering. As such, the power supply system of this implementation may have a longer settling time for higher frequency converter because the first priority is for the compensation circuit to ensure the whole loop is stable rather than to change current from the slower channel to the faster channel. As such, the transition time from the faster supply to the slower supply here is longer. In contrast, in the previous implementations there was a quicker transition from the faster supply to the slower supply. Here, there is longer conduction time for higher frequency converter. If the repetitive load transient does not happen frequently (e.g., once per minute) then the circuit can tolerate longer conduction time (e.g., burning more energy and consume more power). However, if the repetitive load transient happens frequently, then the higher frequency converter would be exposed to temperature rise, which reduces efficiency.

Figure 21A:
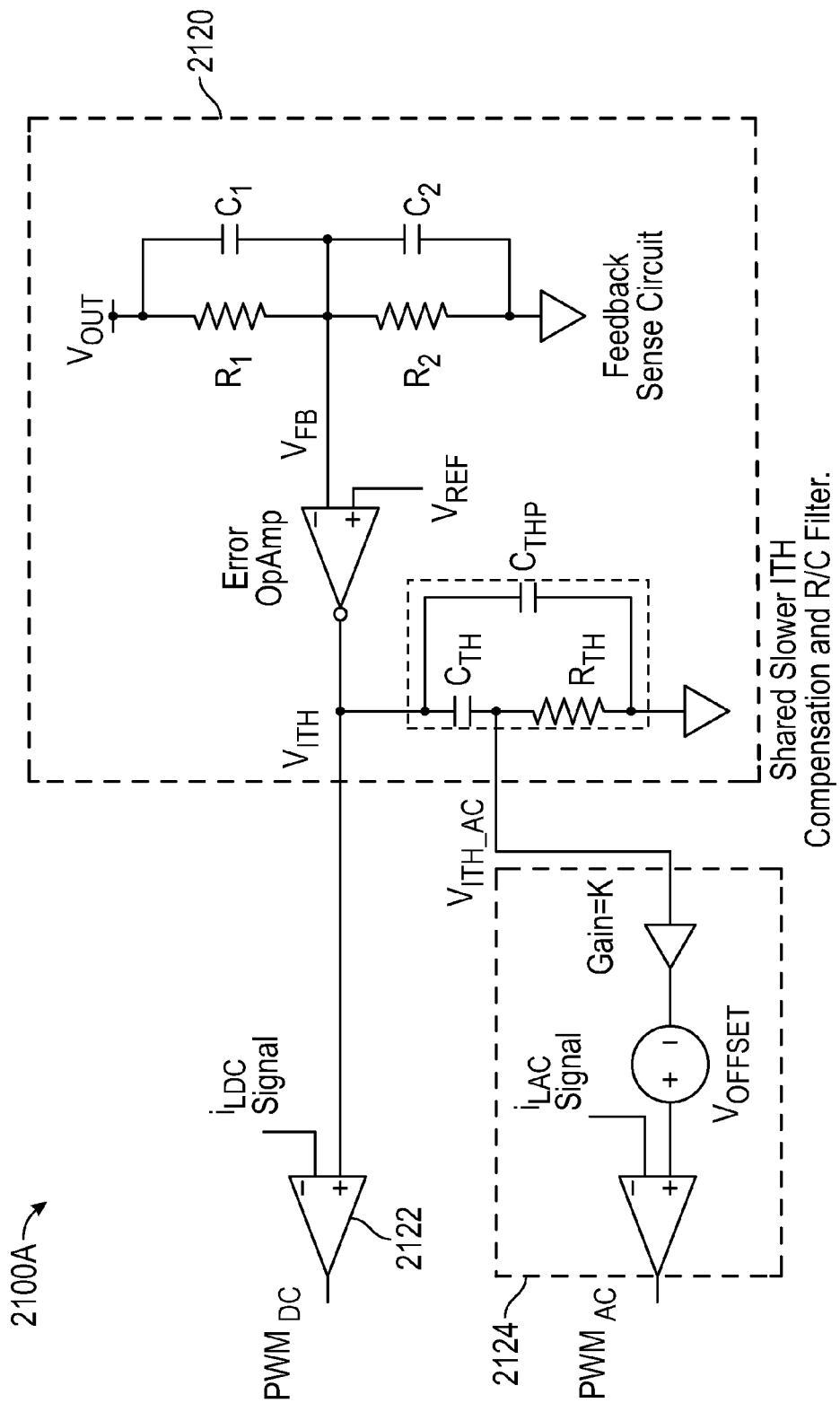
FIG. 21A illustrates another exemplary circuit diagram of a feedback control mechanism configured to a power supply system having a main switching converter and an auxiliary switching converter.

FIG. 21A illustrates another exemplary circuit diagram of a feedback control mechanism 2100A configured to control a power supply system having a main switching converter and an auxiliary switching converter. The feedback control mechanism 2100A have a combined compensation network and a filtering network. The feedback control mechanism 2100A is similar to the feedback control mechanism 1900 except that in the feedback control mechanism 2100A, the feedback and compensation mechanism 2120 carries out the filtering functionality instead of an additional RC located outside of the feedback and compensation mechanism. To this end, the control circuits 2122 and 2124 do not include an RC filter or a buffer. In this implementation, the signal across the capacitor $C_{TH}$ in the compensation network 2120 provides the lower frequency component of the transient signal and the differential signal across the resistor $R_{TH}$ in the compensation network 2120 provides the higher frequency component $ITH_{AC}$ of the transient signal ITH.

Figure 21B:
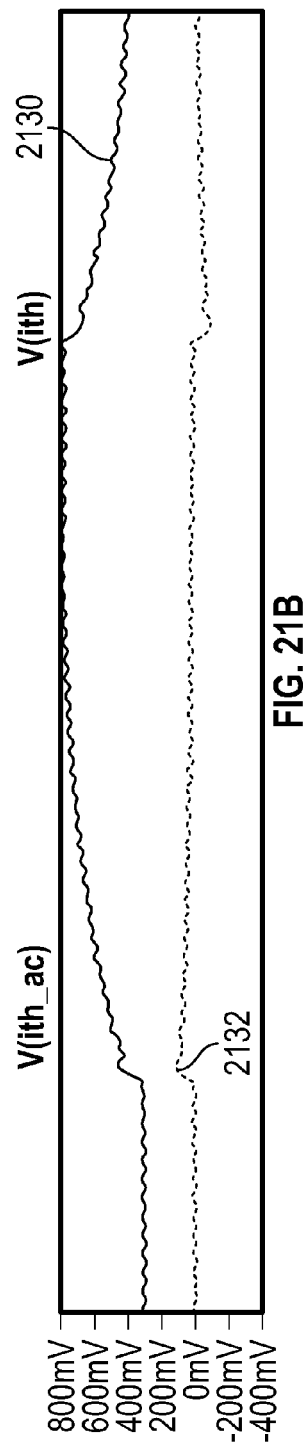
FIGS. 21B-21D illustrate exemplary load transient simulation waveforms for the power supply system controlled by the feedback control mechanism shown in FIG. 21A.
Figure 21C:
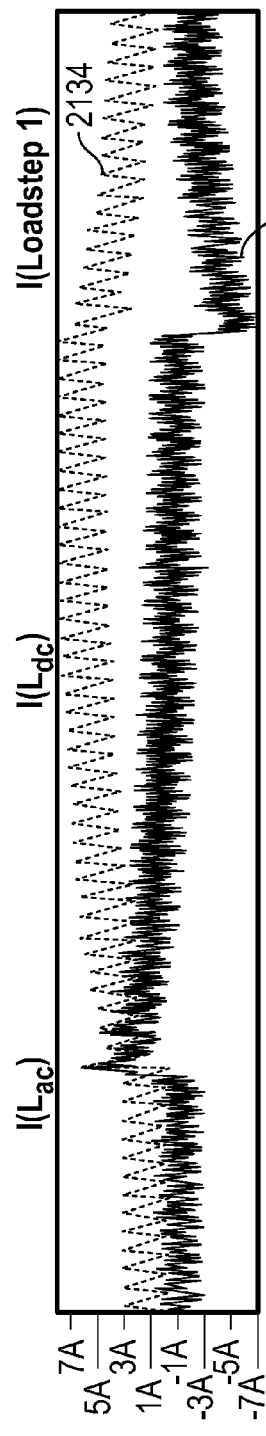
Figure 21D:
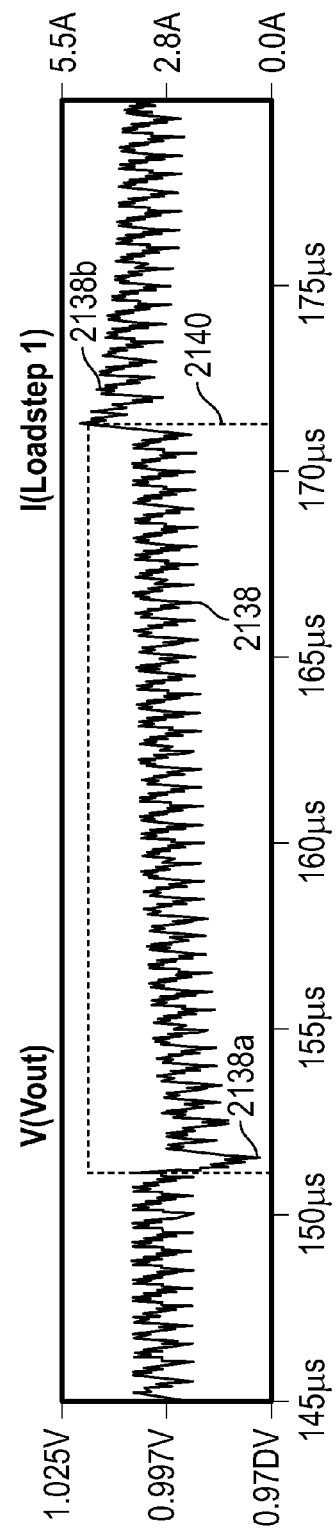

FIGS. 21B-21D illustrate exemplary load transient simulation waveforms for the power supply system controlled by the feedback control mechanism 2100A shown in FIG. 21A. FIG. 21B illustrates the transient voltage control signal ITH 2130 and the higher frequency component $ITH_{AC}$ 2132 of the transient voltage control signal ITH 2130. As shown, the higher frequency component $ITH_{AC}$ 2132 has a sharp rise in response to the positive edge of the current load step shown in FIG. 21D and falls back. Similarly, the higher frequency component $ITH_{AC}$ 2132 has a sharp fall in response to the negative edge of the current load step shown in FIG. 21D and rises back.

FIG. 21C illustrates low frequency main inductor current waveform 2134 and high frequency auxiliary inductor current waveform 2136 during transients in the power supply system controlled by the feedback control mechanism 2100A shown in FIG. 21A. The low frequency main inductor current waveform 2134 tracks the transient voltage control signal ITH 2130, and the high frequency auxiliary inductor current waveform 2136 tracks the higher frequency component $ITH_{AC}$ 2132.

FIG. 21D illustrates output voltage overshoot 2138b and undershoot 2138a for a load step 2140 in the power supply system controlled by the feedback control mechanism 2100A shown in FIG. 21A. As shown, the voltage overshoot and undershoot for the power supply system is minimized in response to the transient compared to the conventional power supply system not utilizing an auxiliary switching converter as shown for example in FIG. 16B.

All of the power supply systems discussed so far share a common power source for both the main switching converter and the auxiliary switching converter. To further increase the switching frequency or be more flexible, in one implementation, the power source may be separated for the main switching converter and the auxiliary switching converter. Since the auxiliary switching converter has a higher switching frequency, it has a higher switching loss; therefore, by reducing its input power source voltage, its frequency can be further increased without increased power loss.

Figure 22:
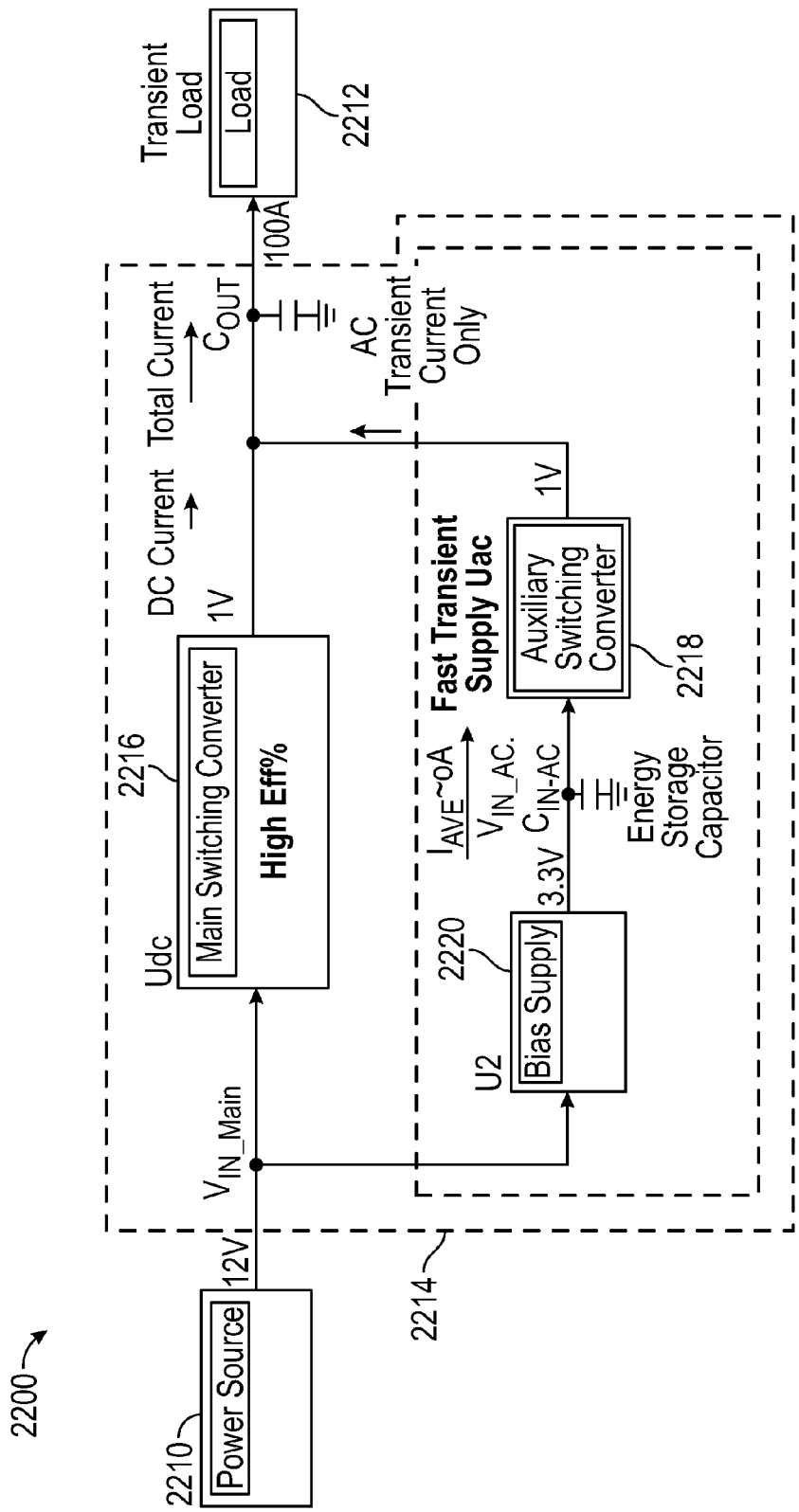
FIG. 22 illustrates another exemplary power supply system including two separate control signals for driving a main switching converter and an auxiliary switching converter.

FIG. 22 illustrates another exemplary power supply system 2200 including two separate control signals for driving a main switching converter and an auxiliary switching converter. In the power supply system 2200 an input voltage of the main switching converter is different from the input voltage of the auxiliary switching converter. The power supply system 2200 includes a power source 2210, a load device 2212, and a power interface 2214 coupled to the power source 2210 and the load device 2212.

The power source 2210 may be any power source such as, a battery, a grid, a solar photovoltaic cells, AC generator, and an output voltage rail of a front-end supply. In this specific example, the power source is a DC power source implemented to generate 12 volts. The transient load 2212 may be any load such as, for example, a resistive load, a heater, a capacitive load, an inductive load, etc. The power interface 2214 includes a main switching converter 2216, an auxiliary switching converter 2218, and a bias supply 2220, a feedback control mechanism (not shown). The feedback control mechanism may be any of the feedback control mechanisms previously discussed and may include a feedback and compensation circuit, a main control circuit, and an auxiliary control circuit.

The input of the main switching converter 2216 is coupled to the power source 2210, and the output of the main switching converter 2216 is coupled to the load device 2212. The main switching converter 2216 is also connected in parallel with the auxiliary switching converter 2218. The output of the auxiliary switching converter 2218 is coupled to the output of the main switching converter 2216. The input of the auxiliary switching converter 2218 is coupled to the bias supply 2220, which in turn is connected to the input of the main switching converter 2216.

The main switching converter 2216 may be of different topologies (e.g., a buck, a boost, a resonant, etc.) and may be configured to conduct only a low frequency current. To this end, the main switching converter 2216 may be switching at a lower frequency for good efficiency. On the other hand, the auxiliary switching converter 2218 may be configured to conduct only a high frequency AC current. To this end, the auxiliary switching converter 2218 may be switching at a higher frequency to track high frequency transient $ITH_{AC}$. In this manner, the auxiliary switching converter 2218 may have a high or higher power loss than the main switching converter 2216; however, this power loss may be limited in time. This limited time may correspond to the duration of the transient condition at the load device 2212. The average DC current of the auxiliary switching converter 2218 is near zero in steady state.

To further increase the switching frequency, the auxiliary switching converter 2218 is powered by the bias supply 2220. The bias supply 2220 may only maintain DC bias on $C_{IN\_AC}$, average DC current being approximately 0 A. The bias supply 2220 can be a low power linear regulator supply or a low power switching mode power supply. In this example, the bias supply 2220 is configured to further reduce the auxiliary supply input voltage from 12 volt to 3.3 volts to reduce power loss and increase efficiency of the power supply system 2200. $C_{IN\_AC}$ stores the energy ($C \cdot V^2 / 2$) for load transient from the output of the auxiliary switching converter 2218. Since the $C_{IN\_AC}$ voltage is much higher than the output voltage, the required capacitance of $C_{IN\_AC}$ is much smaller than the $C_{OUT}$ capacitance.

Figure 23:
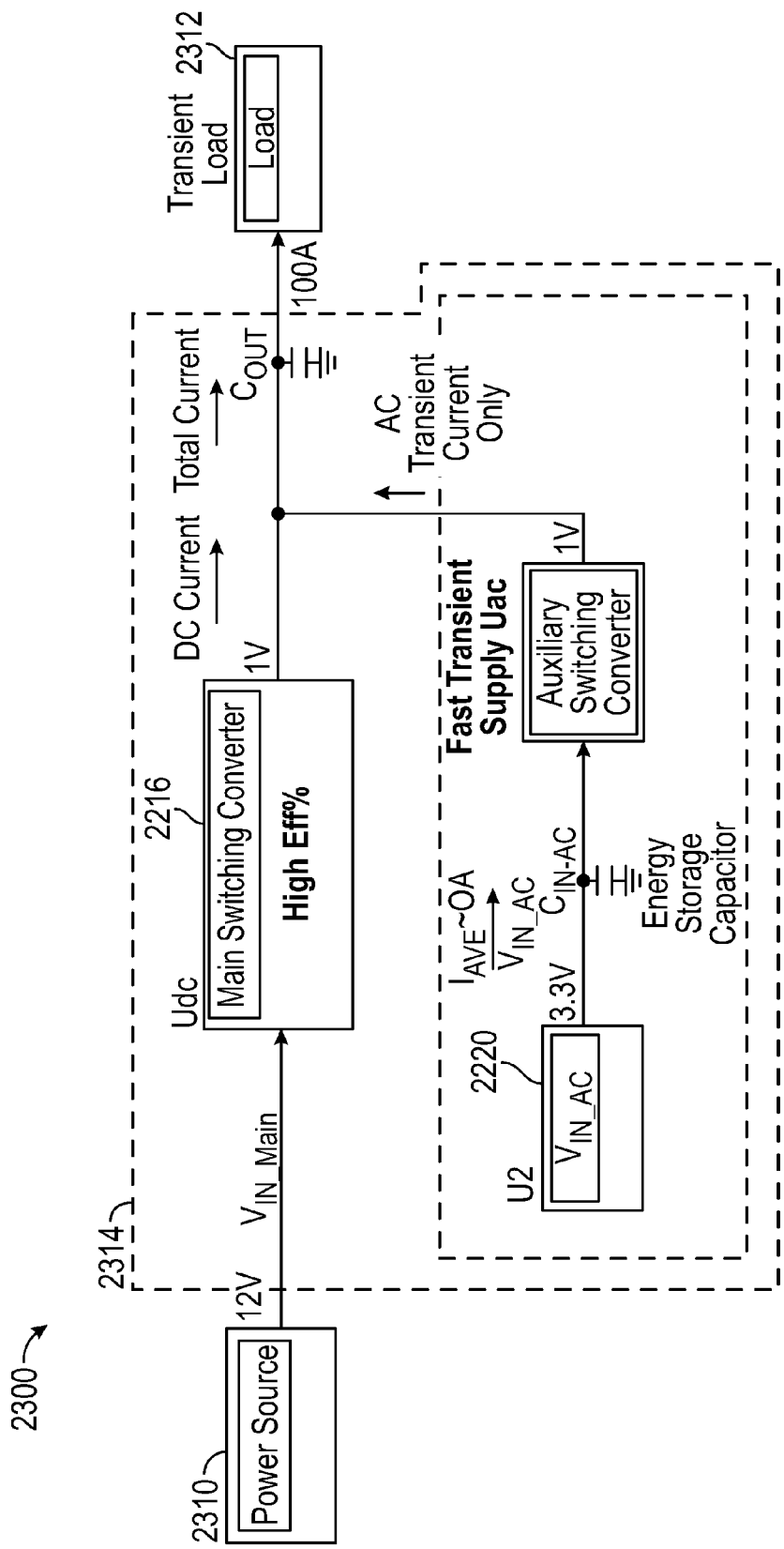
FIG. 23 illustrates an exemplary power supply system similar to the power supply system shown in FIG. 22 expect that the auxiliary switching converter has a separate power source.

FIG. 23 illustrates an exemplary power supply system 2300 similar to the power supply system 2200 expect that the auxiliary switching converter has a separate power source. As such, the power supply system 2300 may have the same performance in response to the transient conditions as that of the power supply system 2200, except that the power supply system 2200 does not require a separated bias supply for the auxiliary supply input if a separate power source is already available in a system.

Figure 24:
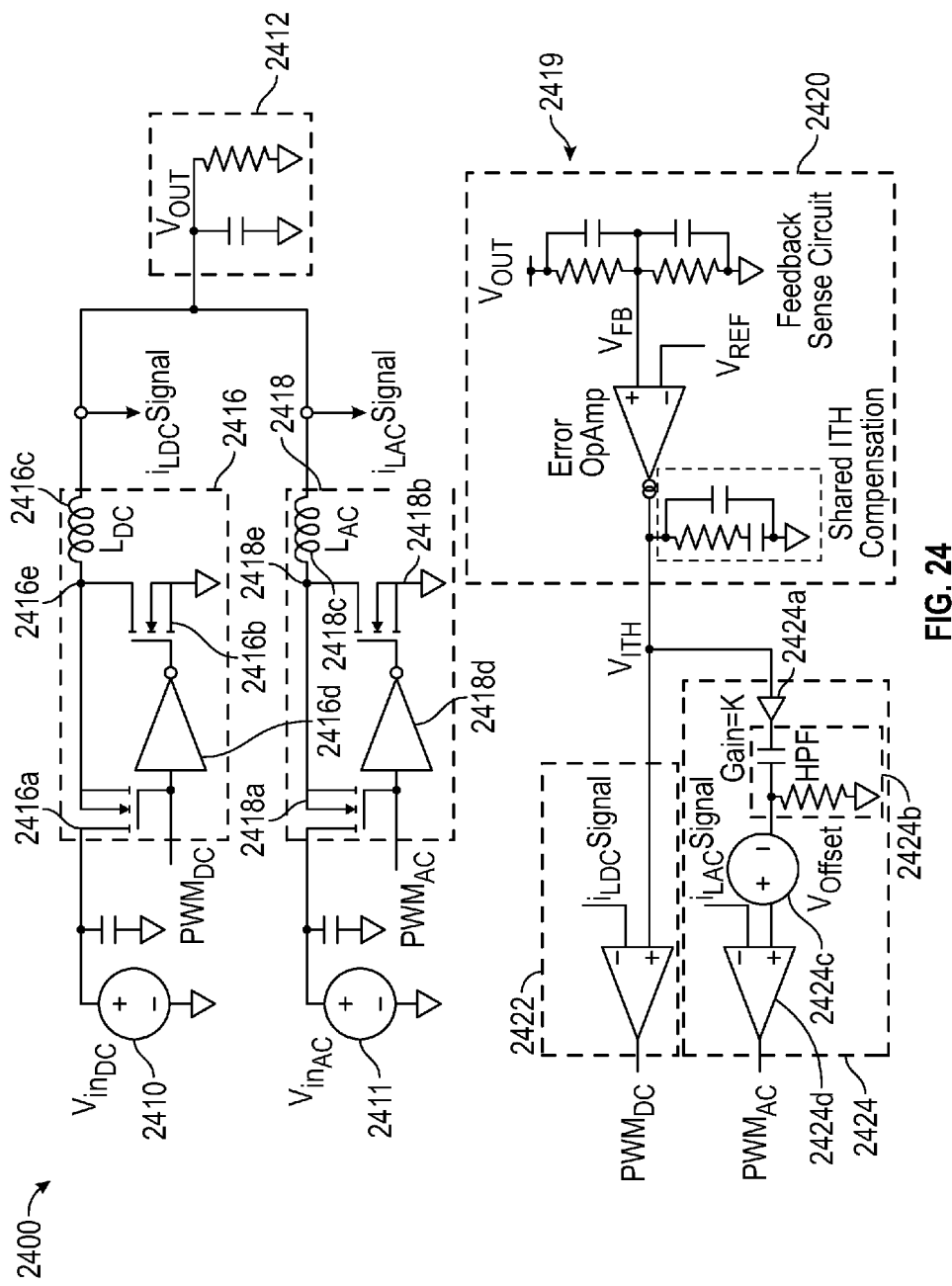
FIG. 24 illustrates an exemplary circuit diagram for the power supply system shown in FIG. 23.

FIG. 24 illustrates an exemplary circuit diagram 2400 for the power supply system 2300 shown in FIG. 23. The circuit diagram 2400 includes power sources 2410 and 2411, main switching converter 2416, an auxiliary switching converter 2418, a load device 2412, and a control mechanism 2419.

The power sources 2410 and 2411 are configured to output a certain standard voltage. To this end, the power sources 2410 and 2411 may be an electrical outlet. Most single phase alternating-current electrical outlets in the world supply power at 210-240 V or at 100-120 V. Alternatively, the power source 2410 and 2411 may include other types of power sources such as, for example, a battery, a solar photovoltaic, an AC generator, or a DC output voltage of a front-end power supply. The power source 2411 may supply power at a lower voltage than the power source 2410. The power source 2411 may only supply high frequency transient current.

Regardless of the type, usually the power sources 2410 and 2411 provide a voltage different than the required voltage for the load device 2412. The provided voltage may be higher or lower than the required voltage for the load device 2412. To match the source voltage to the load voltage, the power supply system 2400 includes the main switching converter 2416 and the auxiliary switching converter 2418.

The main switching converter 2416 and the auxiliary switching converter 2418 are configured to change their respective input voltages to an appropriate voltage for the load device 2412. As noted above, the appropriate voltage for the load device 2412 may be higher or lower than the voltages 2410 and 2411. In one implementation, the appropriate voltage for the load device 2412 is lower than the voltage of the electrical power sources 2410 and 2411. The load device 2412 may include a resistive load, a magnetic load, a capacitive load, a heater, or modern electronic devices.

The input of the main switching converter 2416 is coupled to the power source 2410 and the output of the main switching converter 2416 is coupled to the load device 2412. The main switching converter 2416 includes a first main switch 2416a, a second main switch 2416b, a main inductor 2416c, and a main inverter 2416d. The first main switch 2416a and the second main switch 2416b include MOSFETs. In one specific example, as shown, the MOSFETs are N-Channel MOSFETs. The drain terminal of the first main switch 2416a is coupled to the power source 2410 and the source terminal of the first main switch 2416a is coupled to a main node 2416e. The gate terminal of the first main switch 2416a is coupled to a main control signal $PWM_{DC}$. The gate terminal of the second main switch 2416b is coupled to the main inverter 2416d, which is configured to supply the inverse of the main control signal $PWM_{DC}$ to the gate of the second main switch 2416b. The source terminal of the second main switch 2416b is coupled to the ground. The drain terminal of the second main switch 2416b is coupled to the main node 2416e. The inductor 2416c at one end is coupled to the main node 2416e and at another end is coupled to the load device 2412.

The main switching converter 2416 may operate at a lower switching frequency than that of the auxiliary switching converter 2418. Therefore, the main switching converter 2416 may have a slower response time to the transients at the load device 2412. The auxiliary switching converter 2418 may operate at a higher switching frequency than that of the main switching converter 2418. Therefore, the auxiliary switching converter 2418 may have a faster response time to the transients at the load device 2412. Due to the higher switching frequency, the auxiliary switching converter 2418 may also have a more power loss than that of the main switching converter 2416. As noted above, the auxiliary switching converter 2418 may run from a lower power source 2411. This may allow the auxiliary switching converter 2418 to have very high switching frequency, lower switching losses, lower voltage FET, larger duty-cycle, and relaxed Ton_min.

The auxiliary switching converter 2418 includes a first auxiliary switch 2418a, a second auxiliary switch 2418b, an auxiliary inductor 2418c, and an auxiliary inverter 2418d. The first auxiliary switch 2418a and the second auxiliary switch 2418b include MOSFETs. In one specific example, as shown, the MOSFETs are N-Channel MOSFETs. The drain terminal of the first auxiliary switch 2418a is coupled to the power source 2411 and the source terminal of the first auxiliary switch 2418a is coupled to an auxiliary node 2418e. The gate terminal of the first auxiliary switch 2418a is coupled to an auxiliary control signal $PWM_{AC}$. The gate terminal of the second auxiliary switch 2418b is coupled to the auxiliary inverter 2418d, which is configured to supply the inverse of the auxiliary control signal $PWM_{AC}$ to the gate of the second auxiliary switch 2418b. The source terminal of the second auxiliary switch 2418b is coupled to the ground. The drain terminal of the second auxiliary switch 2418b is coupled to the auxiliary node 2418e. The inductor 2418c at one end is coupled to the auxiliary node 2418e and at another end is coupled to the load device 2412.

The control mechanism 2419 includes a feedback and compensation circuit 2420, a main control circuit 2422, and an auxiliary control circuit 2424. The configuration of the control mechanism 2419 is similar to those of the circuit diagram 1700 shown in FIG. 17. Specifically, the feedback and compensation circuit 2420 is similar to the feedback and compensation circuit 1720; the main control circuit 2422 is similar to the main control circuit 1722 and the auxiliary control circuit 2424 is similar to the auxiliary control circuit 1724. The main control circuit 2422 includes a main comparator. The main comparator is configured to receive the transient signal ITH directly from the feedback and compensation circuit 2420 at its non-inverting terminal and sensed main inductor current from the main switching converter 2416 at its inverting terminal and generate the main control signal $PWM_{DC}$.

The auxiliary control circuit 2424 includes an auxiliary gain buffer 2424a, a single high pass filter 2424b, an offset voltage 2424c, and an auxiliary comparator 2424d. The auxiliary buffer 2424a at one end is coupled to the feedback and compensation circuit 2420 and at another end is coupled to the high pass filter 2424b. The auxiliary buffer 2424a is configured to isolate the auxiliary control circuit 2424 from an impedance of the feedback and compensation circuit 2420. The high pass filter 2424b is coupled to the auxiliary buffer 2424a and the offset voltage 2424c. The high pass filter 2424b is configured to receive the transient signal from the buffer 2424a and output a higher frequency component of the transient signal. The high pass filter 2424b includes a capacitor and a resistor. The capacitor at one end is connected to the auxiliary buffer 2424a and at another end is connected to the offset voltage 2424c. The resistor at one end is connected to the offset voltage 2424c and at another end to the ground terminal.

The offset voltage 2424c includes a positive terminal and a negative terminal. The positive terminal of the offset voltage 2424c is coupled to the non-inverting terminal of comparator 2424d. The negative terminal of the offset voltage 2424c is coupled to the high pass filter 2424b. The auxiliary comparator 2424d is configured to receive the buffered higher frequency component of the transient signal offset by the offset voltage at its non-inverting terminal and a sensed high frequency inductor voltage sourced by the auxiliary switching converter 2418 at its inverting terminal and generate an auxiliary control signal $PWM_{AC}$ for driving the auxiliary switching converter 2418.

The offset voltage 2424c is configured to offset high frequency current sourced by the auxiliary switching converter 2418 to enable sourcing substantially zero average current from the auxiliary switching converter 2418 outside of the transient, during the steady state. The auxiliary buffer 2424a also amplifies the higher frequency component $ITH_{AC}$ of the transient signal ITH. This may be necessary since the feedback and compensation circuit 2420 may attenuate the higher frequency component $ITH_{AC}$ of the transient signal ITH.

Figure 25A:
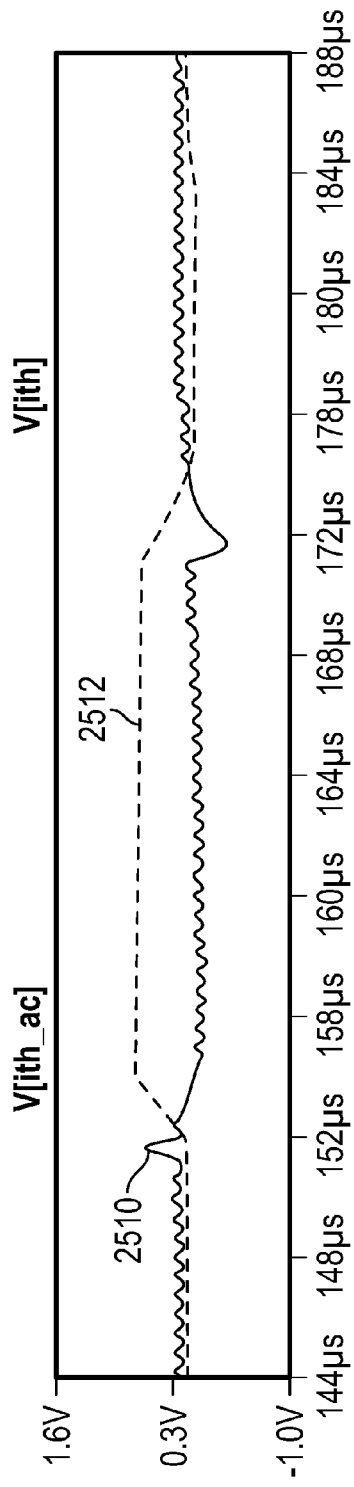
FIGS. 25A-25C illustrate exemplary load transient simulation waveforms for the power supply system shown in FIG. 24.
Figure 25B:
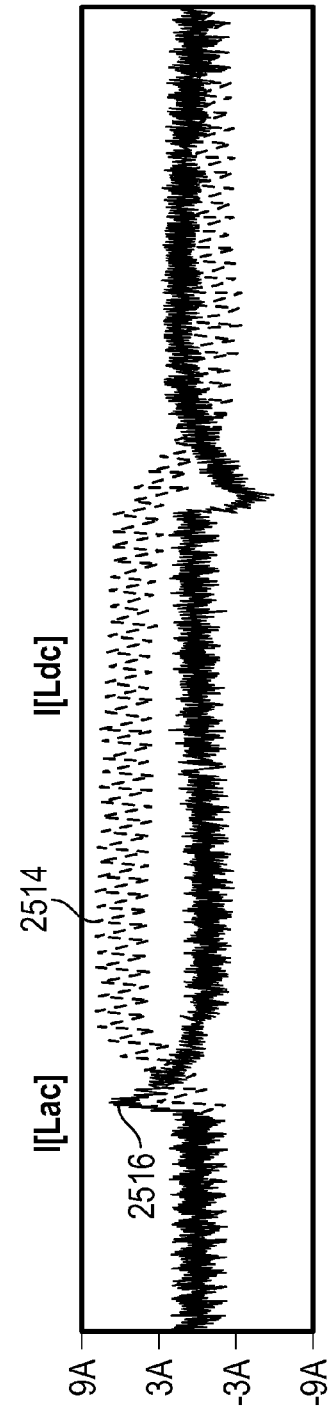
Figure 25C:
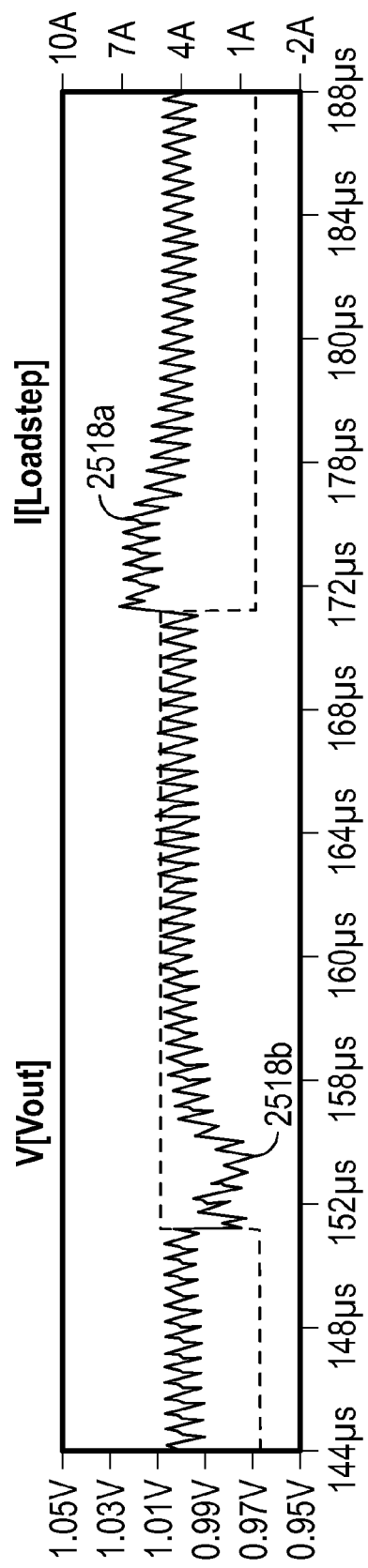

FIGS. 25A-25C illustrate exemplary load transient simulation waveforms for the power supply system 2400 shown in FIG. 24. In the power supply system 2400, the power source 2411 may only provide high frequency transient current. The high frequency current therefore may have large ripple caused by load transient. The average input current on the power source 2411 may be zero.

FIG. 25A illustrates the transient voltage signal V[ITH] 2512 and a higher frequency component V[$ITH_{AC}$] 2510. As shown, the higher frequency component V[$ITH_{AC}$] 2510 has a sharp rise in response to the positive edge of the current load step shown in FIG. 25C and then it slowly falls. Similarly, the higher frequency component V[$ITH_{AC}$] 2510 has a sharp fall in response to the negative edge of the current load step shown in FIG. 25C and then it slowly rises. In contrast, the transient voltage signal V[ITH] 2512 has a slow rise in response to the positive edge of the current load step shown in FIG. 25C and once it hits the given threshold, it stays at the given threshold until the current load step terminates. In response to the negative edge of the current load step shown in FIG. 25C, the transient voltage signal V[ITH] 2512 slowly falls until it reaches the new threshold.

FIG. 25B illustrates low frequency main inductor current waveform 2514 and high frequency auxiliary inductor current waveform 2516 during transients in the power supply system 2400 shown in FIG. 24 The low frequency main inductor current waveform 2514 tracks the transient voltage signal V[ITH] 2512, and the high frequency auxiliary inductor current waveform 2516 tracks the higher frequency component V[$ITH_{AC}$] 2510.

FIG. 25C illustrates output voltage overshoot 2518a and undershoot 2518b for a load step 2520 in the power supply system 2400 shown in FIG. 24. As shown, the peak-to-peak voltage ripple during the transient condition in the power supply system 2400 is about 33 my which is substantially below the peak-to-peak voltage ripple during the transient condition in the power supply system including only a main switching converter.

In one implementation, since the auxiliary switching converter provides only a high frequency (or AC) current during load transients and its low frequency (or DC) current is near 0 A outside of the transient, the auxiliary switching converter may not require an input power source. Instead, the auxiliary switching converter may only use a capacitor as its input power source. In this implementation, during a stable output condition, the power supply system may borrow some energy from the main switching converter output to charge up the capacitive power source of the auxiliary switching converter. During load transients, the power supply system may use the charged capacitor to help increase transient response. For example, during the load step up, current is supplied from the capacitor to the output to quickly supply the extra current needed by the load. In contrast, during the load step down, the current is supplied to the capacitor from the output to charge the capacitor.

Figure 26:
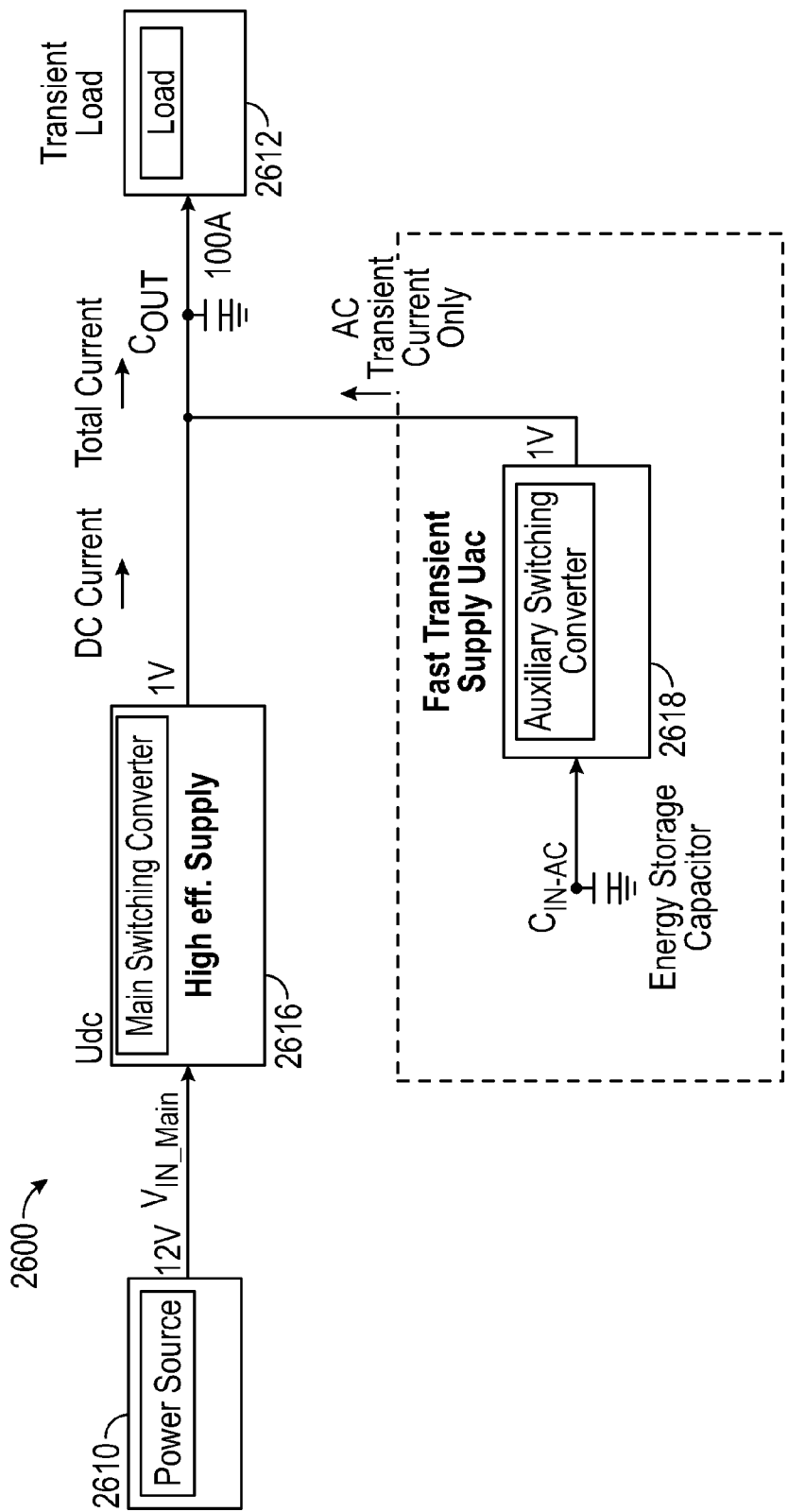
FIG. 26 illustrates another exemplary power supply system including two separate control signals for driving a main switching converter and an auxiliary switching converter.

FIG. 26 illustrates another exemplary power supply system 2600 including two separate control signals for driving a main switching converter and an auxiliary switching converter. The power supply system 2600 is similar to the power supply system 2300 expect that the auxiliary switching converter is powered by a capacitor $C_{IN\_AC}$ instead of a DC power source. The capacitor $C_{IN\_AC}$ is configured to store the energy for $V_{out}$ transient. The capacitor $C_{IN\_AC}$ can use low cost, high capacitance and high ESR capacitors. The capacitor $C_{IN\_AC}$ can be charged up from output terminal. Therefore, the capacitor $C_{IN\_AC}$ does not require input power source.

The power supply system 2600 includes a main power source 2610, a load device 2612, a main switching converter 2616, and an auxiliary switching converter 2618. The main power source 2610, the load device 2612, the main switching converter 2616 are similar to the main power source 2310, the load device 2312, and the main switching converter 2216, respectively. Therefore, they are not described in more details for brevity.

The auxiliary switching converter 2618 may be a bidirectional auxiliary switching converter configured to source high frequency current to the output terminal from the capacitor $C_{IN-AC}$ during the load step up of the load transient conditions. Similarly, the auxiliary switching converter 2618 may be configured to sink current from the output terminal during the load step down transient conditions or from the main switching converter 2616 during the steady state condition to the capacitor $C_{IN-AC}$ to charge the capacitor $C_{IN-AC}$. To this end, the auxiliary switching converter 2618 is configured to support fast $V_{out}$ transient and slow $V_{IN-AC}$ bias regulation. In one specific implementation, when the power supply system 2600 starts, it borrows some energy from its output to charge up the capacitor $C_{IN-AC}$ and uses the charged capacitor $C_{IN-AC}$ during the transient to help speed-up the transient response.

Figure 27:
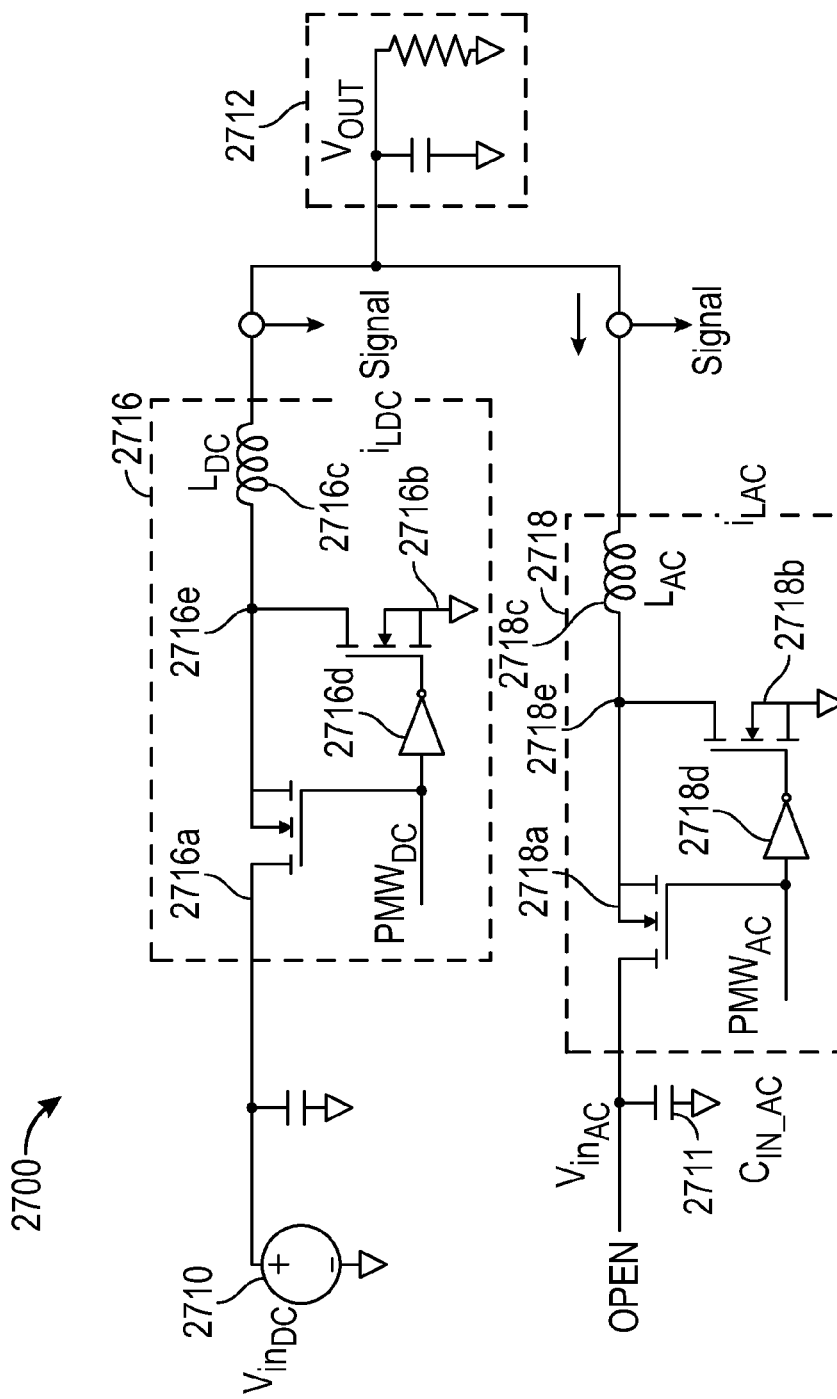
FIG. 27 illustrates an exemplary circuit diagram for the power supply system shown in FIG. 26 shown in FIG. 26.
Figure 27:
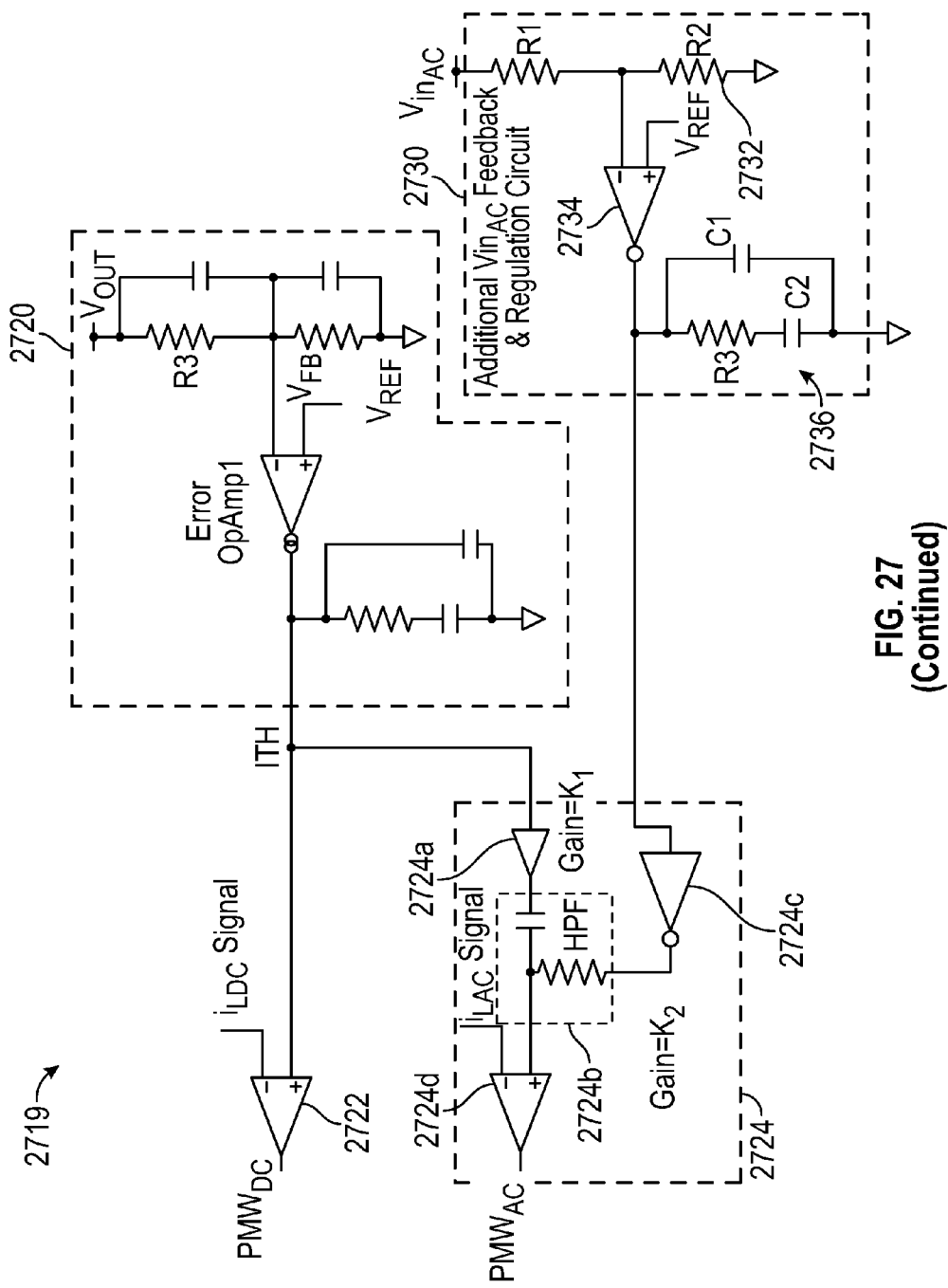

FIG. 27 illustrates an exemplary circuit diagram 2700 for the power supply system 2600 shown in FIG. 26. The circuit diagram 2700 includes three compensation loops. The three compensation loops include a main supply $V_{OUT}$ control compensation loop 2720, an auxiliary supply $V_{OUT}$ control compensation loop, and a lower frequency auxiliary supply input $V_{INAC}$ regulation compensation loop. The main supply $V_{OUT}$ control compensation loop is configured to provide a main control signal $PWM_{DC}$ to the main switching converter to respond to the output transient condition. The main control signal $PWM_{DC}$ may be based on a lower frequency component $ITH_{DC}$ of the transient signal ITH. Alternatively, the main control signal $PWM_{DC}$ may be based on the transient signal ITH including both the lower frequency component $ITH_{DC}$ and the higher frequency component $ITH_{AC}$; however, the higher frequency component $ITH_{AC}$ may be attenuated with the loop compensation design.

The auxiliary supply $V_{OUT}$ control compensation loop is configured to provide an auxiliary control signal $PWM_{AC}$ to the auxiliary switching converter to respond to the output transient condition. The auxiliary control signal $PWM_{AC}$ may be based on a higher frequency component $ITH_{AC}$ of the compensation signal ITH. The low frequency auxiliary supply input $V_{INAC}$ compensation loop is configured to regulate the input capacitor voltage $V_{IN\_AC}$ of the auxiliary supply with a slow compensation and regulation.

The power supply system 2700 includes power sources 2710 and 2711, main switching converter 2716, an auxiliary switching converter 2718, a load device 2712, and a control mechanism 2719. The power sources 2710 and 2711 are configured to output a certain standard voltage. The power sources 2710 may be an electrical outlet. Most single phase alternating-current electrical outlets in the world supply power at 210-240 V or at 100-120 V. Alternatively, the power source 2710 may include other types of power sources such as, for example, a battery, a solar photovoltaic, an AC generator, or a DC output voltage of a front-end power supply. The power source 2711 may be a capacitor. The power source 2711 may supply power at a lower voltage than the power source 2710. The power source 2711 may only supply high frequency transient current.

Regardless of the type, usually the power sources 2710 and 2711 provide a voltage different than the required voltage for the load device 2712. The provided voltage may be higher or lower than the required voltage for the load device 2712. To match the source voltage to the load voltage, the power supply system 2700 includes the main switching converter 2716 and the auxiliary switching converter 2718.

The main switching converter 2716 and the auxiliary switching converter 2718 are configured to change their respective input voltages to an appropriate voltage for the load device 2712. As noted above, the appropriate voltage for the load device 2712 may be higher or lower than the voltages 2710 and 2711. In one implementation, the appropriate voltage for the load device 2712 is lower than the voltage of the electrical power sources 2710 and 2711. The load device 2712 may include a resistive load, a magnetic load, a capacitive load, a heater, or modern electronic devices.

The input of the main switching converter 2716 is coupled to the power source 2710 and the output of the main switching converter 2716 is coupled to the load device 2712. The main switching converter 2716 includes a first main switch 2716a, a second main switch 2716b, a main inductor 2716c, and a main inverter 2716d. The first main switch 2716a and the second main switch 2716b include MOSFETs. In one specific example, as shown, the MOSFETs are N-Channel MOSFETs. The drain terminal of the first main switch 2716a is coupled to the power source 2710 and the source terminal of the first main switch 2716a is coupled to a main node 2716e. The gate terminal of the first main switch 2716a is configured to receive a main control signal $PWM_{DC}$ from the control mechanism 2719. The gate terminal of the second main switch 2716b is coupled to the main inverter 2716d, which is configured to supply the inverse of the main control signal $PWM_{DC}$ to the gate of the second main switch 2716b. The source terminal of the second main switch 2716b is coupled to the ground. The drain terminal of the second main switch 2716b is coupled to the main node 2716e. The inductor 2716c at one end is coupled to the main node 2716e and at another end is coupled to the load device 2712.

The main switching converter 2716 may operate at a lower switching frequency than that of the auxiliary switching converter 2718. Therefore, the main switching converter 2716 may have a slower response time to the transients at the load device 2712, and the auxiliary switching converter 2718 may have a faster response time to the transients at the load device 2712. Due to the higher switching frequency, the auxiliary switching converter 2718 may also have a more power loss than that of the main switching converter 2716. As noted above, the auxiliary switching converter 2718 may run from a lower power source 2711. This may allow the auxiliary switching converter 2718 to have very high switching frequency, lower switching losses, lower voltage FET, larger duty-cycle, and relaxed Ton_min.

The auxiliary switching converter 2718 includes a first auxiliary switch 2718a, a second auxiliary switch 2718b, an auxiliary inductor 2718c, and an auxiliary inverter 2718d. The first auxiliary switch 2718a and the second auxiliary switch 2718b include MOSFETs. In one specific example, as shown, the MOSFETs are N-Channel MOSFETs. The drain terminal of the first auxiliary switch 2718a is coupled to the input capacitor $C_{IN\_AC}$ 2711 and the source terminal of the first auxiliary switch 2718a is coupled to an auxiliary node 2718e. The gate terminal of the first auxiliary switch 2718a is configured to receive an auxiliary control signal $PWM_{AC}$ from the control mechanism 2719. The gate terminal of the second auxiliary switch 2718b is coupled to the auxiliary inverter 2718d, which is configured to supply the inverse of the auxiliary control signal $PWM_{AC}$ to the gate of the second auxiliary switch 2718b. The source terminal of the second auxiliary switch 2718b is coupled to the ground. The drain terminal of the second auxiliary switch 2718b is coupled to the auxiliary node 2718e. The inductor 2718c at one end is coupled to the auxiliary node 2718e and at another end is coupled to the load device 2712.

The control mechanism 2719 includes a feedback and compensation circuit 2720, a main control circuit 2722, an auxiliary control circuit 2724, an auxiliary input $V_{INAC}$ feedback and regulation circuit 2730. The feedback and compensation circuit 2720 and the main control circuit 2722 are similar to the feedback and compensation circuit 2420 and the main control circuit 2422 shown and described with respect to FIG. 24, respectively. Therefore, they are not described further for brevity of the description.

The auxiliary control circuit 2724 includes a first gain buffer 2724a, a single high pass filter 2724b, a second gain buffer 2724c, and a comparator 2724d. The first gain buffer 2724a at one end is coupled to the feedback and compensation circuit 2720 and at another end is coupled to the high pass filter 2724b. The first gain buffer 2724a is configured to isolate the auxiliary control circuit 2724 from an impedance of the feedback and compensation circuit 2720. The high pass filter 2724b is coupled to the first gain buffer 2724a, the second gain buffer 2724c, and the comparator 2724d. The high pass filter 2724b is configured to receive the transient signal ITH from the first gain buffer 2724a and output a higher frequency component $ITH_{AC}$ of the transient signal ITH. The high pass filter 2724b includes a capacitor and a resistor. The capacitor at one end is connected to the first gain buffer 2724a and at another end is connected to the resistor and the non-inverting terminal of the comparator 2724d. The resistor at one end is connected to the non-inverting terminal of the comparator 2724d and at another end to the second gain buffer 2724c.

The second gain buffer 2724c has an input terminal and an output terminal and has an inverting gain factor K2. The output terminal of the second gain buffer 2724c is coupled to one end of the resistor of the high pass filter 2724b. The other end of the resistor of the high pass filter is coupled to the non-inverting terminal of the comparator 2724d. The input terminal of the second gain buffer 2724c is coupled to the output of the feedback and regulation circuit 2730.

The comparator 2724d is configured to receive the buffered higher frequency component $ITH_{AC}$ of the transient signal ITH at its non-inverting terminal and a sensed high frequency inductor voltage sourced by the auxiliary switching converter 2718 at its inverting terminal and generate an auxiliary control signal $PWM_{AC}$ for driving the auxiliary switching converter 2718.

The auxiliary input $V_{INAC}$ feedback and regulation circuit 2730 is connected at one end to the power source 2711 and at the other end to the auxiliary control circuit 2724 for driving the auxiliary switching converter 2718. The auxiliary input $V_{INAC}$ feedback and regulation circuit 2730 includes a feedback voltage sense circuit 2732, an error amplifier 2734, and a compensation circuit 2736.

The feedback voltage sense circuit 2732 is configured to sense the $V_{INAC}$ voltage of the capacitor 2711 through a network of resistors R1 and R2. The network of resistors R1 and R2 form a resistor divider and scale the voltage of the capacitor 2711 to make it proportional to $V_{ref2}$. The resistor R1 is coupled to the capacitor 2711 at one end and at another end is coupled to an inverting terminal of the error amplifier 2734 and to the resistor R2. The resistor R2 at one end is coupled to the inverting terminal of the error amplifier 2734 and to the resistor R1 and at another end is coupled to the ground terminal.

The feedback voltage sense circuit 2732 outputs a feedback voltage $V_{fb}$ to the inverting terminal of the error amplifier 2734. The error amplifier 2734 may be either a current-output type transconductance amplifier or voltage-output type amplifier. The error amplifier 2734 monitors the feedback voltage $V_{fb}$ that is proportional to the voltage of capacitor 2711 at its inverting terminal and a reference voltage $V_{ref2}$ at its non-inverting input. The feedback voltage $V_{fb}$ at the inverting terminal of the error amplifier 2734 should be approximately equal to the reference voltage $V_{ref2}$ at the non-inverting terminal of the error amplifier 2734. When these two voltages are not equal, the error amplifier 2734 may provide a control signal at its output. The output voltage of the error amplifier 2734 may correspond to the difference between the actual input voltage and the desired input voltage of the capacitor 2711.

The compensation circuit 2736 includes capacitors C1 and C2 and a resistor R3 to provide frequency compensation for the feedback loop. The capacitor C1 is connected at one end to an output of the amplifier 2734 and at another end to the ground terminal. The resistor R3 is connected at one end to the output of the error amplifier 2734 and at another end to the capacitor C2. The capacitor C2 at one end is connected to the resistor R3 and at another end to the ground terminal.

The output of the feedback and regulation circuit 2730 is provided to the auxiliary control circuit 2724. The auxiliary control circuit 2724 is configured to control the auxiliary switching converter 2718 to charge the capacitor 2711 based on the output of the feedback and regulation circuit 2730. In steady state mode, if the $V_{INAC}$ voltage on capacitor 2711 is lower than the regulated level, the error amplifier 2734 increases its output voltage, therefore decreases the voltage on the non-inverting terminal of the comparator 2724d through the second gain buffer 2724c. As a result, the auxiliary inductor 2718c provides negative current to charge capacitor 2711 from $V_{OUT}$ and raises the $V_{INAC}$ voltage back to the regulated level. On the other hand, if the $V_{INAC}$ voltage on capacitor 2711 is higher than the regulated level, the error amplifier 2734 decreases its output voltage, therefore increases the voltage on the non-inverting terminal of the comparator 2724d through the second gain buffer 2724c. As a result, the auxiliary inductor 2718c provides current from capacitor 2711 to $V_{OUT}$ to discharge the $V_{INAC}$ voltage back to the regulated level.

Figure 28C:
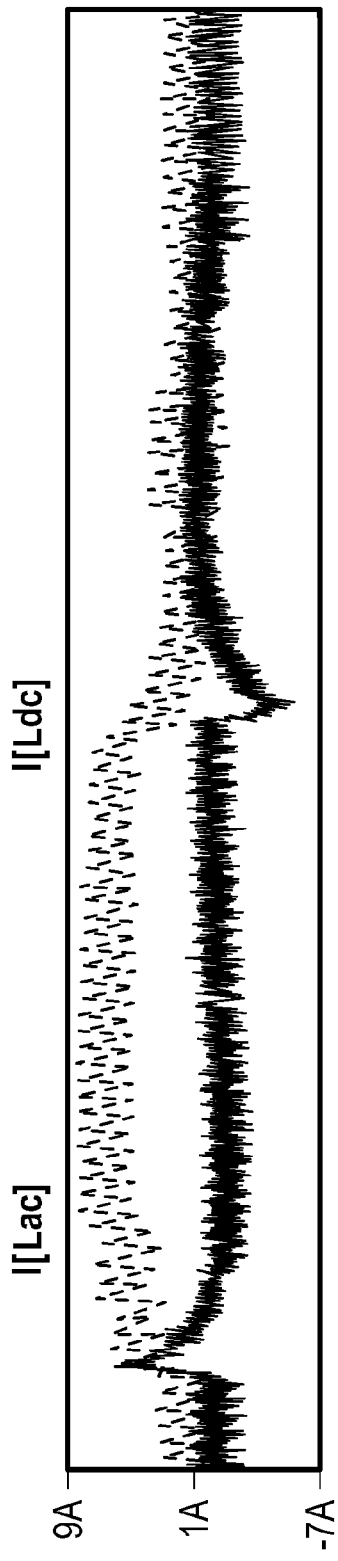

FIGS. 28A-28D illustrate simulation waveforms for the circuit diagram 2700 shown in FIG. 27. FIG. 28A illustrates the input capacitor voltage of the auxiliary switching converter 2718. As shown, during the load step up transient, the charged capacitor is discharged and as such the input voltage $V_{IN\_AC}$ is first reduced then rises back to its regulated level slowly. In contrast, during the load step down transient, the capacitor is charged and as such the input voltage $V_{IN\_AC}$ is first increased then falls back to its regulated level slowly.

FIG. 28B illustrates the higher frequency component V[ITH_AC] of the transient voltage signal V[ITH] output by the high pass filter 2724b and the transient voltage signal V[ITH] output by the feedback and compensation circuit 2720 in response to the detected transient. The transient voltage signal V[ITH] may include both the higher frequency component V[ITH_AC] and the lower frequency component V[ITH_DC]; however, the higher frequency component V[ITH_AC] may be attenuated by proper selection of components of the compensation circuit.

Figure 28D:
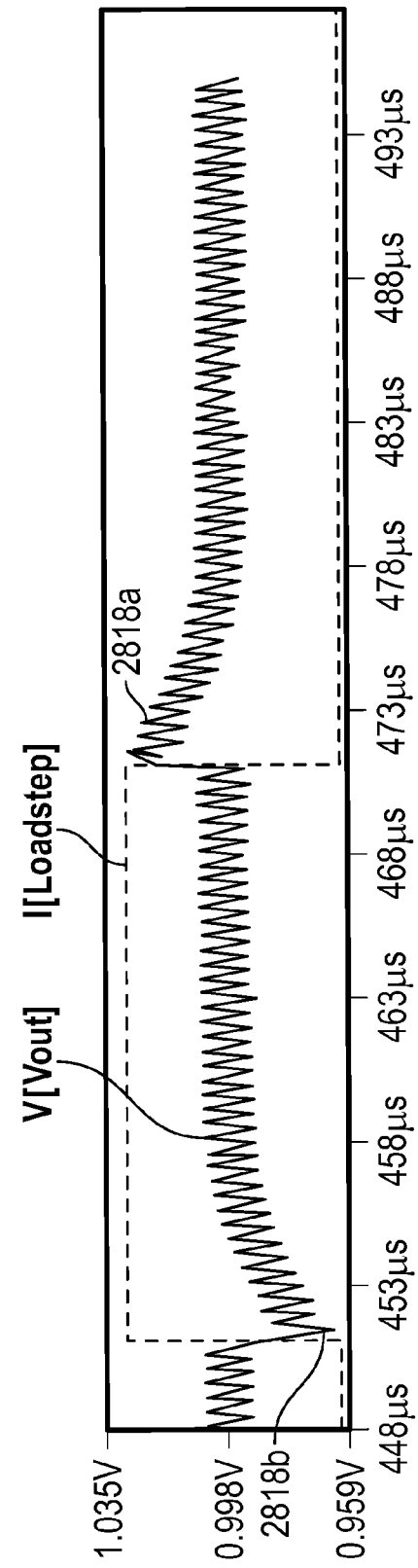

As shown, the higher frequency component V[ITH_AC] has a sharp rise in response to the positive edge of the current load step shown in FIG. 28D and it slowly falls. Similarly, the higher frequency component V[ITH_AC] has a sharp fall in response to the negative edge of the current load step shown in FIG. 28D and it slowly rises. In contrast, the transient voltage signal V[ITH] has a slow rise in response to the positive edge of the current load step shown in FIG. 28D and once it hits the given threshold, it stays at the given threshold until the current load step terminates. In response to the negative edge of the current load step shown in FIG. 28D, the transient signal V[ITH] slowly falls until it reaches the new threshold.

FIG. 28C similarly illustrates the auxiliary supply transient inductor current I[Lac] increases as the input capacitor voltage decreases and the auxiliary supply transient inductor I[Lac] current decreases as the input capacitor voltage increases. Similarly, as shown, the main supply transient inductor current I[Ldc] increases as the input capacitor voltage decreases and the main supply transient inductor I[Ldc] current decreases as the input capacitor voltage increases. The main supply transient inductor current I[Ldc] tracks the transient voltage signal V[ITH], and the auxiliary supply transient current I[Lac] tracks the higher frequency component V[ITH_AC] of the transient signal V[ITH].

FIG. 28D illustrates output voltage overshoot 2818a and undershoot 2818b for a load step I[Loadstep] in the power supply system 2700 shown in FIG. 27. As shown, the output voltage V[vout] dips during the load step up since the current is supplied from the output capacitor to compensate for additional current necessary by the load step up. The output voltage V[vout] increases during the load step down since the current is supplied to the output capacitor to compensate for reduced current necessary by the load step down.

Figure 29:
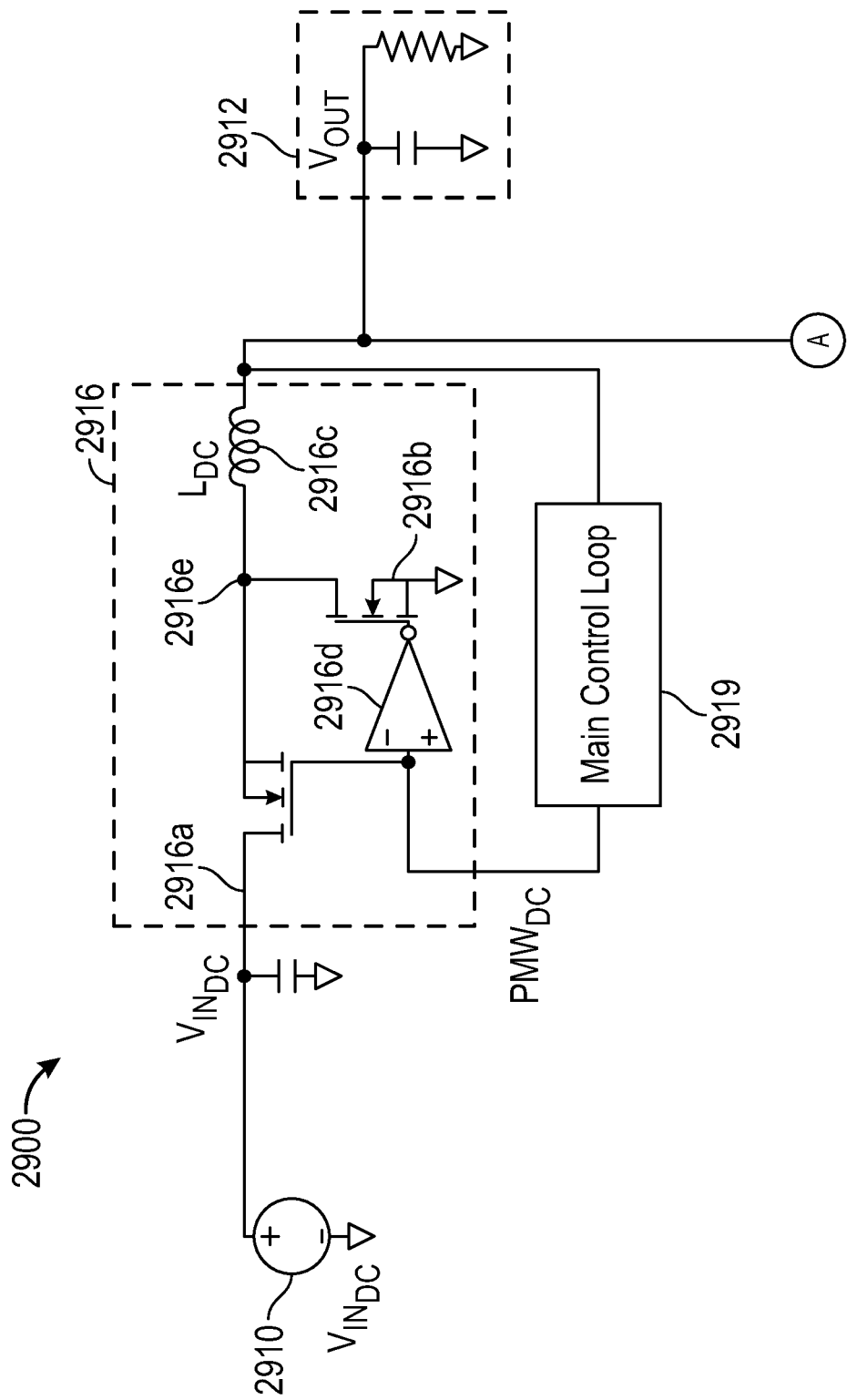
FIG. 29 illustrates another exemplary circuit diagram for the power supply system shown in FIG. 26 in which the power source for the auxiliary supply includes a capacitor.
Figure 29:
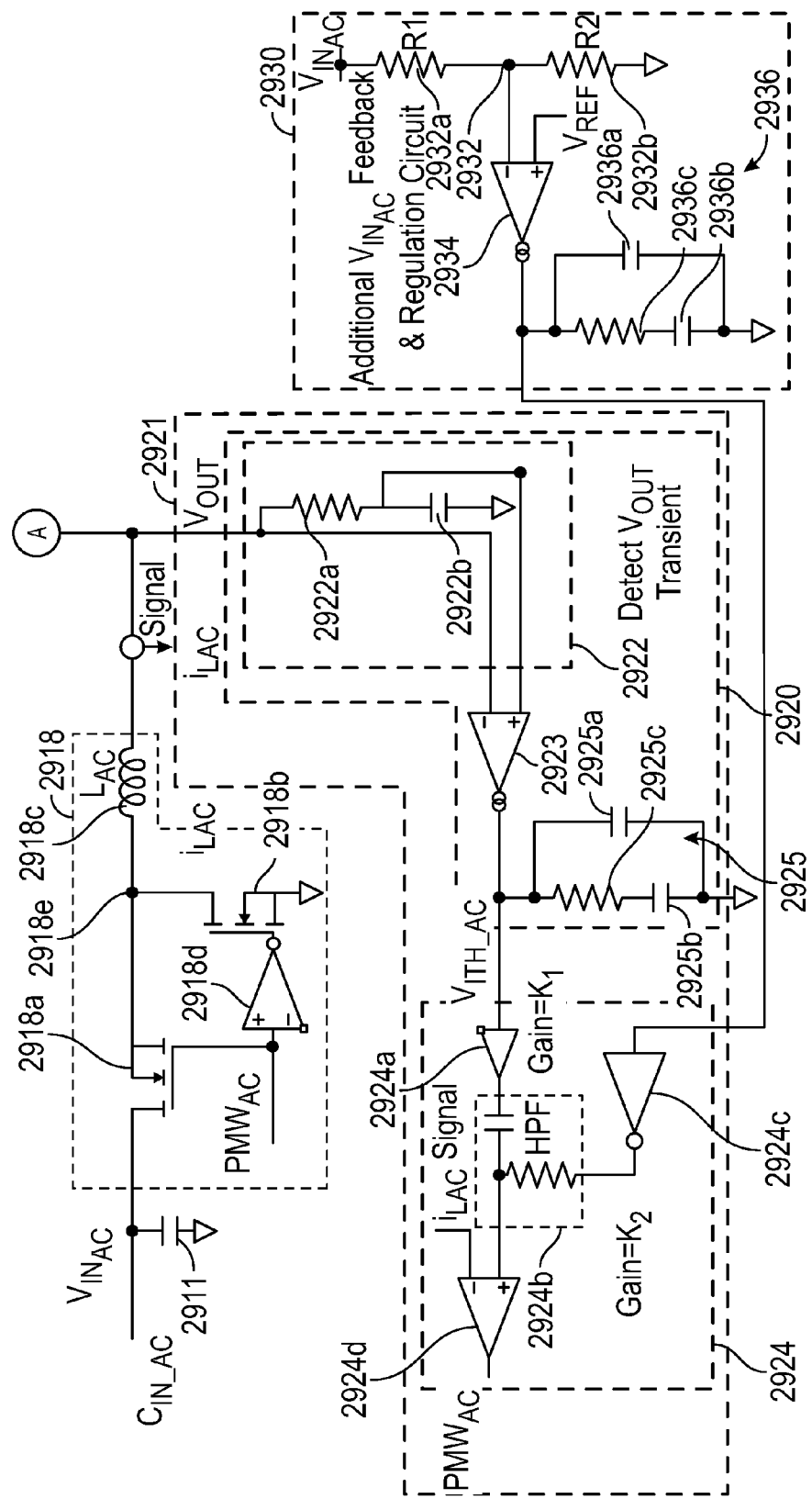

FIG. 29 illustrates another exemplary circuit diagram 2900 for the power supply system shown in FIG. 26 in which the power source for the auxiliary switching converter includes a capacitor. The circuit diagram 2900 is similar to the circuit diagram 2700 in that the auxiliary switching converter is powered by an input capacitor. The circuit diagram 2900 is different from the circuit diagram 2700 in that it has two separated compensations for the main switching converter and the auxiliary switching converter without any interconnections. Specifically, similar to the circuit diagram 1100 shown in FIG. 11, the circuit diagram 2900 has an auxiliary control circuit with an independent feedback and compensation circuit from the main control circuit.

The circuit diagram 2900 includes power sources 2910 and 2911, a main switching converter 2916, an auxiliary switching converter 2918, a load device 2912, a main control loop 2919, an auxiliary control circuit 2921, and an auxiliary input voltage source control loop 2930. The power sources 2910 and 2911 are configured to output a certain standard voltage. The power source 2910 may be an electrical outlet. Most single phase alternating-current electrical outlets in the world supply power at 210-240 V or at 100-120 V. Alternatively, the power source 2910 may include other types of power sources such as, for example, a battery, a solar photovoltaic, an AC generator, or a DC output voltage of a front-end power supply. The power source 2911 may be a capacitor. The capacitor may supply power at a lower voltage than the power source 2910. The capacitor may only supply high frequency AC transient current.

Regardless of the type, usually the power sources 2910 and 2911 provide a voltage different than the required voltage for the load device 2912. The provided voltage may be higher or lower than the required voltage for the load device 2912. To match the source voltage to the load voltage, the power supply system 2900 includes the main switching converter 2916 and the auxiliary switching converter 2918.

The main switching converter 2916 and the auxiliary switching converter 2918 are configured to change their respective input voltages to an appropriate voltage for the load device 2912. As noted above, the appropriate voltage for the load device 2912 may be higher or lower than the voltages 2910 and 2911. In one implementation, the appropriate voltage for the load device 2912 is lower than the voltage of the electrical power sources 2910 and 2911. The load device 2912 may include a resistive load, a magnetic load, a capacitive load, a heater, or modern electronic devices.

The input of the main switching converter 2916 is coupled to the power source 2910 and the output of the main switching converter 2916 is coupled to the load device 2912. The main switching converter 2916 includes a first main switch 2916a, a second main switch 2916b, a main inductor 2916c, and a main inverter 29716d. The first main switch 2916a and the second main switch 2916b include MOSFETs. In one specific example, as shown, the MOSFETs are N-Channel MOSFETs. The drain terminal of the first main switch 2916a is coupled to the power source 2910 and the source terminal of the first main switch 2916a is coupled to a main node 2916e. The gate terminal of the first main switch 2916a is coupled to the main control loop 2919 and is configured to receive a main control signal $PWM_{DC}$. The gate terminal of the second main switch 2916b is coupled to the main inverter 2916d, which is configured to supply the inverse of the main control signal $PWM_{DC}$ to the gate of the second main switch 2916b. The source terminal of the second main switch 2916b is coupled to the ground. The drain terminal of the second main switch 2916b is coupled to the main node 2916e. The main inductor 2916c at one end is coupled to the main node 2916e and at another end is coupled to the load device 2912.

The main switching converter 2916 may operate at a lower switching frequency than that of the auxiliary switching converter 2918. Therefore, the main switching converter 2916 may have a slower response time to the transients at the load device 2912 than that of the auxiliary switching converter 2918. Due to its higher switching frequency, the auxiliary switching converter 2918 may also have a more power loss than that of the main switching converter 2916. As noted above, the auxiliary switching converter 2918 may run from a lower power source 2911. This may allow the auxiliary switching converter 2918 to have very high switching frequency, lower switching losses, lower voltage FET, larger duty-cycle, and relaxed Ton_min.

The auxiliary switching converter 2918 includes a first auxiliary switch 2918a, a second auxiliary switch 2918b, an auxiliary inductor 2918c, and an auxiliary inverter 2918d. The first auxiliary switch 2918a and the second auxiliary switch 2918b include MOSFETs. In one specific example, as shown, the MOSFETs are N-Channel MOSFETs. The drain terminal of the first auxiliary switch 2918a is coupled to the power source 2911 and the source terminal of the first auxiliary switch 2918a is coupled to an auxiliary node 2918e. The gate terminal of the first auxiliary switch 2918a is coupled to the auxiliary control loop 2921 and is configured to receive an auxiliary control signal $PWM_{AC}$. The gate terminal of the second auxiliary switch 2918b is coupled to the auxiliary inverter 2918d, which is configured to supply the inverse of the auxiliary control signal $PWM_{AC}$ to the gate of the second auxiliary switch 2918b. The source terminal of the second auxiliary switch 2918b is coupled to the ground.

The drain terminal of the second auxiliary switch 2918b is coupled to the auxiliary node 2918e. The auxiliary inductor 2918c at one end is coupled to the auxiliary node 2918e and at another end is coupled to the load device 2912.

The main control loop 2919 is coupled at one end to the output terminal and at another end to the first main switch 2916a and the main inverter 2916d. The main control loop 2919 includes a main feedback and compensation circuit and a main control circuit (not shown). The main feedback and compensation circuit is similar to the feedback and compensation circuit 2720 shown in FIG. 27. Similarly, the main control circuit is similar to the main control circuit 2722 shown in FIG. 27. Therefore, for the sake of brevity they are not further described. The main control loop 2919 may be configured to provide a main control signal $PWM_{DC}$ for controlling the main switching converter 2916 in response the transient condition.

The auxiliary control loop 2921 is coupled at one end to the output terminal and at another end to the first auxiliary switch 2918a and the auxiliary inverter 2918d. The auxiliary control loop 2921 includes a feedback and compensation circuit 2920 and an auxiliary control circuit 2924. The feedback and compensation circuit 2920 at one end is coupled to the output terminal and at another end is coupled to the auxiliary control circuit 2924. As shown and unlike the feedback and compensation circuit 2720, the feedback and compensation circuit 2920 is coupled to only the auxiliary control circuit 2924 and not to the main control circuit. The feedback and compensation circuit 2920 includes a transient detection circuit 2922, an amplifier 2923, and a compensation circuit 2925. The transient detection circuit 2922 includes a resistor 2922a and a capacitor 2922b. The resistor 2922a at one end is coupled to the output terminal and the inverting terminal of the amplifier 2923 and at another end is coupled to the capacitor 2922b. The capacitor 2922b at one end is coupled to the resistor 2922a and the non-inverting terminal of the amplifier 2923 and at another end is coupled to the ground terminal.

The resistor 2922a and capacitor 2922b forms a low pass filter and provides the average $V_{out}$ voltage as a reference voltage to the error amplifier 2923 positive input terminal. The amplifier 2923 monitors the output voltage with respect to the averaged output voltage of the capacitor 2922b. When there is a transient event and these two voltages are not equal, the amplifier 2923 may provide a control signal at its output. The output voltage of the amplifier 2923 may correspond to the difference between the actual output voltage and the desired averaged output.

The compensation circuit 2925 includes capacitors 2925a and 2925b and a resistor 2925c to provide frequency compensation for the feedback loop. The capacitor 2925a is connected at one end to an output of the amplifier 2923 and at another end to the ground terminal. The resistor 2925c is connected at one end to the output of the amplifier 2923 and at another end to the capacitor 2925b. The capacitor 2925b at one end is connected to the resistor 2925c and at another end to the ground terminal.

The output of the feedback and compensation circuit 2925 is provided to the auxiliary control circuit 2924. The auxiliary control circuit 2924 is configured to control the auxiliary switching converter 2918. The auxiliary control circuit 2924 is similar to the auxiliary control circuit 2724. To this end, the auxiliary control circuit 2924 includes a first gain buffer 2924a, a high pass filter 2924b, a second gain buffer 2924c, and an auxiliary comparator 2924d.

The first gain buffer 2924a at one end is coupled to the feedback and compensation circuit 2920 and at another end is coupled to the high pass filter 2924*b*. The first gain buffer 2924*a* is configured to isolate the auxiliary control circuit 2924 from an impedance of the feedback and compensation circuit 2920. The high pass filter 2924*b* is coupled to the first gain buffer 2924*a*, the second gain buffer 2924*c*, and the auxiliary comparator 2924*d*. The high pass filter 2924*b* is configured to receive the transient signal ITH from the first gain buffer 2924*a* and output a higher frequency component $ITH_{AC}$ of the transient signal ITH. The high pass filter 2924*b* includes a capacitor and a resistor. The capacitor at one end is connected to the first gain buffer 2924*a* and at another end is connected to the resistor and the non-inverting terminal of the auxiliary comparator 2924*d*. The resistor at one end is connected to the non-inverting terminal of the comparator 2924*d* and at another end to the second gain buffer 2924*c*.

The second gain buffer 2924*c* has an input terminal and an output terminal and has an inverting gain factor K2. The output terminal of the second gain buffer 2924*c* is coupled to one end of the resistor of the high pass filter 2924*b*. The other end of the resistor of the high pass filter is coupled to the non-inverting terminal of the auxiliary comparator 2924*d*. The input terminal of the second gain buffer 2924*c* is coupled to the output of the auxiliary input voltage source control loop 2930.

The auxiliary comparator 2924*d* is configured to receive the buffered higher frequency component $ITH_{AC}$ of the transient signal ITH at its non-inverting terminal and a sensed high frequency inductor voltage sourced by the auxiliary switching converter 2918 at its inverting terminal and generate an auxiliary control signal $PWM_{AC}$ for driving the auxiliary switching converter 2918.

The auxiliary input voltage source control loop 2930 is connected at one end to the power source 2911 and at the other end to the auxiliary control circuit 2924 for driving the auxiliary switching converter 2918. The auxiliary input voltage source control loop 2930 includes a feedback voltage sense circuit 2932, an error amplifier 2934, and a compensation circuit 2936. The feedback voltage sense circuit 2932 is configured to sense the voltage of the capacitor 2911 through a network of resistors 2932*a* and 2932*b*. The network of resistors 2932*a* and 2932*b* form a resistor divider and scale the voltage of the capacitor 2911 to make it proportional to $V_{ref}$. The resistor 2932*a* is coupled to the capacitor 2911 at one end and at another end is coupled to an inverting terminal of the error amplifier 2934 and to the resistor 2932*b*. The resistor 2932*b* is coupled to the inverting terminal of the error amplifier 2934 and to the resistor 2932*a* at one end and at another end is coupled to the ground terminal.

The feedback voltage sense circuit 2932 outputs a feedback voltage $V_{fb}$ to the inverting terminal of the error amplifier 2934. The error amplifier 2934 may be either a current-output type transconductance amplifier or voltage-output type amplifier. The error amplifier 2934 monitors the feedback voltage $V_{fb}$ that is proportional to the voltage of capacitor 2911 at its inverting input and a reference voltage $V_{ref}$ at its non-inverting input. The feedback voltage across resistor 2932*b* should be approximately equal to the reference voltage $V_{ref}$. When these two voltages are not substantially equal to each other, the amplifier 2934 may provide a control signal at its output. The output voltage of the amplifier 2934 may correspond to the difference between the actual input voltage and the desired input voltage.

The compensation circuit 2936 includes capacitors 2936*a* and 2936*b* and a resistor 2936*c* to provide frequency compensation for the feedback loop. The capacitor 2936*a* is connected at one end to an output of the amplifier 2934 and at another end to the ground terminal. The resistor 2936*c* is connected at one end to the output of the amplifier 2934 and at another end to the capacitor 2936*b*. The capacitor 2936*b* at one end is connected to the resistor 2936*c* and at another end to the ground terminal.

The output of the auxiliary input voltage source control loop 2930 is provided to the auxiliary control circuit 2924. The auxiliary control circuit 2924 is configured to control the auxiliary switching converter 2918 to charge or discharge the capacitor 2911 based on the output of the auxiliary input voltage source control loop 2930. In steady state mode, if the $V_{INAC}$ voltage on capacitor 2911 is lower than the regulated level, the error amplifier 2934 increases its output voltage, therefore decreases the voltage on the non-inverting terminal of the auxiliary comparator 2924*d* through the second gain buffer 2924*c*. As a result, the auxiliary inductor 2918*c* provides negative current to charge capacitor 2911 from $V_{OUT}$ and raises the $V_{INAC}$ voltage back to the regulated level. On the other hand, if the $V_{INAC}$ voltage on capacitor 2911 is higher than the regulated level, the error amplifier 2934 decreases its output voltage, therefore increases the voltage on the non-inverting terminal of the auxiliary comparator 2924*d* through the second gain buffer 2924*c*. As a result, the auxiliary inductor 2918*c* provides current from capacitor 2911 to $V_{OUT}$ to discharge the $V_{INAC}$ voltage back to the regulated level.

Figure 30A:
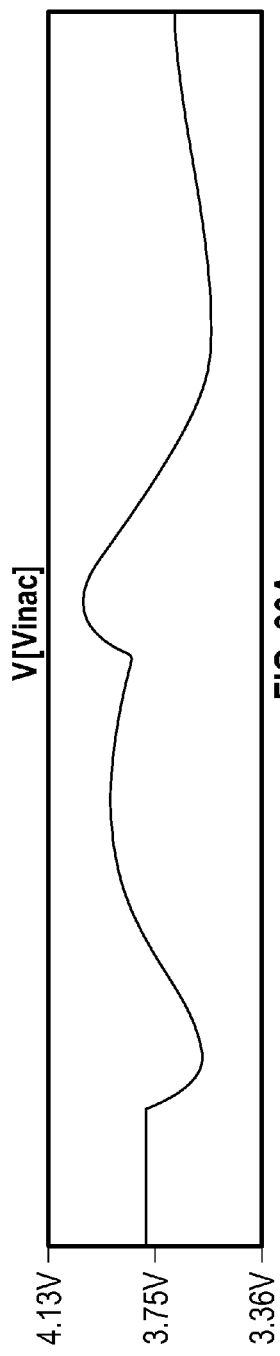
FIGS. 30A-30E illustrate simulation waveforms for the circuit diagram shown in FIG. 29.

FIGS. 30A-30E illustrate simulation waveforms for the circuit diagram 2900 shown in FIG. 29. FIG. 30A illustrates the input capacitor voltage of the auxiliary switching converter. As shown, during the load step up transient, the charged input capacitor is discharged and as such the input voltage $V_{in\_AC}$ is reduced. The input voltage $V_{in\_AC}$ then slowly rises back to its regulated level. In contrast, during the load step down transient, the input capacitor is charged and as such the input voltage $V_{in\_AC}$ is increased. The input voltage $V_{in\_AC}$ then slowly falls back to its regulated level.

Figure 30B:
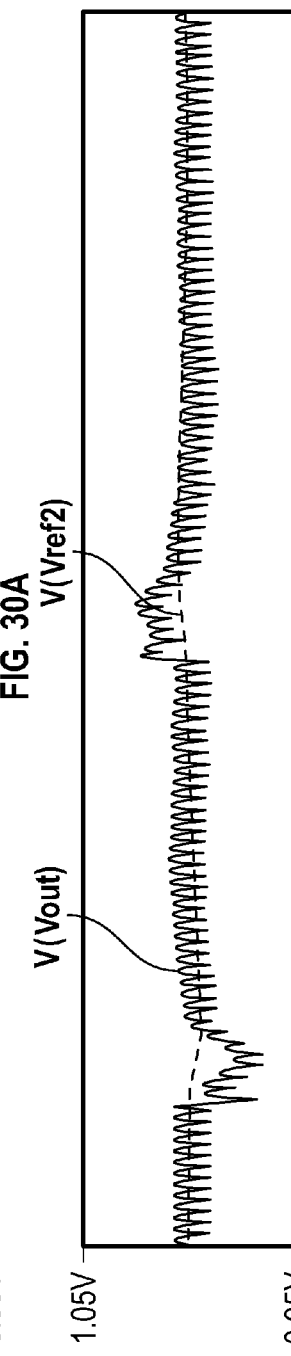

FIG. 30B illustrates the output voltage $V_{OUT}$ in comparison with its averaged voltage $V_{REF2}$ across capacitor 2922*b*. As shown, during the load step up, the $V_{OUT}$ falls below the filtered voltage of capacitor 2922*b* and during the load step down, the $V_{OUT}$ exceeds the filtered voltage of capacitor 2922*b*.

Figure 30C:
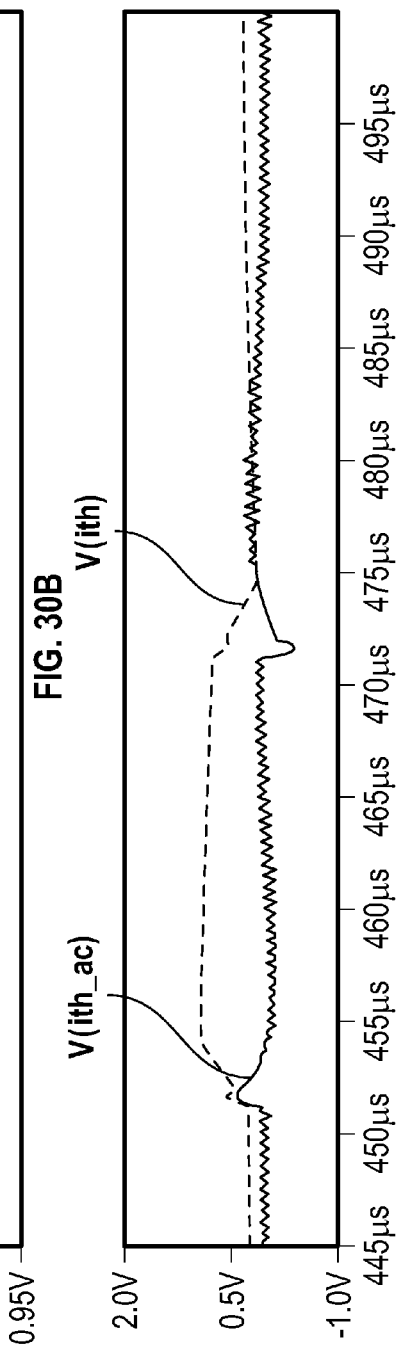

FIG. 30C illustrates the higher frequency component V[ITH_AC] of the transient voltage signal V[ITH] output by the high pass filter 2924*b* and the transient signal V[ITH] output by the feedback and compensation circuit inside the main control loop 2919 in response to the detected transient. The transient signal V[ITH] may include both the higher frequency component V[ITH_AC] and the lower frequency component V[ITH_DC]; however, the higher frequency component V[ITH_AC] may be attenuated by proper selection of components of the compensation circuit.

Figure 30D:
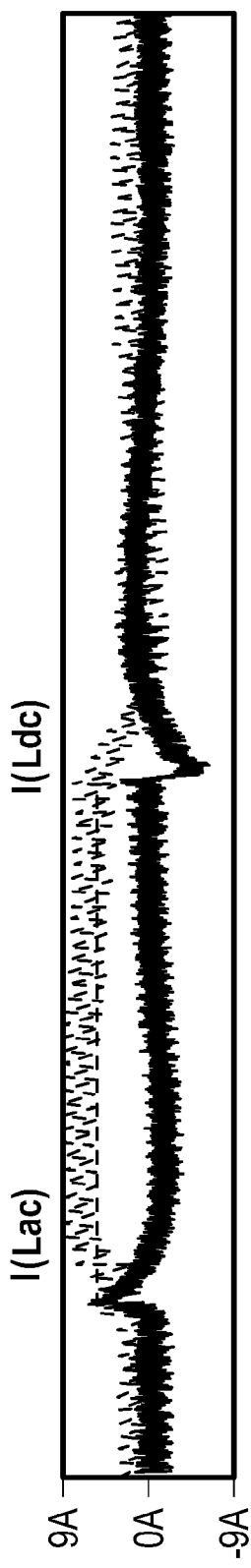
Figure 30E:
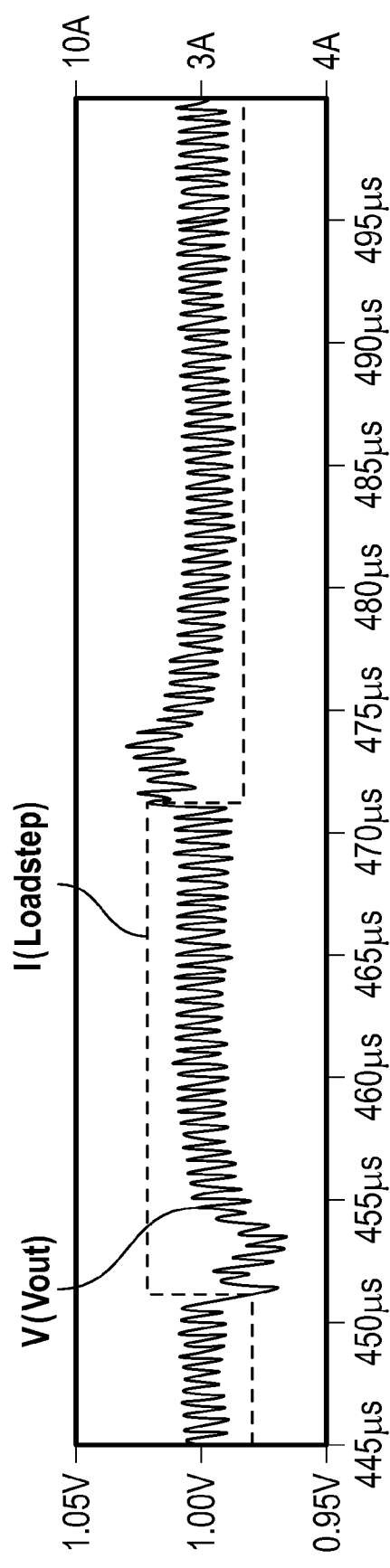

As shown, the higher frequency component V[ITH_AC] has a sharp rise in response to the positive edge of the current load step shown in FIG. 30E and it slowly falls. Similarly, the higher frequency component V[ITH_AC] has a sharp fall in response to the negative edge of the current load step shown in FIG. 30E and it slowly rises. In contrast, the transient signal V[ITH] has a slow rise in response to the positive edge of the current load step shown in FIG. 30E and once it hits the given threshold, it stays at the given threshold until the current load step terminates. In response to the negative edge of the current load step shown in FIG. 30E, the transient signal V[ITH] slowly falls until it reaches the new threshold.

FIG. 30D illustrates the auxiliary switching converter transient inductor current I[Lac] increases as the input capacitor voltage decreases and the auxiliary witching converter transient inductor I[Lac] current decreases as the input capacitor voltage increases. Similarly, as shown, the main switching converter transient inductor current I[Ldc] increases as the input capacitor voltage decreases and the main switching converter transient inductor I[Ldc] current decreases as the input capacitor voltage increases. The main switching converter transient inductor current I[Ldc] tracks the transient signal V[ITH], and the auxiliary switching converter transient current I[Lac] tracks the higher frequency component V[ITH_AC] of the transient signal V[ITH].

FIG. 30E illustrates output voltage overshoot and undershoot for a load step I[Loadstep] in the power supply system 2900 shown in FIG. 29. As shown, the output voltage V[vout] dips during the load step up since the current is supplied from the output capacitor to compensate for additional current necessary by the load step up. The output voltage V[vout] increases during the load step down since the current is supplied to the output capacitor to sunk current from the output.

Figure 31:
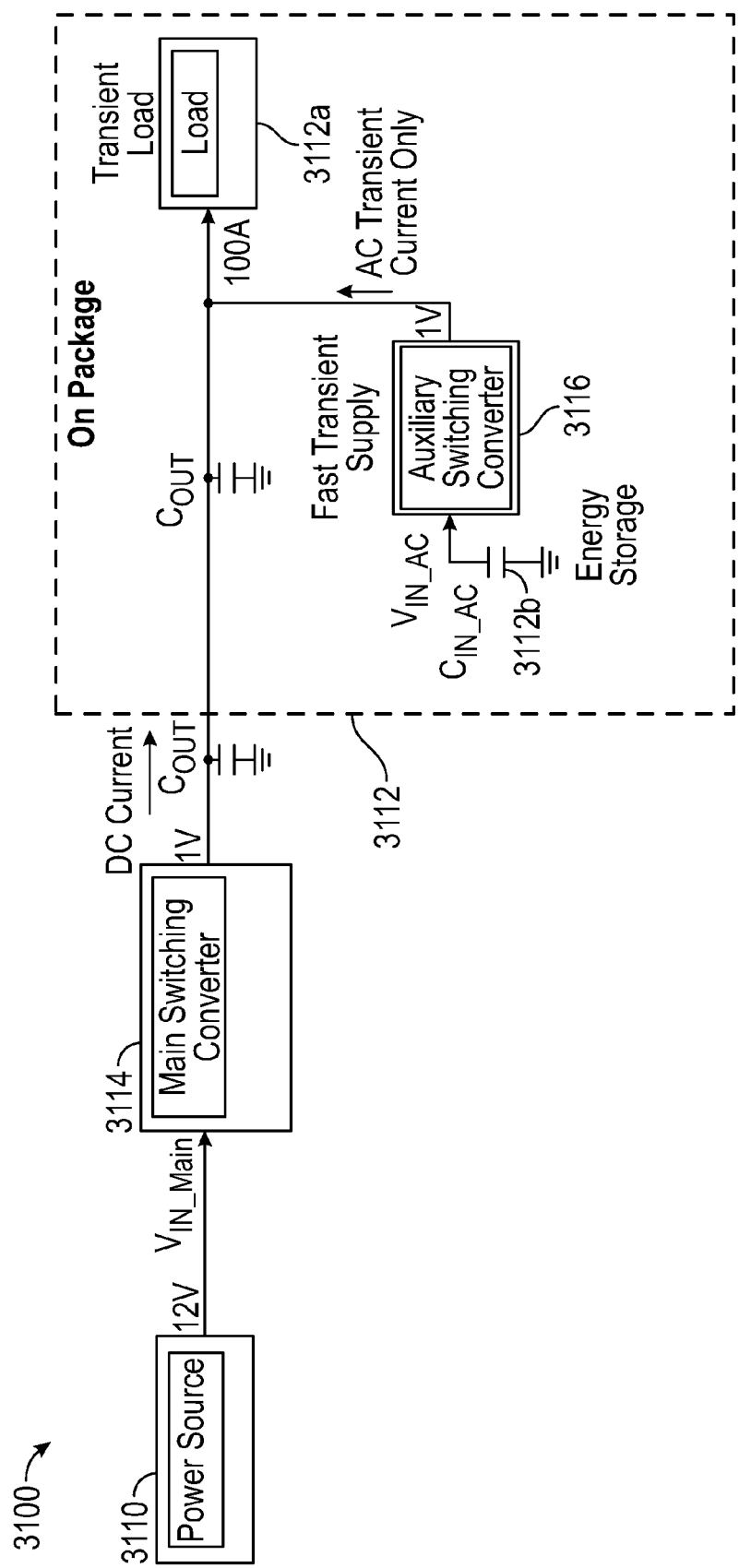
FIG. 31 illustrates another exemplary power supply system with the auxiliary switching converter moved inside the same package of load device for fast responding to load transient conditions.

FIG. 31 illustrates another exemplary power supply system 3100 with the auxiliary switching converter moved inside the same package of load device for fast responding to load transient conditions. The power supply system 3100 includes a power source 3110, a main switching converter 3114, and a load device package 3112. The load device package 3112 includes an auxiliary switching converter 3116, a load device 3112*a*, and a voltage source 3112*b*.

The main switching converter 3114 at one end is coupled to the power source 3110 and at another end is coupled to the load device package 3112. The main switching converter 3114 is configured to convert the voltage of the power source 3110 to a voltage compatible with the load device 3112*a*.

The power source 3110 is configured to output a certain standard voltage. The power source 3110 may be an electrical outlet. Most single phase alternating-current electrical outlets in the world supply power at 210-240 V or at 100-120 V. Alternatively, the power source 3110 may include other types of power sources such as, for example, a battery, a solar photovoltaic, an AC generator, or a DC output voltage of a front-end power supply. Regardless of the type, usually the power source 3110 provides a voltage different than the required voltage for the load device 3112*a*. The provided voltage may be higher or lower than the required voltage for the load device 3112*a*. To match the source voltage to the load voltage, the power supply system 3100 includes the main switching converter 3114 and an auxiliary switching converter 3116.

The main switching converter 3114 and the auxiliary switching converter 3116 are configured to change their respective input voltages to an appropriate voltage for the load device 3112*a*. The appropriate voltage for the load device 3112*a* may be higher or lower than the input voltages of the main switching converter 3114 and the auxiliary switching converter 3116. In one implementation, the appropriate voltage for the load device 3112*a* is lower than the voltage of the electrical power sources for the main switching converter 3114 and the auxiliary switching converter 3116. The load device 3112*a* may include a resistive load, a magnetic load, a capacitive load, a heater, or modern electronic devices.

Although not shown, the main switching converter 3114 includes main switches similar to the main switching converter 2916 shown in FIG. 29. Additionally, the main switching converter 3114 includes a main control loop similar to the main control loop 2919 shown in FIG. 29.

The auxiliary switching converter 3116 is part of the load device package 3112. The auxiliary switching converter 3116 at one end is coupled to a transient load device 3112*a* and at another end is coupled to a power source 3112*b*. The power source 3112*b* includes a capacitive power source. The power source 3112*b* may supply power at a lower voltage than the power source 3110. The power source 3112*b* may only supply high frequency transient current.

Although not shown, the auxiliary switching converter 3116 includes an auxiliary switches similar to the auxiliary switching converter 2918 shown in FIG. 29. The auxiliary switching converter 3116 may also include an auxiliary control loop and an auxiliary input voltage source control loop. The auxiliary control loop and the auxiliary input voltage source control loop respectively are similar the auxiliary control loop 2921 and the auxiliary input voltage source control loop 2930 shown in FIG. 29. Therefore, for the sake of brevity, they are not described further.

Figure 32A:
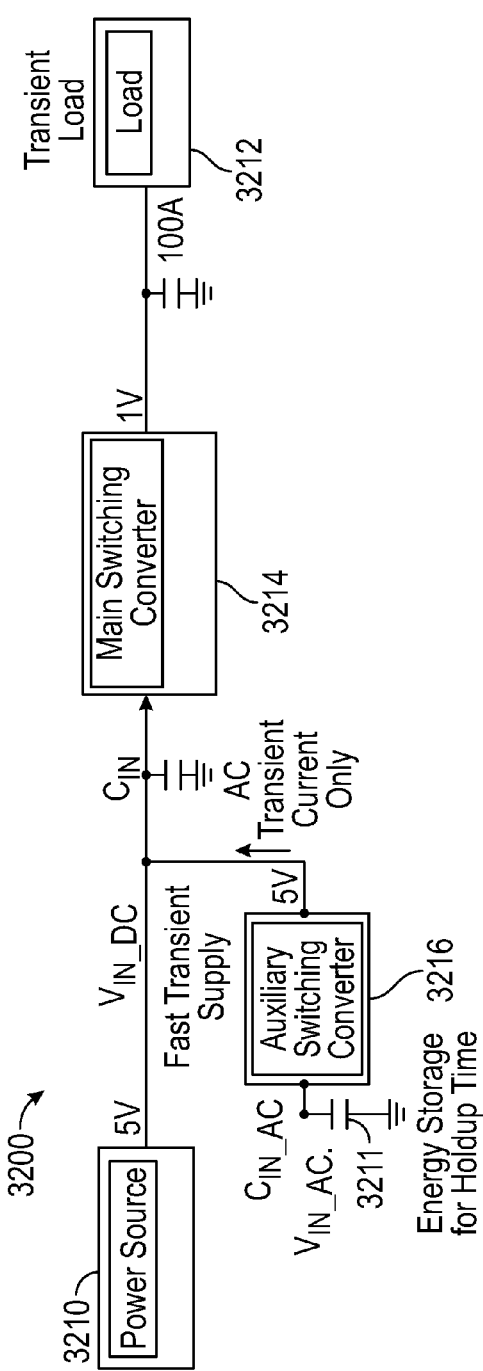
FIG. 32A illustrates another exemplary power supply system in which the output of the auxiliary switching converter is connected to the input of the main switching converter instead of to the load device to provide the holdup time when the main power source is temporary disconnected.

FIG. 32A illustrates another exemplary power supply system 3200 in which the output of the auxiliary switching converter is connected to the input of the main switching converter instead of to the load device to provide the holdup time when the main power source is temporary disconnected. The power supply system 3200 may be used for fast hold-up time response circuit or input voltage transient absorber circuit. For example, in a computer system running from the AC line, if the AC line fails, 20 millisecond of power may be needed to keep the system alive to save the work in progress when the main power source is not available. This energy may be stored on the input capacitor of the auxiliary switching converter and provided from the auxiliary supply.

As shown, the power supply system 3200 includes power sources 3210, 3211, a main switching converter 3214, an auxiliary switching converter 3216, and a load device 3212. The main switching converter 3214 at one end is coupled to the power source 3210 and at another end is coupled to the load device 3212. The main switching converter 3214 is configured to convert the voltage of the power source 3210 to a voltage compatible with the load device 3212. The auxiliary switching converter 3216 at one end is coupled to the power source 3211 and at another end is coupled to the main switching converter 3214 and the power source 3210.

The power source 3210 is configured to output a certain standard voltage. The power source 3210 may be an electrical outlet. Alternatively, the power source 3210 may include other types of power sources such as, for example, a battery, a solar photovoltaic, an AC generator, or a DC output voltage of a front-end power supply. Regardless of the type, usually the power source 3210 provides a voltage different than the required voltage for the load device 3212. The provided voltage may be higher or lower than the required voltage for the load device 3212. The power source 3211 may be an energy storage capacitor. The power source 3211 may only supply high frequency transient current to maintain the input voltage $V_{IN\_DC}$.

The main switching converter 3214 is configured to change its input voltages to an appropriate voltage for the load device 3212. The load device 3212 may include a resistive load, a magnetic load, a capacitive load, a heater, or modern electronic devices. The configurations of the main switching converter 3214 and the auxiliary switching converter 3216 are described in more details with respect to FIG. 33.

Figure 32B:
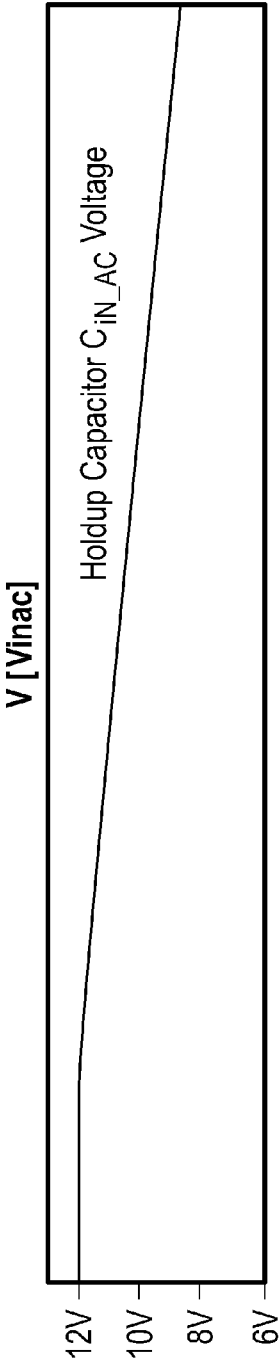

FIGS. 32B-32E illustrate waveforms of the power supply system 3200 shown in FIG. 32A in response to the input voltage source of the main supply come temporary disconnected. FIG. 32B illustrates the voltage of the capacitor 3211 in response to the failure of the power source 3210. As shown, the voltage of the capacitor 3211 reduces in response to the current load step to source additional current to the input of the main supply 3214.

FIG. 32C illustrates the main supply inductor current I[Ldc] and the auxiliary supply inductor current I[Lac] supplied to the load device in response to the failure of the power source 3210. FIG. 32D illustrates the voltage of the capacitor directly connected to the power source 3210 and the capacitor 3211 voltage in response to the failure of the power source 3210. FIG. 32E illustrates the output voltage of the power supply system. As shown, the output voltage does not change in response to the temporary failure of the power source 3210.

Figure 33:
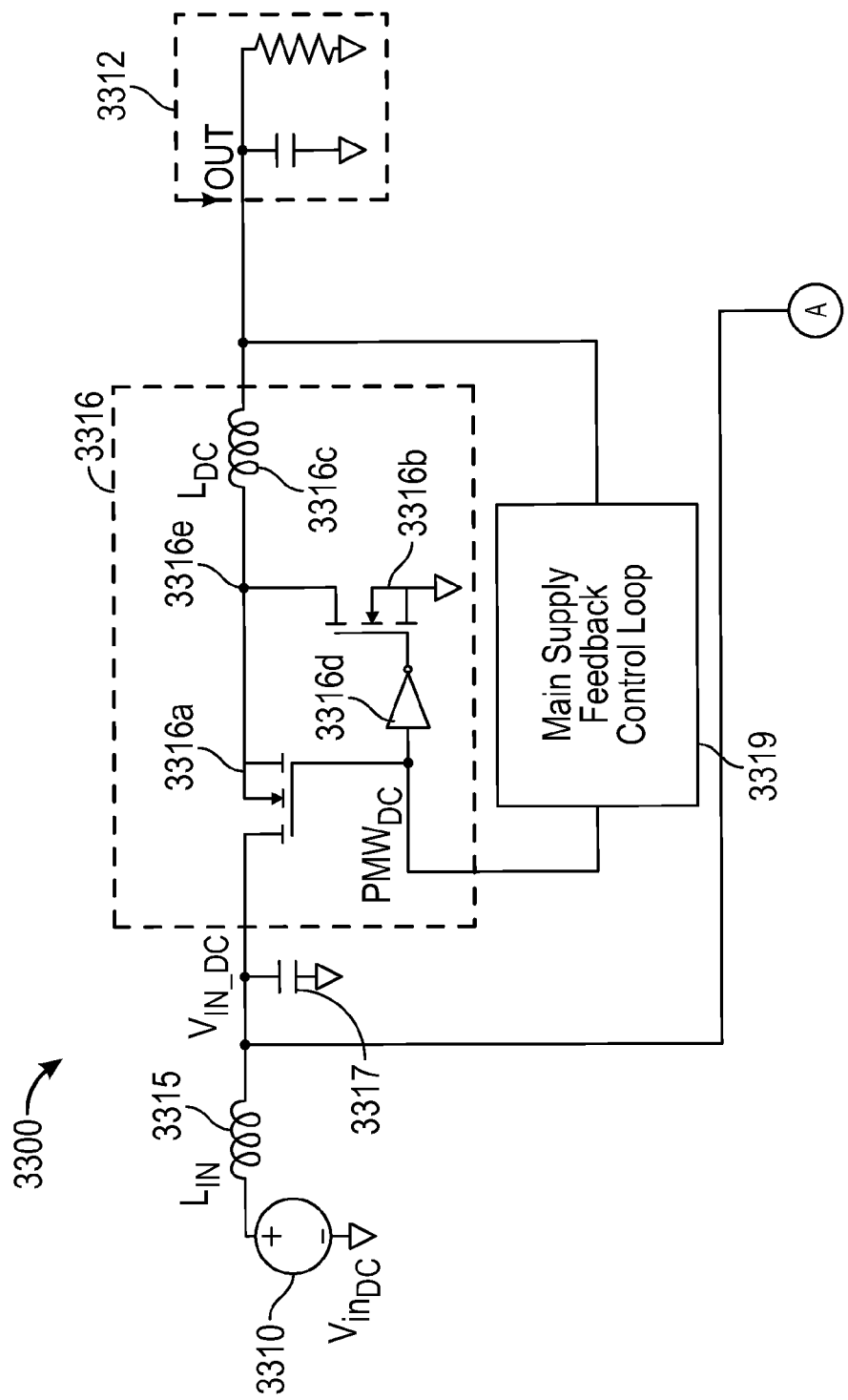
FIG. 33 illustrates an exemplary circuit diagram in which the output of the auxiliary supply is connected the input of the main supply to absorb and reduce the input voltage ripple when there is a load transient.
Figure 33:
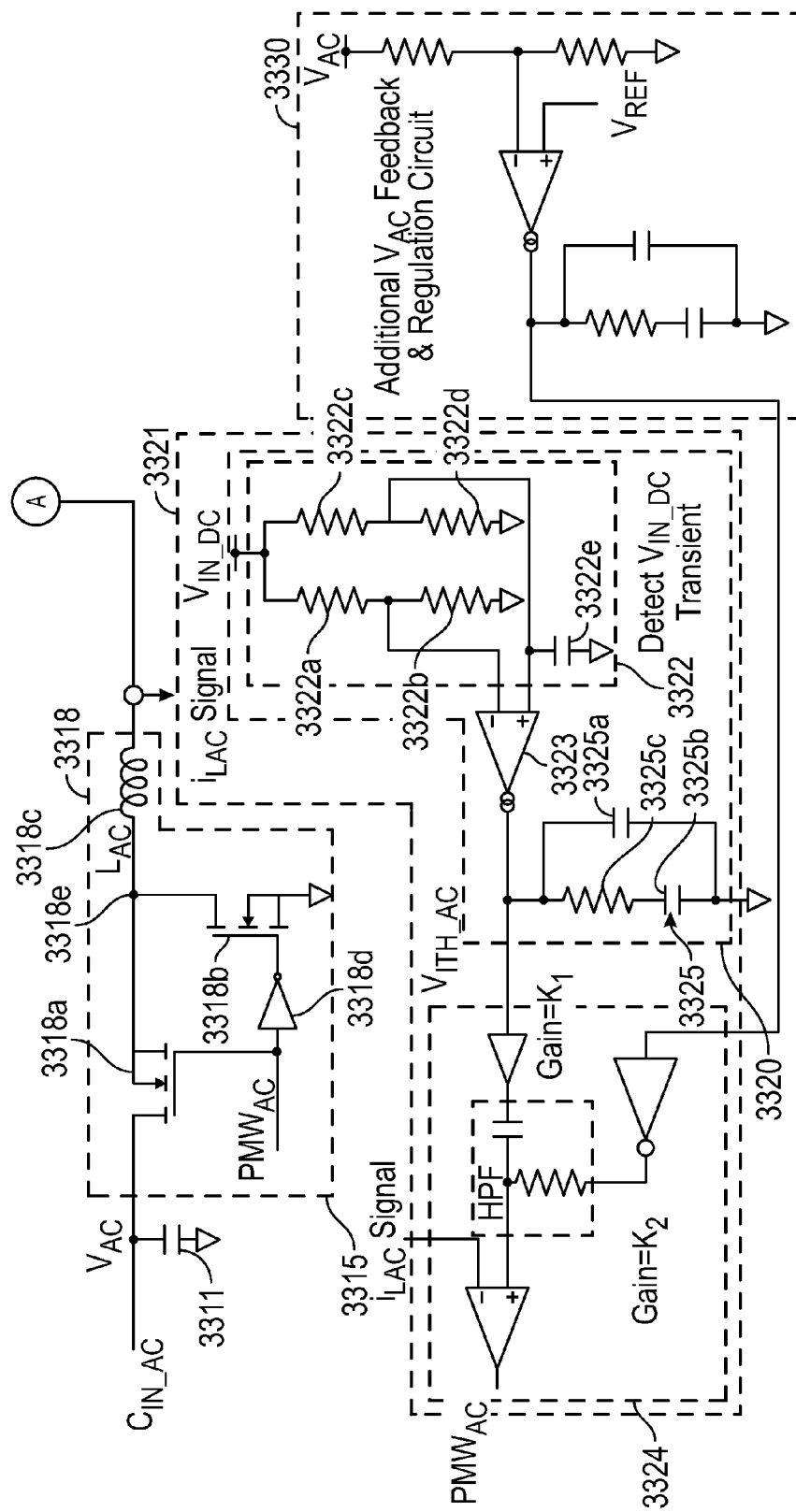

FIG. 33 illustrates an exemplary circuit diagram 3300 for the power supply system 3200 shown in FIG. 32. The circuit diagram 3300 includes power sources 3310 and 3311, a main switching converter 3316, an auxiliary switching converter 3318, a load device 3312, a main control loop 3319, an auxiliary control loop 3321, and an auxiliary input voltage source control loop 3330. The power sources 3310 and 3311 were described with respect to FIG. 32 and are not described further for the sake of brevity.

The main switching converter 3316 and the auxiliary switching converter 3318 are configured to change their respective input voltages to an appropriate voltage for the load device 3312. The load device 3312 may include a resistive load, a magnetic load, a capacitive load, a heater, or modern electronic devices.

The input of the main switching converter 3316 is coupled to the power source 3310 through an inductor 3315 and the output of the main switching converter 3316 is coupled to the load device 3312. The inductor 3315 can be an external input filter inductor, the parasitic inductor of the power source 3310 output, or the parasitic inductor of the power cable.

The main switching converter 3316 includes a first main switch 3316a, a second main switch 3316b, a main inductor 3316c, and a main inverter 3316d. The first main switch 3316a and the second main switch 3316b include MOSFETs. In one specific example, as shown, the MOSFETs are N-Channel MOSFETs. The drain terminal of the first main switch 3316a is coupled to the power source 3310 through the inductor 3315 and the source terminal of the first main switch 3316a is coupled to a main node 3316e. The gate terminal of the first main switch 3316a is coupled to the main control loop 3319 and is configured to receive a main control signal $PWM_{DC}$. The gate terminal of the second main switch 3316b is coupled to the main inverter 3316d, which is configured to supply the inverse of the main control signal $PWM_{DC}$ to the gate of the second main switch 3316b. The main control signal $PWM_{DC}$ is generated from the main control loop 3319. The source terminal of the second main switch 3316b is coupled to the ground. The drain terminal of the second main switch 3316b is coupled to the main node 3316e. The main inductor 3316c at one end is coupled to the main node 3316e and at another end is coupled to the load device 3312. The main switching converter 3316 may operate at a lower switching frequency than that of the auxiliary switching converter 3318.

The auxiliary switching converter 3318 at one end is coupled to the main converter input capacitor 3317 and the power source 3310 through an inductor 3315 and at another end is coupled to the power source 3311. The auxiliary switching converter 3318 includes a first auxiliary switch 3318a, a second auxiliary switch 3318b, an auxiliary inductor 3318c, and an auxiliary inverter 3318d. The first auxiliary switch 3318a and the second auxiliary switch 3318b include MOSFETs. In one specific example, as shown, the MOSFETs are N-Channel MOSFETs. The drain terminal of the first auxiliary switch 3318a is coupled to the power source 3311 and the source terminal of the first auxiliary switch 3318a is coupled to an auxiliary node 3318e. The gate terminal of the first auxiliary switch 3318a is coupled to an auxiliary control loop 3321 and configured to receive an auxiliary control signal $PWM_{AC}$. The gate terminal of the second auxiliary switch 3318b is coupled to the auxiliary inverter 3318d, which is configured to supply the inverse of the auxiliary control signal $PWM_{AC}$ to the gate of the second auxiliary switch 3318b. The auxiliary control signal $PWM_{AC}$ is generated from the auxiliary control loop 3321. The source terminal of the second auxiliary switch 3318b is coupled to the ground. The drain terminal of the second auxiliary switch 3318b is coupled to the auxiliary node 3318e. The auxiliary inductor 3318c at a first end is coupled to the auxiliary node 3318e and at a second end is coupled to the main converter input capacitor 3317 and the power source 3310 through the inductor 3315. The second end of the auxiliary inductor 3318c is also connected to the drain of the first main switch 3316a.

The main control loop 3319 includes a main feedback and compensation circuit and a main comparator. The main feedback and compensation circuit is similar to the feedback and compensation circuit 2720 shown in FIG. 27. Similarly, the main comparator is similar to the main comparator 2722 shown in FIG. 27. Therefore, for the sake of brevity, the main feedback and compensation circuit and the main comparator circuit are not described in more details. The main control loop 3319 may be configured to provide a main control signal $PWM_{DC}$ for controlling the main switching converter 3316 in response the transient condition.

The auxiliary control loop 3321 includes a feedback and compensation circuit 3320 and an auxiliary control circuit 3324. The feedback and compensation circuit 3320 at one end is coupled to the main converter input capacitor 3317 and the input power source 3310 through the inductor 3315 and at another end is coupled to the auxiliary control circuit 3324. The feedback and compensation circuit 3320 includes a transient detection circuit 3322, an error amplifier 3323, and a compensation circuit 3325. The transient detection circuit 3322 includes resistors 3322a-3322d. The resistors 3322a and 3322b form a first resistor divider to provide a feedback voltage of the main converter input capacitor 3317. The resistors 3322c and 3322d form a second resistor divider with the same dividing ratio of the first resistor divider. There is an additional capacitor 3322e in parallel with resistor 3322d. The resistor 3322c, 3322d and capacitor 3322e forms a low pass filter so that the voltage on capacitor 3322e is the low frequency average feedback voltage of the main converter input capacitor 3317.

The resistors 3322a at one end is coupled to the main converter input capacitor 3317 and input power source 3310 through the inductor 3315 and at another end is coupled to the resistor 3322b and the inverting terminal of the error amplifier 3323. The resistor 3322b at one end is coupled to the resistor 3322a and the inverting terminal of the error amplifier 3323 and at another end is coupled to the ground terminal. The resistor 3322c at one end is coupled to the main converter input capacitor 3317 and the input power source 3310 through the inductor 3315 and at another end is coupled to the resistor 3322d and the non-inverting terminal of the error amplifier 3323. The resistor 3322d at one end is coupled to the resistor 3322c and the non-inverting terminal of the error amplifier 3323 and at another end is coupled to the ground terminal. The capacitor 3322e at one end is coupled to the non-inverting terminal of the error amplifier 3323 and at another end is coupled to the ground.

The error amplifier 3323 monitors the feedback input voltage of the power source 3310 with respect to the filtered average feedback input voltage of the capacitor 3322e. When there is a transient condition such as input power source failure, these two voltages are not substantially equal to each other and the error amplifier 3323 may provide a control signal at its output. The control signal of the error amplifier 3323 may correspond to the difference between the actual input voltage and the desired input voltage.

The compensation circuit 3325 includes capacitors 3325a and 3325b and a resistor 3325c to provide frequency compensation for the feedback loop. The capacitor 3325a is connected at one end to an output of the error amplifier 3323 and at another end to the ground terminal. The resistor 3325c is connected at one end to the output of the error amplifier 3323 and at another end to the capacitor 3325b. The capacitor 3325b at one end is connected to the resistor 3325c and at another end to the ground terminal.

The output of the feedback and regulation circuit 3325 is provided to the auxiliary control circuit 3324. The auxiliary control circuit 3324 is configured to generate an auxiliary control signal $PWM_{AC}$ for controlling the auxiliary switching converter 3318. The auxiliary control circuit 3324 is similar to the auxiliary control circuit 2924 shown in FIG. 29. Therefore, for the sake of brevity of description, it is not described in more details. Based on the auxiliary control signal $PWM_{AC}$, the auxiliary switching converter 3318 sources or sinks current to the main converter input capacitor 3317. For example, when there is a temporary failure in the power source 3310, the auxiliary control signal $PWM_{AC}$ may turn ON the first auxiliary switch 3318a ON and may turn OFF the second auxiliary switch 3318b. As a result, the power source 3311 is coupled to the main converter input capacitor 3317 through the auxiliary conductor 3318 and high frequency current is supplied to the main converter input capacitor 3317 to maintain the input voltage $V_{IN\_DC}$ at a regulated level. In this manner, the output voltage of the power supply system 3300 may not change in response to the temporary failure of the power source 3310. The voltage of the power source 3311 may reduce in response to sourcing additional current to the main converter input capacitor 3317.

The auxiliary input voltage source control loop 3330 monitors the voltage of the power source 3311. The auxiliary input voltage source control loop 3330 at one end is connected to the power source 3311 and at the other end to the auxiliary control circuit 3324 for driving the auxiliary switching converter 3318. The auxiliary input voltage source control loop 3330 is similar to the auxiliary input voltage source control loop 2930. Therefore, for the sake of brevity of description, it is not described in more details. In the case of power source 3311 falls below a reference voltage $V_{ref}$, the error amplifier of the control loop 3330 increases its output voltage, therefore decreases the voltage on the non-inverting terminal of the comparator of the auxiliary control circuit 3324 through the second gain buffer. As a result, the auxiliary inductor 3318c provides negative current to charge capacitor 3311 from the input source 3310 and raises the $V_{AC}$ voltage back to the regulated level. On the other hand, if the $V_{AC}$ voltage on capacitor 3311 is higher than the regulated level, the error amplifier the control loop 3330 decreases its output voltage, therefore increases the voltage on the non-inverting terminal of the comparator of the auxiliary control circuit 3324 through the second gain buffer. As a result, the auxiliary inductor 2918c provides current from capacitor 3311 to the main converter input capacitor 3317 to discharge the $V_{AC}$ voltage back to the regulated level.

FIG. 34A illustrates simulation waveforms of a conventional supply having a large input voltage ripple during load transient. FIG. 34B illustrates simulation waveform of a power supply system shown in FIG. 33, which is configured to reduce the input voltage ripple during load transient. Specifically, FIG. 34A-1 illustrates inductor current of the conventional supply system in response to the current load step. FIG. 34A-2 illustrates the input voltage ripple of the conventional supply system in response to the current load step. FIG. 34A-3 illustrates the output voltage rippled in response to the current load step. FIG. 34B-1 illustrates the inductor 3316c current of the main switching converter 3316 shown in FIG. 33 in response to the current load step. FIG. 34B-1 also illustrates the inductor 3318c current of the auxiliary switching converter 3318 shown in FIG. 33 in response to the current load step. FIG. 34B-2 illustrates the reduced input voltage ripple of the power source 3310 in response to the current load step. FIG. 34B-3 illustrates the output voltage ripple of the power supply system 3300 in response to the current load step.

FIG. 35 illustrates a power supply system 3500 for which current or voltage transient is predictable by the load device or the application system. If the load transient is predicable, it is possible to make the fast supply (e.g., auxiliary supply) a controlled AC current source. If the load current step is known ahead of the transient event, the AC control signal is high frequency part of the load step.

The power supply system 3500 includes an input power source 3510, a main supply 3514, an auxiliary supply 3516, a load device 3512, and a converter 3518. The power source 3510 is configured to output a certain standard voltage. The power source 3510 may be an electrical outlet. Most single phase alternating-current electrical outlets in the world supply power at 210-240 V or at 100-120 V. Alternatively, the power source 3510 may include other types of power sources such as, for example, a battery, a solar photovoltaic, an AC generator, or a DC output voltage of a front-end power supply. Regardless of the type, usually the power source 3510 provides a voltage different than the required voltage for the load device 3512. The provided voltage may be higher or lower than the required voltage for the load device 3512. To match the source voltage to the load voltage, the power supply system 3500 includes the main supply 3514 and an auxiliary supply 3516.

The main supply 3514 and the auxiliary supply 3516 are configured to change their respective input voltages to an appropriate voltage for the load device 3512. The appropriate voltage for the load device 3512 may be higher or lower than the input voltages of the main supply 3514 and the auxiliary supply 3516. In one implementation, the appropriate voltage for the load device 3512 is lower than the voltage of the electrical power sources for the main supply 3514 and the auxiliary supply 3516. The load device 3512 may include a resistive load, a magnetic load, a capacitive load, a heater, or modern electronic devices.

Although not shown, the main supply 3514 includes a main switching converter and a main supply feedback control loop. The main switching converter of the main supply 3514 is similar to the main switching converter 2916 described with respect to FIG. 29. The main supply feedback control loop of the main supply 3514 is similar to the main supply feedback control loop 2919 described with respect to FIG. 29.

The auxiliary supply 3516 at one end is coupled to the load device 3512 and at another end is coupled to a power source 3511. The power source 3511 includes a capacitive power source. The power source 3511 may supply power at a lower voltage than the power source 3510. The power source 3511 may only supply high frequency transient current. The power source 3511 is coupled to the power source 3510 through a converter 3513. The converter 3513 may be a DC-DC converter and configured to reduce the input voltage of the power source 3510 for the auxiliary supply 3516. This is done to reduce the power loss associated with the auxiliary supply 3516 due to its higher switching frequency. Although not shown, the auxiliary supply 3516 includes an auxiliary switching converter, an auxiliary supply feedback control loop, and an auxiliary input voltage source control loop. The auxiliary switching converter, the auxiliary supply feedback control loop, and the auxiliary input voltage source control loop respectively are the same as auxiliary switching converter 2918, the auxiliary control loop 2921, and the auxiliary input voltage source 2930 shown and described with respect to FIG. 29 except an additional current control signal from the load device or the application system is injected to the auxiliary supply to change its AC output current quickly to meet the coming load transient requirement. Therefore, for the sake of brevity, they are not described further.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A power interface device coupled to a power source for adjusting a voltage of the power source to correspond to a voltage associated with a load device, the power interface device comprising:
   a main control circuit including a low pass filter configured to receive a transient signal, the main control circuit being configured to generate, based on a lower frequency component of the transient signal received at an output terminal, a main control signal for controlling a main switching converter coupled to the output terminal;
   an auxiliary control circuit including a high pass filter configured to receive the transient signal, the auxiliary control circuit configured to generate, based on a higher frequency component of the transient signal, an auxiliary control signal for controlling an auxiliary switching converter coupled to the output terminal, wherein the auxiliary switching converter operates at a higher switching frequency than the main switching converter; and
   a common buffer commonly shared by the main control circuit and the auxiliary control circuit.

2. The power interface device of claim 1, further comprising:
   a feedback sense circuit configured to sense an output voltage at the output terminal;
   an error amplifier configured to output the transient signal based on the sensed output voltage and a reference voltage; and
   a compensation circuit configured to receive the transient signal and to output a frequency compensated transient signal to the common buffer.

3. The power interface device of claim 2, wherein:
   the feedback sense circuit comprises one or more resistors and one or more capacitors configured to sense the output voltage and generate a feedback voltage, and the error amplifier is configured to receive the feedback voltage and the reference voltage, and generate the transient signal when the feedback voltage and the reference voltage are not substantially equal to each other.

4. The power interface device of claim 2, wherein:
the compensation circuit includes a capacitor-resistor network comprising a first capacitor, a second capacitor, and a resistor, the first capacitor being connected at one end to an output terminal of the error amplifier and at another end being connected to a ground terminal, the second capacitor being connected in series with the resistor forming a series capacitor-resistor network, wherein the series capacitor-resistor network is connected to the ground terminal at one end, and to the output terminal of the error amplifier at another end.

5. The power interface device of claim 1, wherein:
the main control circuit comprises a main comparator configured to compare the lower frequency component of the transient signal with a sensed low frequency inductor signal sourced by the main switching converter, the main control signal being generated based on comparing the lower frequency component and the sensed low frequency inductor signal, and
the main control signal enables the main switching converter to source to the output terminal a low frequency current tracking the lower frequency component of the transient signal.

6. The power interface device of claim 5, wherein:
the auxiliary control circuit comprises an auxiliary comparator configured to compare the higher frequency component of the transient signal with a sensed high frequency inductor signal sourced by the auxiliary switching converter, the auxiliary control signal being generated based on comparing the high frequency component and the sensed high frequency inductor signal,
the auxiliary control signal enables the auxiliary switching converter to source to the output terminal a high frequency current tracking the higher frequency component of the transient signal.

7. The power interface device of claim 6, wherein a resistor of the low pass filter is connected at one end to the common buffer and at another end to a capacitor of the low pass filter and a non-inverting terminal of the main comparator, and the capacitor of the low pass filter is connected at one end to the resistor of the low pass filter and the non-inverting terminal of the main comparator and at another end is connected to the ground terminal, and
wherein a capacitor of the high pass filter is connected at one end to the common buffer and at another end to a resistor of the high pass filter and a non-inverting terminal of the auxiliary comparator, and the resistor of the high pass filter is connected at one end to a capacitor of the high pass filter and the non-inverting terminal of the auxiliary comparator and at another end is connected to the ground terminal.

8. The power interface device of claim 1, further comprising:
a feedback and compensation circuit configured to detect a transient condition at the output terminal and generate the transient signal based on the detected transient condition,
wherein the common buffer comprises an input terminal and an output terminal, the input terminal being connected to the feedback and compensation circuit, and the output terminal being connected to the high pass filter and the low pass filter.

9. The power interface device of claim 1, further comprising:
a feedback and compensation circuit configured to detect a transient condition at the output terminal and generate the transient signal based on the detected transient condition,
wherein the common buffer is configured to isolate the main control circuit and the auxiliary control circuit from an impedance of the feedback and compensation circuit.

10. The power interface device of claim 9, wherein:
the main switching converter is configured to source, to the output terminal, low frequency current during the transient condition and outside the transient condition,
the auxiliary switching converter is configured to source, to the output terminal, high frequency current during the transient condition and substantially zero average current outside the transient condition, and
the transient condition includes a sudden increase or decrease in load current, or a sudden increase or decrease of an output voltage.

11. A power interface device comprising:
a feedback and compensation circuit configured to output a transient signal based on a transient condition detected at an output terminal;
a high pass filter configured to output a higher frequency component of the transient signal;
an adder circuit configured to receive the higher frequency component of the transient signal from the high pass filter and the transient signal from the feedback and compensation circuit and to output a lower frequency component of the transient signal;
configured to generate, based on the lower frequency component of the transient signal, a main control signal for controlling a main switching converter coupled to the output terminal; and
an auxiliary control circuit configured to generate, based on the higher frequency component of the transient signal, an auxiliary control signal for controlling an auxiliary switching converter coupled to the output terminal, wherein the auxiliary switching converter operates at a higher switching frequency than the main switching converter.

12. A power interface device comprising:
a feedback and compensation circuit configured to detect a transient condition at an output terminal and to output a transient signal based on the detected transient condition;
a main control circuit configured to receive the transient signal from the feedback and compensation circuit and to generate, based on the transient signal, a main control signal for controlling a main switching converter coupled to the output terminal;
a low pass filter configured to receive the transient signal from the feedback and compensation circuit and to output a lower frequency component of the transient signal;
an adder circuit configured to receive the lower frequency component of the transient signal from the low pass filter and the transient signal from the feedback and compensation circuit and to output a higher frequency component of the transient signal; and
an auxiliary control circuit configured to receive the higher frequency component of the transient signal from the adder circuit and to generate, based on the higher frequency component of the transient signal, an auxiliary control signal for controlling an auxiliary switching converter coupled to the output terminal, wherein the auxiliary switching converter operates at a higher switching frequency than the main switching converter.

13. The power interface device of claim 12, wherein the adder circuit is configured to receive the lower frequency component of the transient signal from the low pass filter and the transient signal from the feedback and compensation circuit, determine a difference between the lower frequency component of the transient signal and the transient signal, and output the higher frequency component of the transient signal to the auxiliary control circuit based on the determined difference.

14. The power interface device of claim 13, further comprising a buffer between the feedback and compensation circuit and the auxiliary control circuit and configured to the auxiliary control circuit from an impedance of the feedback and compensation circuit.

15. The power interface device of claim 14, wherein:
the low pass filter includes a resistor and a capacitor, the resistor is coupled to an output terminal of the buffer at one end and to a first node at a second end, the capacitor is connected to the first node at one end and to a ground terminal at another end, and
the adder circuit is coupled to the first node and to the output terminal of the feedback and compensation circuit, and is configured to receive the lower frequency component of the transient signal from the low pass filter and the transient signal from the feedback and compensation circuit, and output the higher frequency component of the transient signal to the auxiliary control circuit based on the received lower frequency component and the received transient signal.

16. The power interface device of claim 15, further comprising:
an offset voltage source configured to offset high frequency current sourced by the auxiliary switching converter outside the transient condition during a steady state to enable sourcing substantially zero average current from the auxiliary switching converter, wherein
the offset voltage source is coupled to the adder circuit via a first resistor.

17. A power interface device comprising:
a feedback and compensation circuit configured to detect a transient condition of a main switching converter and to output a transient signal based on a detected transient condition;
configured to receive the transient signal from the feedback and compensation circuit and to control the main switching converter based on the transient signal; and
an auxiliary control circuit including:
a first gain buffer configured to amplify the transient signal,
a high pass filter configured to output a higher frequency component of the amplified transient signal, and
an auxiliary comparator configured to receive at a first terminal the higher frequency component of the transient signal and a sensed high frequency inductor signal at a second terminal from an auxiliary switching converter, and configured to control the auxiliary switching converter based on a comparison of the higher frequency component and the sensed high frequency inductor signal, wherein the auxiliary switching converter operates at a higher switching frequency than the main switching converter.

18. The power interface device of claim 17, wherein the power interface device further includes an offset voltage source coupled to the high pass filter and configured to offset high frequency current sourced by the auxiliary switching converter to enable sourcing substantially zero average current from the auxiliary switching converter outside of the transient condition.

19. A power supply system comprising:
the power interface device of claim 17 coupled to a first power source and a second power source and load device, and configured to adjust a voltage of the first power source to correspond to a voltage of the load device, wherein:
the first power source is coupled to the main switching converter, and
the second power source is coupled to the auxiliary switching converter and is independent from the first power source.

20. The power supply system of claim 19, wherein the second power source is a capacitor.

21. The power supply system of claim 20, further comprising:
an input source feedback and regulation circuit connected at one end to the second power source and at another end to the auxiliary control circuit wherein the input source feedback and regulation circuit includes a feedback voltage sense circuit, an error amplifier, and a compensation circuit, and wherein:
the feedback voltage sense circuit is configured to sense the voltage of the second power source and output a feedback voltage to a first terminal of the error amplifier, and
the error amplifier is configured to monitor the feedback voltage received at the first terminal of the error amplifier and a reference voltage received at a second terminal of the error amplifier, and output a control signal when the feedback voltage is not substantially equal to the reference voltage.

22. The power supply system of claim 21, wherein:
the auxiliary control circuit further includes a second gain buffer connected to an output terminal of the error amplifier which regulates a voltage of the second power source, an output terminal of the second gain buffer being connected to the high pass filter, and
when the voltage of the second power source falls below the reference voltage, the error amplifier increases the control signal, thereby decreasing signal on the first terminal of the auxiliary comparator through the second gain buffer which in turn results in current flowing from the output terminal through the auxiliary switching converter to the second power source to charge the second power source.

23. A power interface device comprising:
a compensation circuit configured to detect a transient condition at an output terminal and to output a transient signal based on the detected transient condition;
a first buffer coupled to the compensation circuit;
low pass filter including a resistor and a capacitor, wherein the resistor is coupled to and between the first buffer and the capacitor, and the capacitor is coupled to a ground terminal;
a main control circuit including a main comparator configured to receive a lower frequency component of the transient signal from the low pass filter and a sensed inductor current signal of a main switching converter configured to source current from an input terminal to the output terminal, and to control the main switching converter based on the lower frequency component of the transient signal; and an auxiliary control circuit including a gain buffer and an auxiliary comparator, wherein:
  the gain buffer includes a first terminal coupled to an output of the first buffer and a second terminal coupled to the capacitor and configured to provide a higher frequency component of the transient signal to the auxiliary comparator,
  the auxiliary comparator is configured to compare the higher frequency component of the transient signal and a sensed high frequency inductor current provided by an auxiliary switching converter coupled to the output terminal, and to control the auxiliary switching converter based on comparing the higher frequency component and the sensed high frequency inductor current, wherein the auxiliary switching converter operates at a higher switching frequency than the main switching converter.

24. The power interface device of claim 23, wherein:
during a load step up transient condition, the auxiliary comparator generates a high auxiliary control signal for sourcing high frequency current from the input terminal to the output terminal to improve transient response and reduce output voltage ripple due to the transient condition and the main comparator circuit generates a high main control signal for sourcing low frequency current from the input terminal to the output terminal,
the high frequency current tracks the higher frequency component of the transient signal, and
the low frequency current tracks the lower frequency component of the transient signal.

25. The power interface device of claim 23, wherein:
during a load step up transient condition, the auxiliary comparator generates a high auxiliary control signal for sourcing high frequency current from the input terminal to the output terminal to improve transient response and reduce output voltage ripple due to the transient condition and the main comparator circuit generates a high main control signal for sourcing low frequency current from the input terminal to the output terminal,
the high frequency current tracks the higher frequency component of the transient signal, and
the low frequency current tracks the lower frequency component of the transient signal.

26. A power interface device comprising:
a feedback and compensation circuit configured to detect a transient condition at an output terminal and to output a transient signal based on a detected transient condition;
a main control circuit configured to receive the transient signal from the feedback and compensation circuit and to control a main switching converter configured to operate at a first frequency to source current from an input terminal to an output terminal based on the transient signal;
an auxiliary control circuit configured to receive a higher frequency component of the transient signal from the feedback-and compensation circuit and to control an auxiliary switching converter configured to operate at a second frequency to source current from the input terminal to the output terminal based on the higher frequency component of the transient signal, wherein the auxiliary switching converter operates at a higher switching frequency than the main switching converter, and wherein:
the feedback and compensation circuit includes:
  a feedback sense circuit configured to sense an output voltage of the main switching converter and to generate a feedback voltage, and
  an error amplifier configured to receive the feedback voltage and a reference voltage and output the transient signal based on a sensed output voltage and the reference voltage.

27. The power interface device of claim 26, wherein the feedback and compensation circuit further includes a compensation circuit, and wherein the auxiliary control circuit includes an auxiliary comparator configured to receive a higher frequency component of the transient signal and sensed high frequency inductor current from the auxiliary switching converter, and to generate an auxiliary control signal to control the auxiliary switching converter.

28. The power interface device of claim 27, wherein:
during a load step up transient condition, the auxiliary comparator generates a high auxiliary control signal for sourcing high frequency current from the input terminal to the output terminal to improve transient response and reduce output voltage ripple due to the transient condition and the main control circuit generates a high main control signal for sourcing low frequency current from the input terminal to the output terminal,
the high frequency current tracks a higher frequency component of the transient signal, and
the low frequency current tracks a lower frequency component of the transient signal.

29. The power interface device of claim 27, wherein:
during a load step up transient condition, the auxiliary comparator generates a high auxiliary control signal for sourcing high frequency current from the input terminal to the output terminal to improve transient response and reduce output voltage ripple due to the transient condition and the main control circuit generates a high main control signal for sourcing low frequency current from the input terminal to the output terminal,
the high frequency current tracks a higher frequency component of the transient signal, and
the low frequency current tracks a lower frequency component of the transient signal.

30. A power interface device comprising:
a feedback and compensation circuit and configured to detect a transient condition at an output terminal and to output a transient signal based on a detected transient condition;
a main control circuit configured to generate, based on the transient signal, a main control signal for controlling main switching converter configured to source current from an input terminal to the output terminal;
a resistor-capacitor ("RC") and adder network coupled to the feedback and compensation circuit and configured to receive the transient signal from the feedback and compensation circuit and output a higher frequency component of the transient signal; and
an auxiliary control circuit coupled to the RC and adder network and an auxiliary switching converter configured to source current from the input terminal to the output terminal, the auxiliary control circuit configured to receive the higher frequency component of the transient signal and to generate, based on the higher frequency component of the transient signal, an auxiliary control signal for controlling an auxiliary switching converter coupled to the output terminal, wherein the auxiliary switching converter operates at a higher switching frequency than the main switching converter.

31. The power interface device of claim 30, wherein:
the RC and adder network includes a high pass filter and an adder circuit,
the high pass filter is coupled to the feedback and compensation circuit and configured to receive the transient signal from the feedback and compensation circuit and output the higher frequency component of the transient signal to the auxiliary control circuit,
the adder circuit is coupled to the high pass filter and the feedback and compensation circuit and configured to receive the higher frequency component of the transient signal from the high pass filter and the transient signal from the feedback and compensation circuit and output a lower frequency component of the transient signal to the main control circuit, and
the main control circuit is configured to generate the main control signal based on the lower frequency component of the transient signal.

32. The power interface device of claim 30, wherein:
the RC and adder network includes a low pass filter and an adder circuit,
the low pass filter is coupled to the feedback and compensation circuit and configured to receive the transient signal from the feedback and compensation circuit and output a lower frequency component of the transient signal,
the adder circuit is coupled to the low pass filter and the feedback and compensation circuit and configured to receive the lower frequency component of the transient signal from the low pass filter and the transient signal from the feedback and compensation circuit and output the higher frequency component of the transient signal to the auxiliary control circuit.

33. A power supply system comprising:
a main control loop coupled to a main switching converter, and configured to detect a transient condition at an output terminal and to generate, based on a detected transient condition, a main control signal for controlling a main switching converter coupled to the output terminal and configured to source current from a first input terminal; and
an auxiliary control loop configured to detect the transient condition and to generate, based on the detected transient condition, an auxiliary control signal or controlling an auxiliary switching converter coupled to the output terminal and configured to source current from a second input terminal, wherein the auxiliary switching converter operates at a higher switching frequency than the main switching converter, and wherein:
the auxiliary control loop includes an auxiliary feedback and compensation circuit, a first gain buffer, and a high pass filter,
the auxiliary feedback and compensation circuit is configured to detect the transient condition and output an auxiliary transient signal based on the detected transient condition,
the first gain buffer is coupled to the auxiliary feedback and compensation circuit and configured to amplify the auxiliary transient signal received from the auxiliary feedback and compensation circuit, and
the high pass filter is coupled to the first gain buffer and configured to receive the amplified auxiliary transient signal from the first gain buffer and output a higher frequency component of the amplified auxiliary transient signal.

34. The power supply system of claim 33, wherein the main control loop includes:
a main feedback and compensation circuit coupled to the output terminal and configured to detect the transient condition at the output terminal and output a main transient signal based on the detected transient condition, and
a main comparator coupled to the main feedback and compensation circuit and the main switching converter and configured to receive the main transient signal from the main feedback and compensation circuit and generate the main control signal based on the main transient signal for controlling the main switching converter.

35. The power supply system of claim 33, wherein:
the auxiliary feedback and compensation circuit is coupled to the output terminal and configured to detect the transient condition at the output terminal and output the auxiliary transient signal based on the detected transient condition,
wherein the auxiliary control signal is generated based on a comparison result of the higher frequency component of the amplified auxiliary transient signal and a sensed high frequency inductor signal sourced by the auxiliary switching converter.

36. The power supply system of claim 33, wherein the auxiliary control loop further includes a second gain buffer, the power supply system further comprising:
an input source feedback and regulation circuit connected at one end to the second input terminal and at another end to an input terminal of second gain buffer for controlling the auxiliary switching converter, wherein the input source feedback and regulation circuit includes a feedback voltage sense circuit, and an error amplifier, wherein:
the feedback voltage sense circuit is configured to sense a voltage at the second input terminal and output a feedback voltage to a first input terminal of the error amplifier,
the error amplifier being configured to monitor the feedback voltage received at the a first input terminal of the error amplifier and a reference voltage received at a second terminal of the error amplifier, and to output a control signal when the feedback voltage is not substantially equal to the reference voltage.

37. The power supply system of claim 36, wherein the auxiliary control loop includes an auxiliary comparator connected to the high pass filter and configured to receive the higher frequency component of the auxiliary transient signal at a first terminal and a sensed high frequency inductor signal sourced by the auxiliary switching converter at a second terminal, and to generate the auxiliary control signal based on comparison result of the higher frequency component and the sensed high frequency inductor signal for controlling the auxiliary switching converter.

38. The power supply system of claim 37, wherein:
when a voltage at the second input terminal falls below a reference voltage, the error amplifier increases the control signal, thereby decreasing signal on the first terminal of the auxiliary comparator through the second gain buffer which in turn results in current flowing from the output terminal through the auxiliary switching converter to an auxiliary power source connected to the second input terminal to charge the auxiliary power source, and
the auxiliary power source includes a capacitor.

39. The power supply system of claim 36, wherein the input source feedback and regulation circuit includes a compensation circuit, wherein the compensation circuit includes a first and second capacitors and a resistor, the first capacitor being connected at one end to an output of the error amplifier and at another end to the ground terminal, the resistor of the compensation circuit being connected at one end to the output of the error amplifier and at another end to the second capacitor, the second capacitor at one end being connected to the resistor of the compensation circuit and at another end to the ground terminal, and the input terminal of the second gain buffer being connected to the output of the error amplifier which regulates a voltage at the second input terminal.

40. The power supply system of claim 33, further comprising:
  a main power source coupled to the first input terminal;
  an auxiliary power source coupled to the second input terminal; and
  a load device coupled to the output terminal, wherein
  the main power source is coupled to the main switching converter,
  the auxiliary power source is coupled to the auxiliary switching converter and is independent from the main power source,
  the main switching converter is configured to change a voltage of the main power source to correspond to a voltage of the load device.

41. The power supply system of claim 40, wherein:
  the auxiliary feedback and compensation circuit is coupled to the first input terminal and configured to detect the transient condition at the first input terminal and output the auxiliary transient signal based on the detected transient condition at the first input terminal, and
  the transient condition at the first input terminal includes temporary loss of voltage at the first input terminal.

\* \* \* \* \*